(12) United States Patent
Berol

(10) Patent No.: US 11,405,740 B1
(45) Date of Patent: Aug. 2, 2022

(54) AUDIO OUTPUT CONFIGURATION FOR MOVING DEVICES

(71) Applicant: Amazon Technologies, Inc., Seattle, WA (US)

(72) Inventor: David Berol, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/939,917

(22) Filed: Jul. 27, 2020

(51) Int. Cl.
*H04S 7/00* (2006.01)
*H04W 88/02* (2009.01)

(52) U.S. Cl.
CPC .............. *H04S 7/302* (2013.01); *H04S 7/301* (2013.01); *H04W 88/02* (2013.01)

(58) Field of Classification Search
USPC ................ 381/58, 59, 85, 96, 150, 300, 332
See application file for complete search history.

(56) References Cited

U.S. PATENT DOCUMENTS

| | | | |
|---|---|---|---|
| 10,331,166 B2 * | 6/2019 | Dahl | G06F 3/043 |
| 2013/0129122 A1 * | 5/2013 | Johnson | H04R 3/12 381/306 |
| 2016/0119054 A1 * | 4/2016 | Foxworthy | H04B 7/18513 370/319 |

* cited by examiner

*Primary Examiner* — Yosef K Laekemariam
(74) *Attorney, Agent, or Firm* — Pierce Atwood LLP

(57) ABSTRACT

Described herein is a system for recalibrating an audio configuration for mobile or moving devices. The system may configure a multi-device output group to generate synchronous output audio using multiple devices. For example, the output group may include a first device generating a first portion of output audio corresponding to a first channel and a second device generating a second portion of the output audio corresponding to a second channel. If the second device detects motion and/or movement indicating a change in its location, the system may recalibrate the output group to continue generating the output audio without the second device. For example, the first device or a new device can generate the second portion of the output audio instead of the second device. When the second device returns, the system can recalibrate the output group to include the second device again.

20 Claims, 33 Drawing Sheets

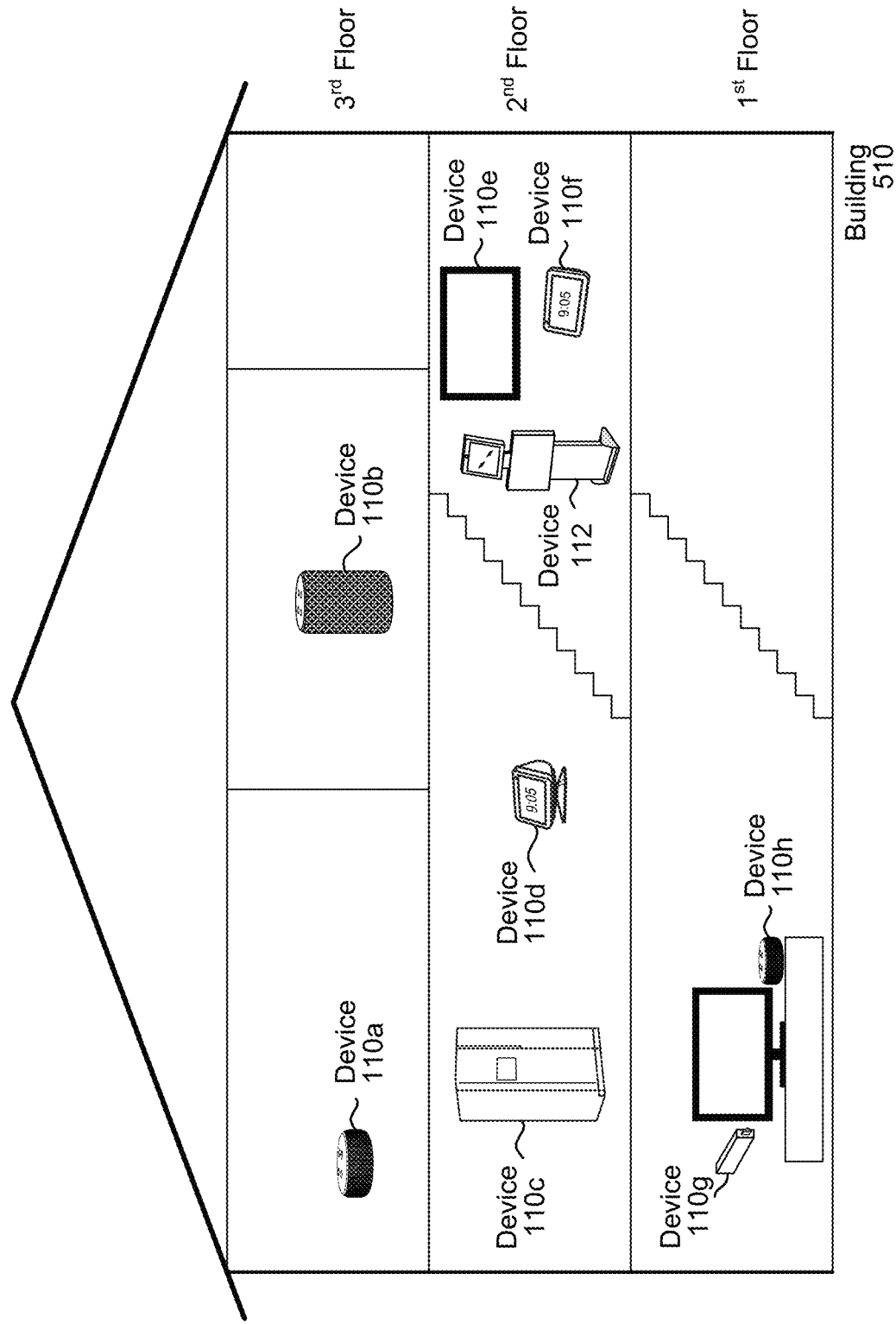

FIG. 5B

| Device | Speakers | Display | Camera |
|--------|----------|---------|--------|
| A | Basic | No | No |
| B | Premium | No | No |
| C | Basic | Yes | No |
| D | Premium | Yes | Yes |
| E | Basic | Yes | No |
| F | Premium | Yes | Yes |
| G | Passes | Passes | No |
| H | Basic | No | No |
| 112 | Premium | Yes | Yes |

Output Capability Data 520

FIG. 6A

| Devices to Sync: |
|---|
| ☒ Device A |
| ☒ Device B |
| ☐ Device C |
| ☐ Device D |

Acoustic Region Request
610

| Devices to Sync: |
|---|
| ☐ Device C |
| ☐ Device D |
| ☒ Device E |
| ☒ Device F |
| ☒ Device 112 |

Acoustic Region Request
615

FIG. 6B

| Acoustic Region | Devices | Default Device |
|---|---|---|
| 1 | A,B | B |
| 2 | E,F,112 | E |
| 3 | G,H | G |

Acoustic Region Data
620

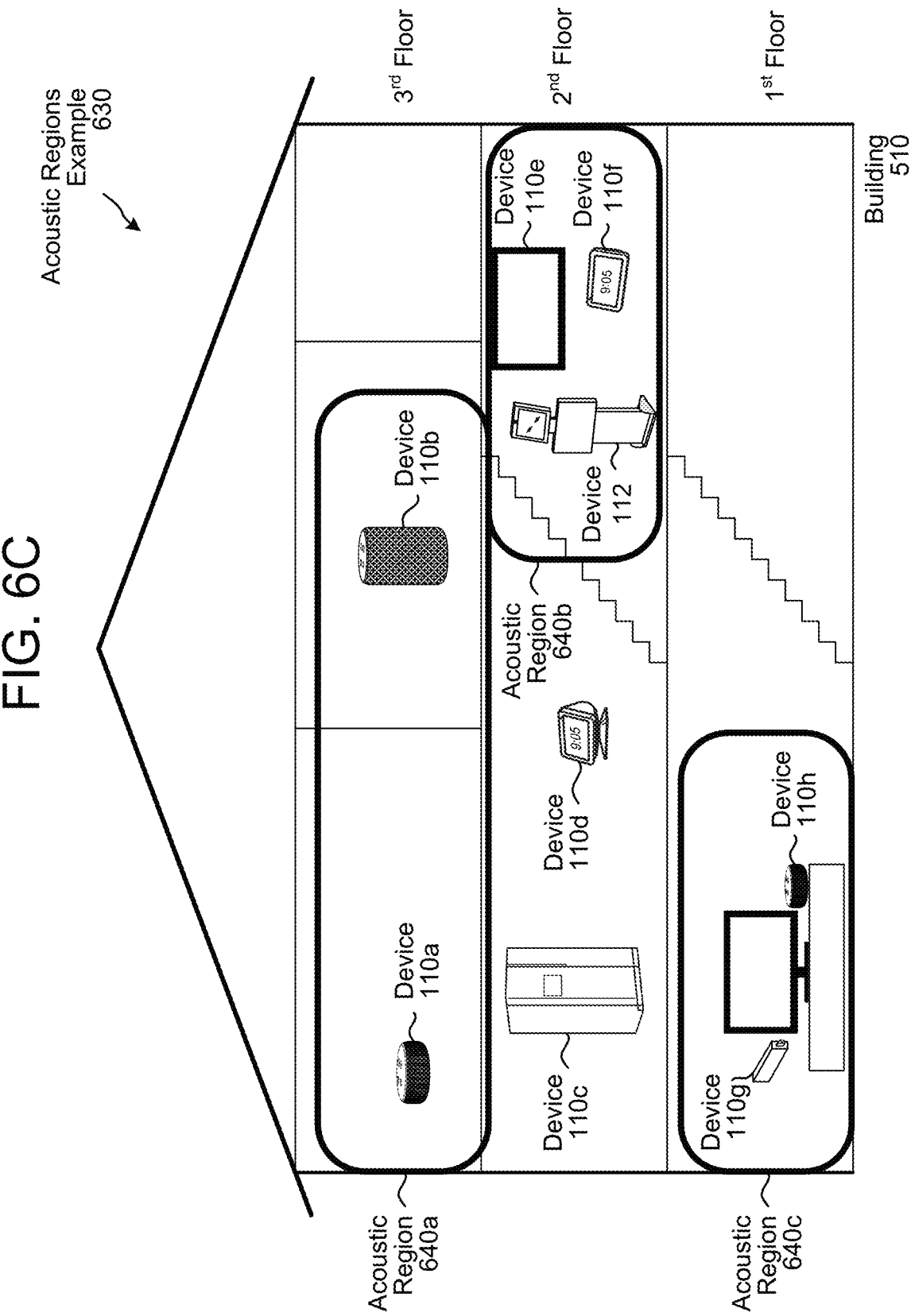

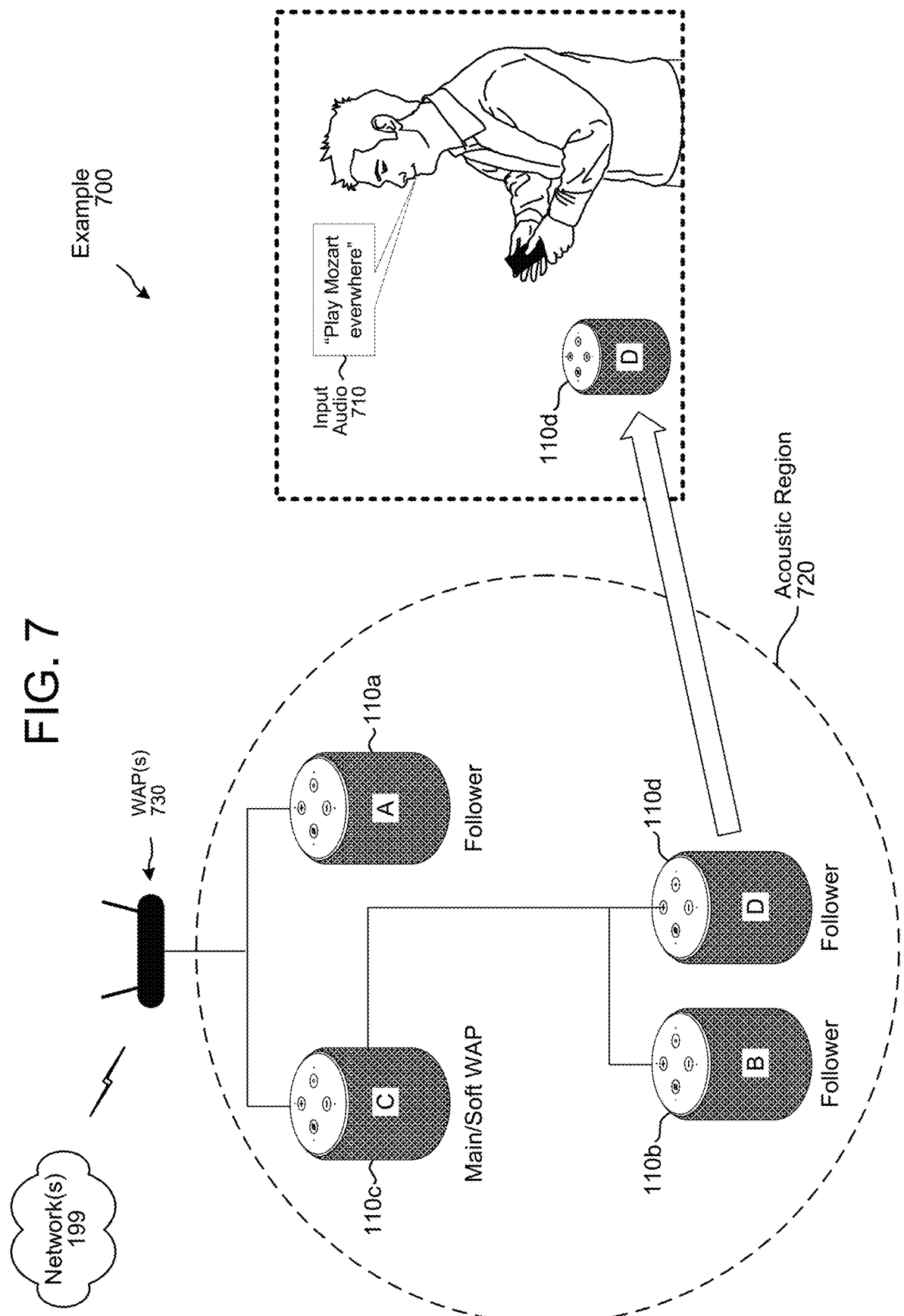

Device-Paired Configuration 1010

| Acoustic Region | Output Devices | Default Device |
|---|---|---|
| 1 | D,E,F,112 | E |

Acoustic Region Data 1020

Channel-Paired Configuration 1030

| Acoustic Region | Output Devices | Default Device |
|---|---|---|
| 1 | E | E |

Acoustic Region Data 1040

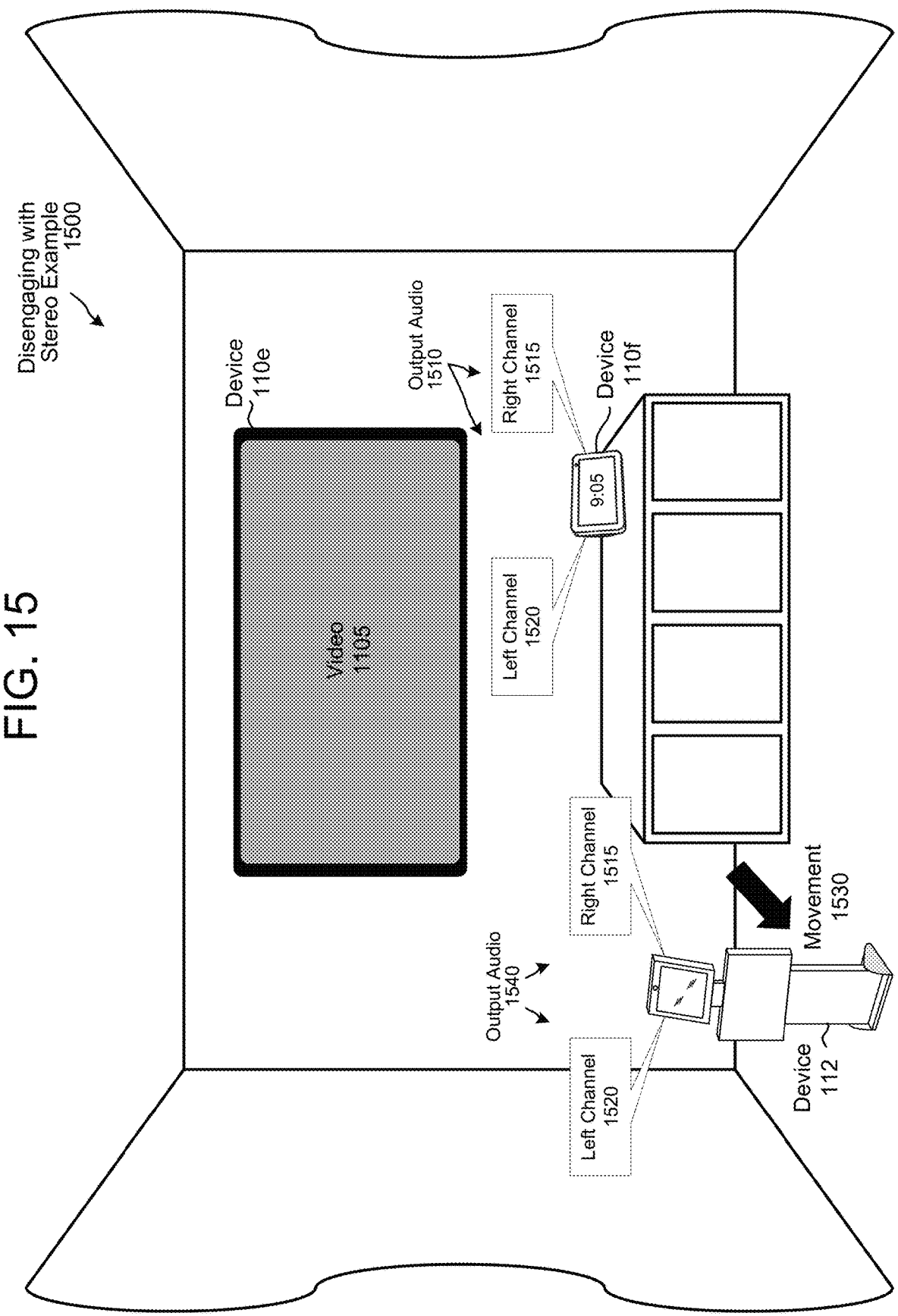

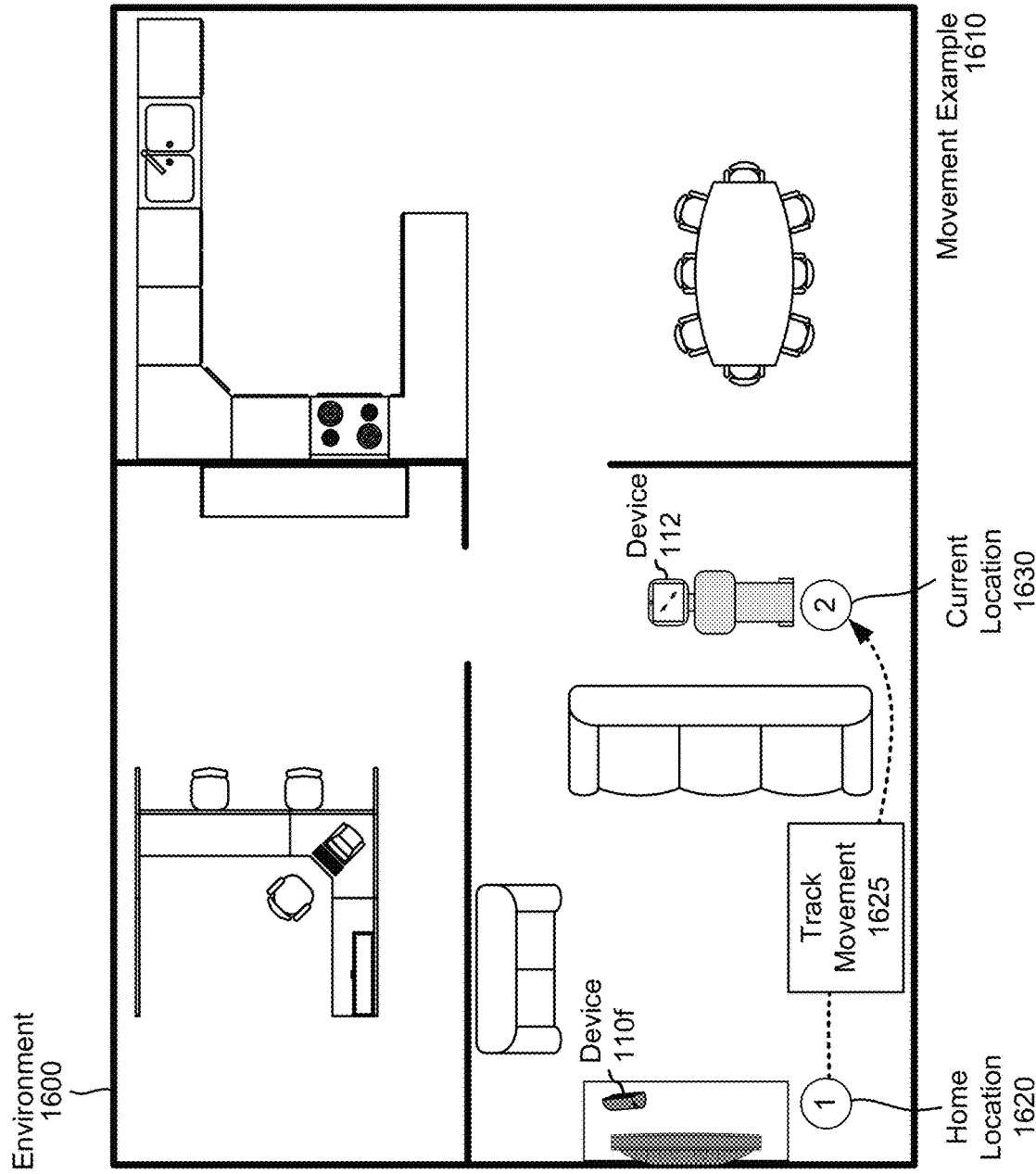

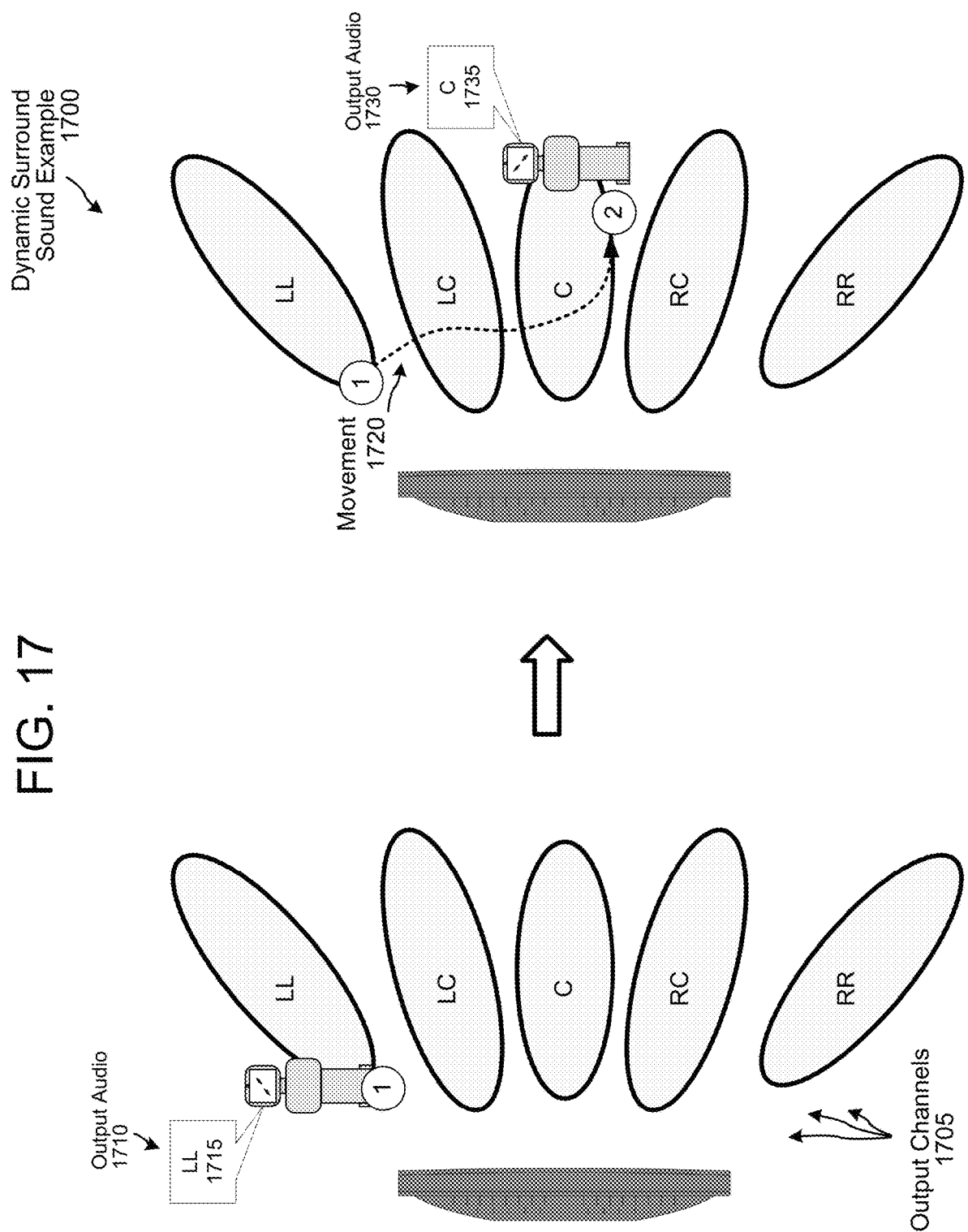

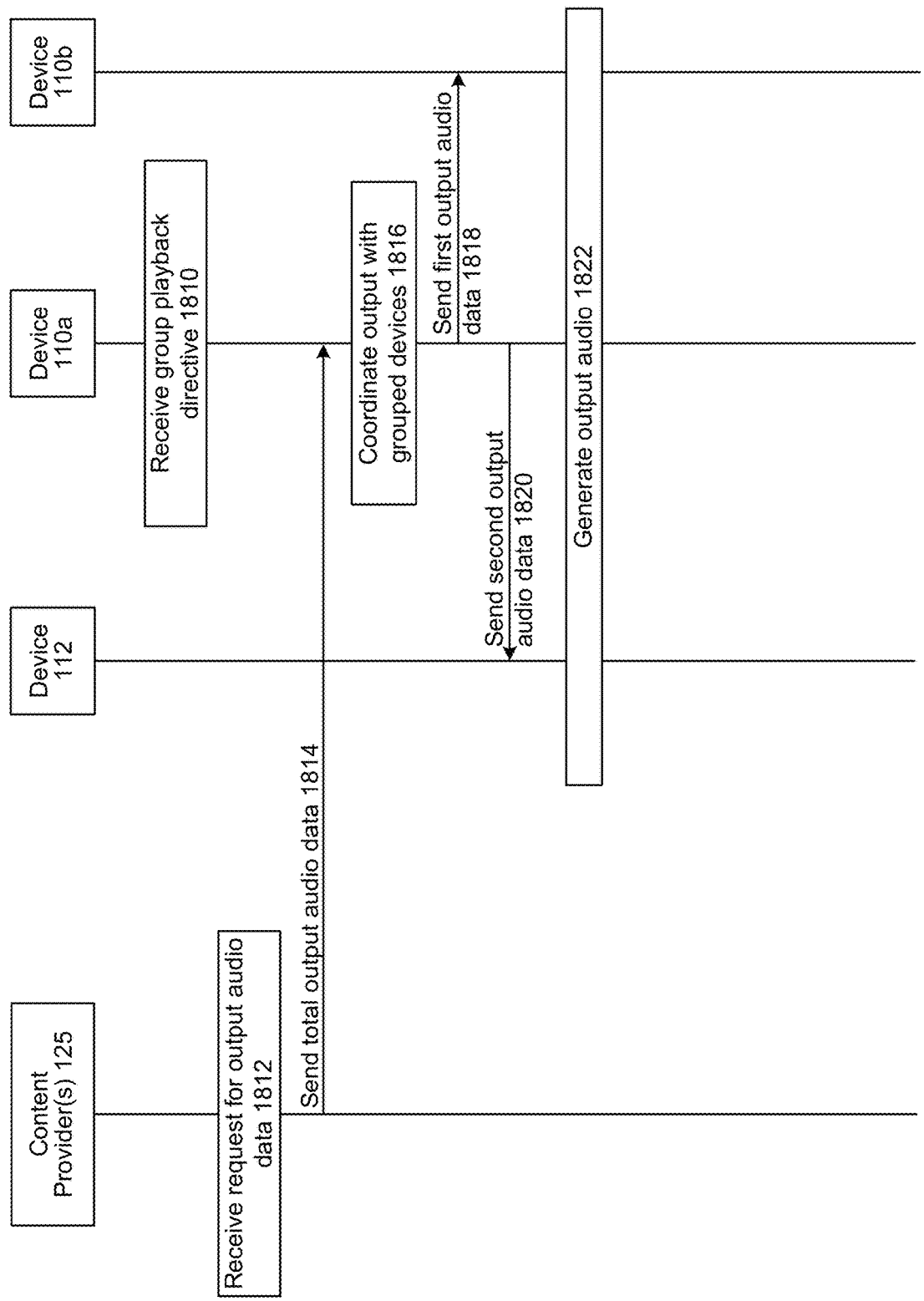

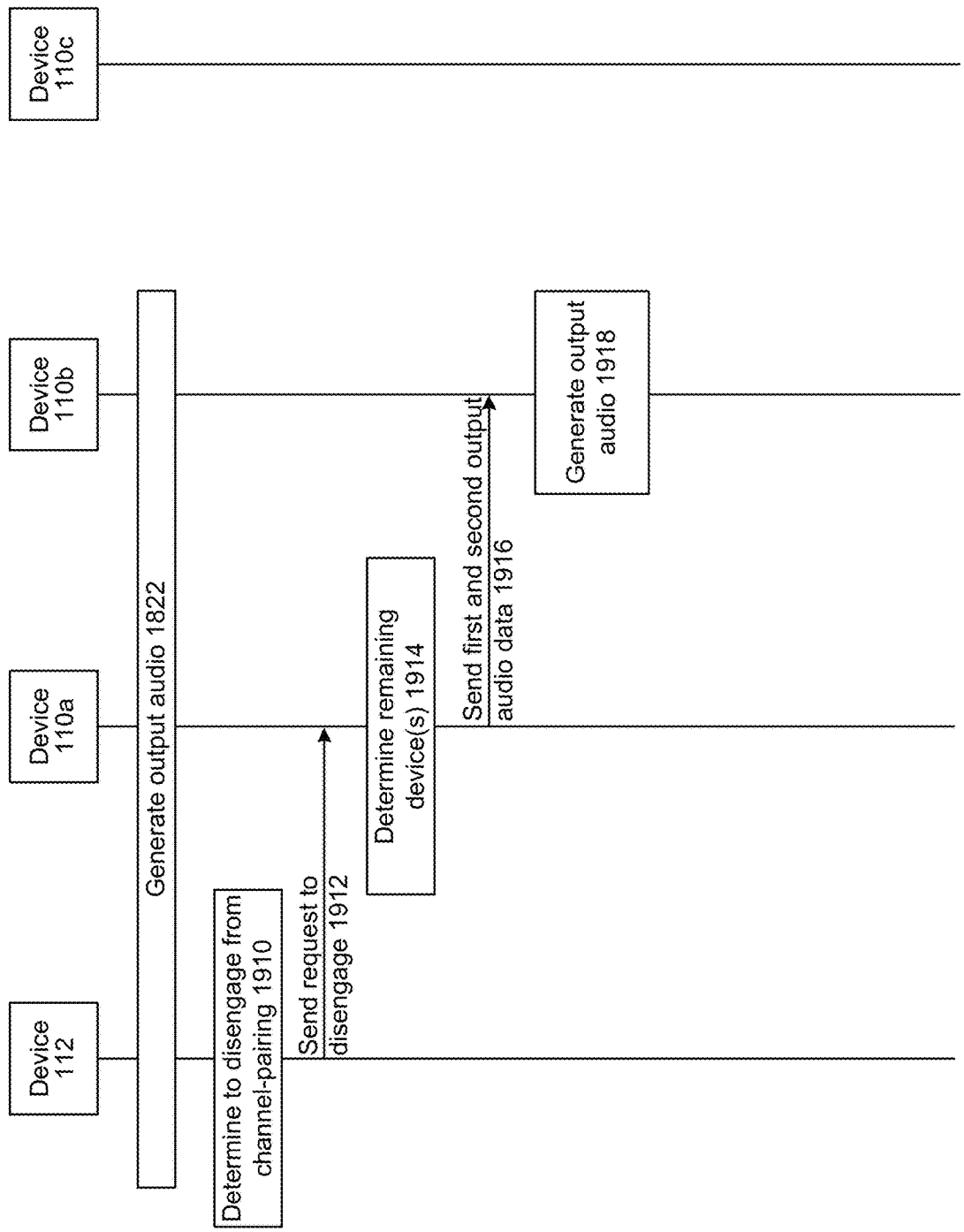

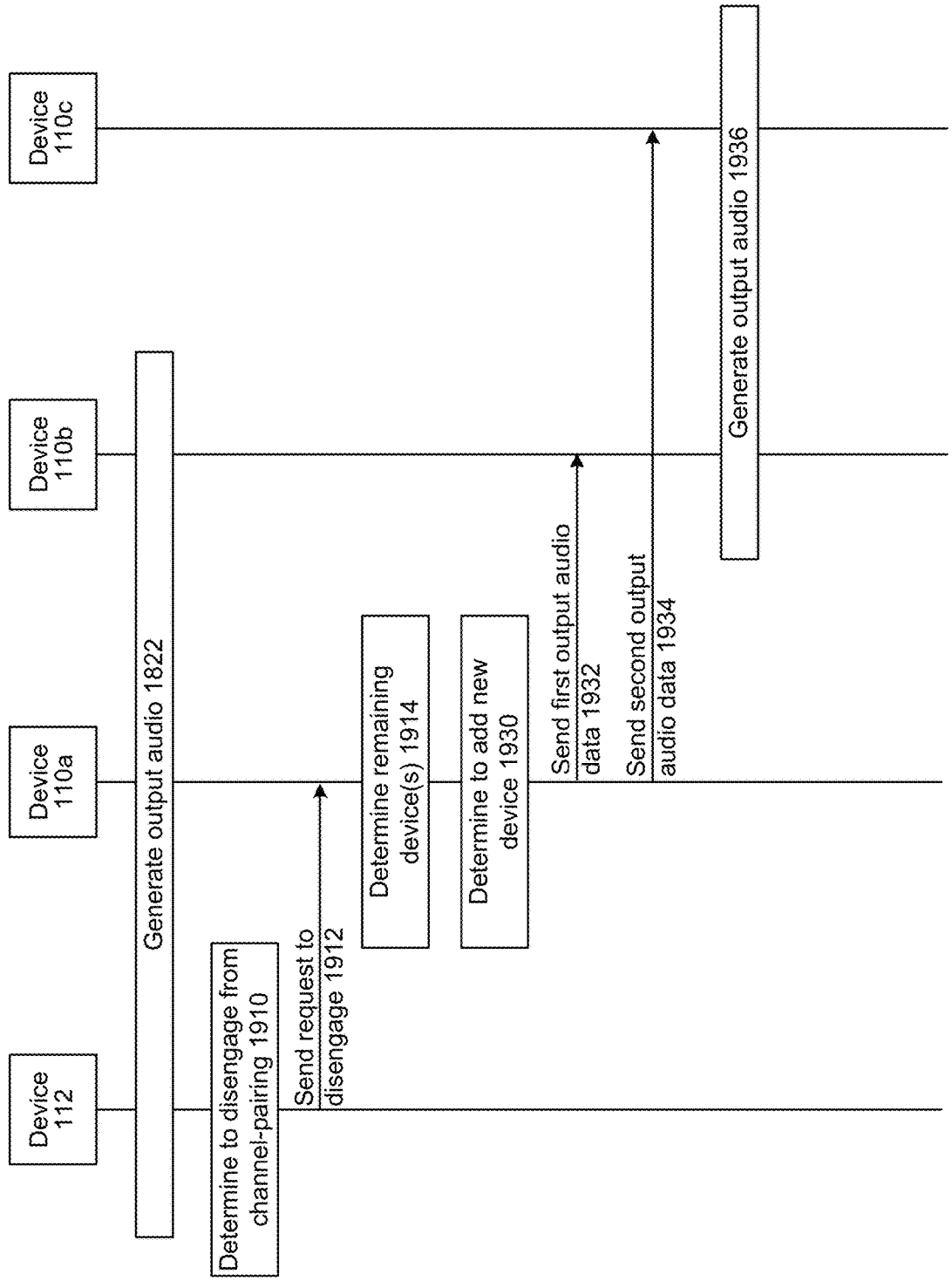

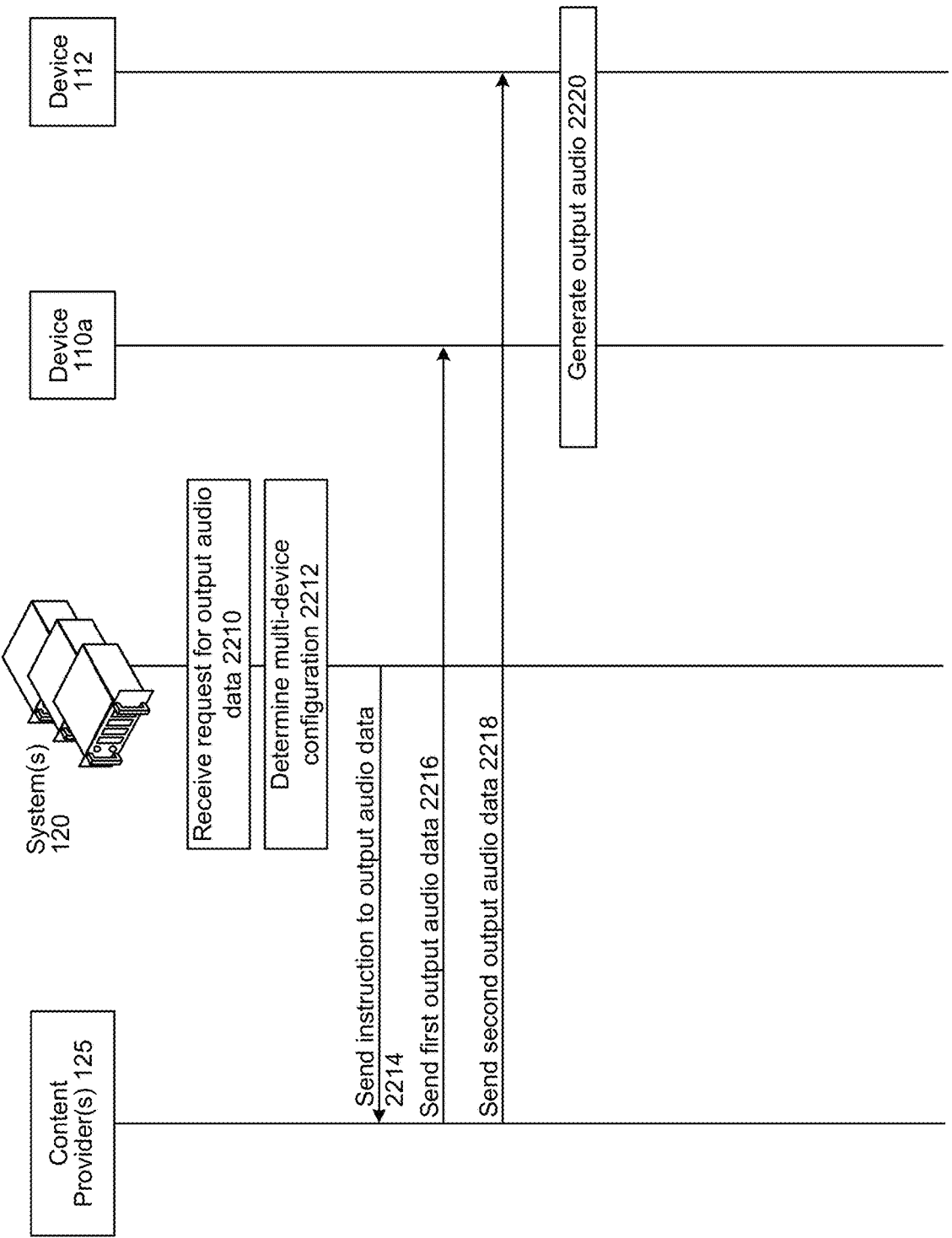

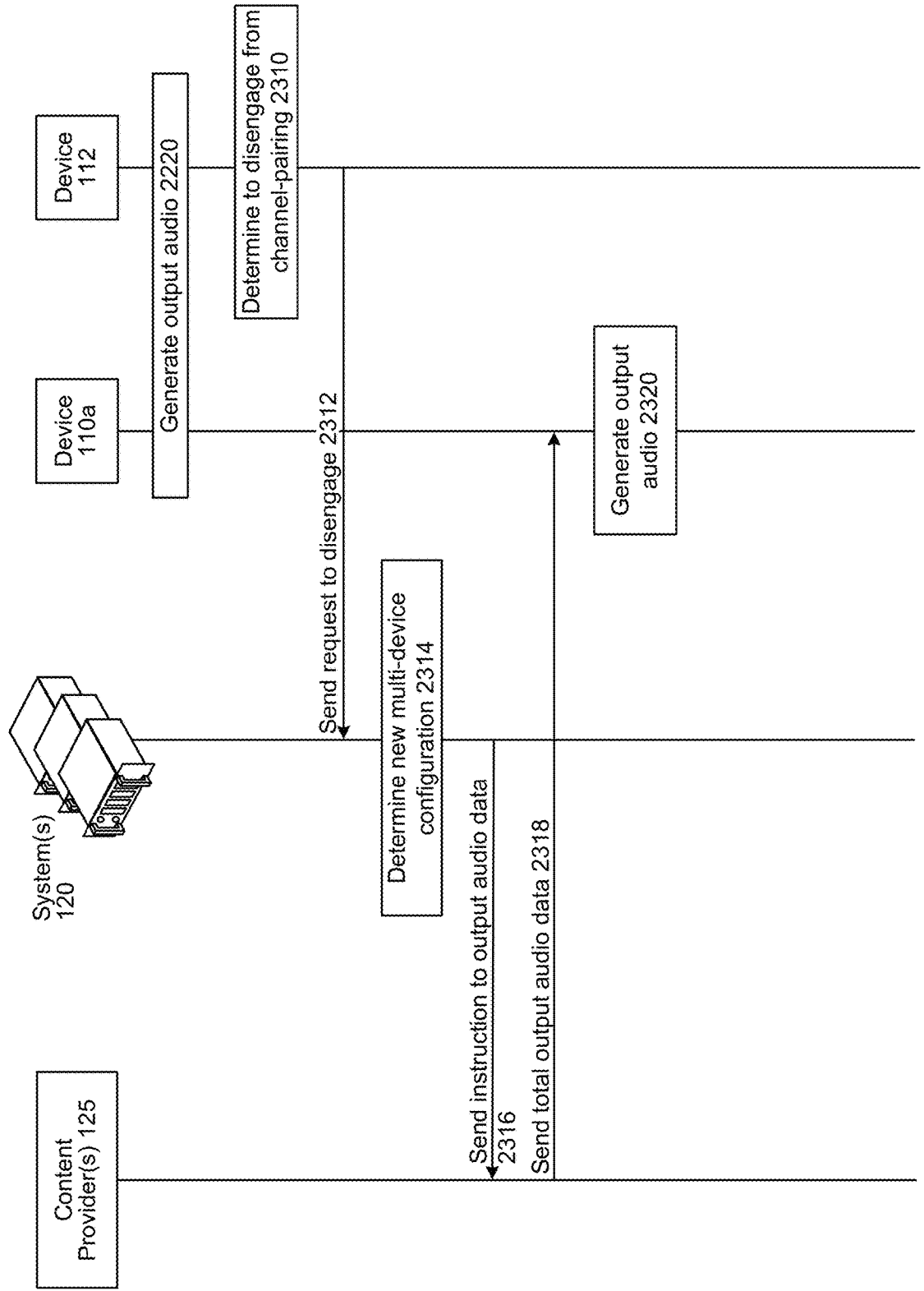

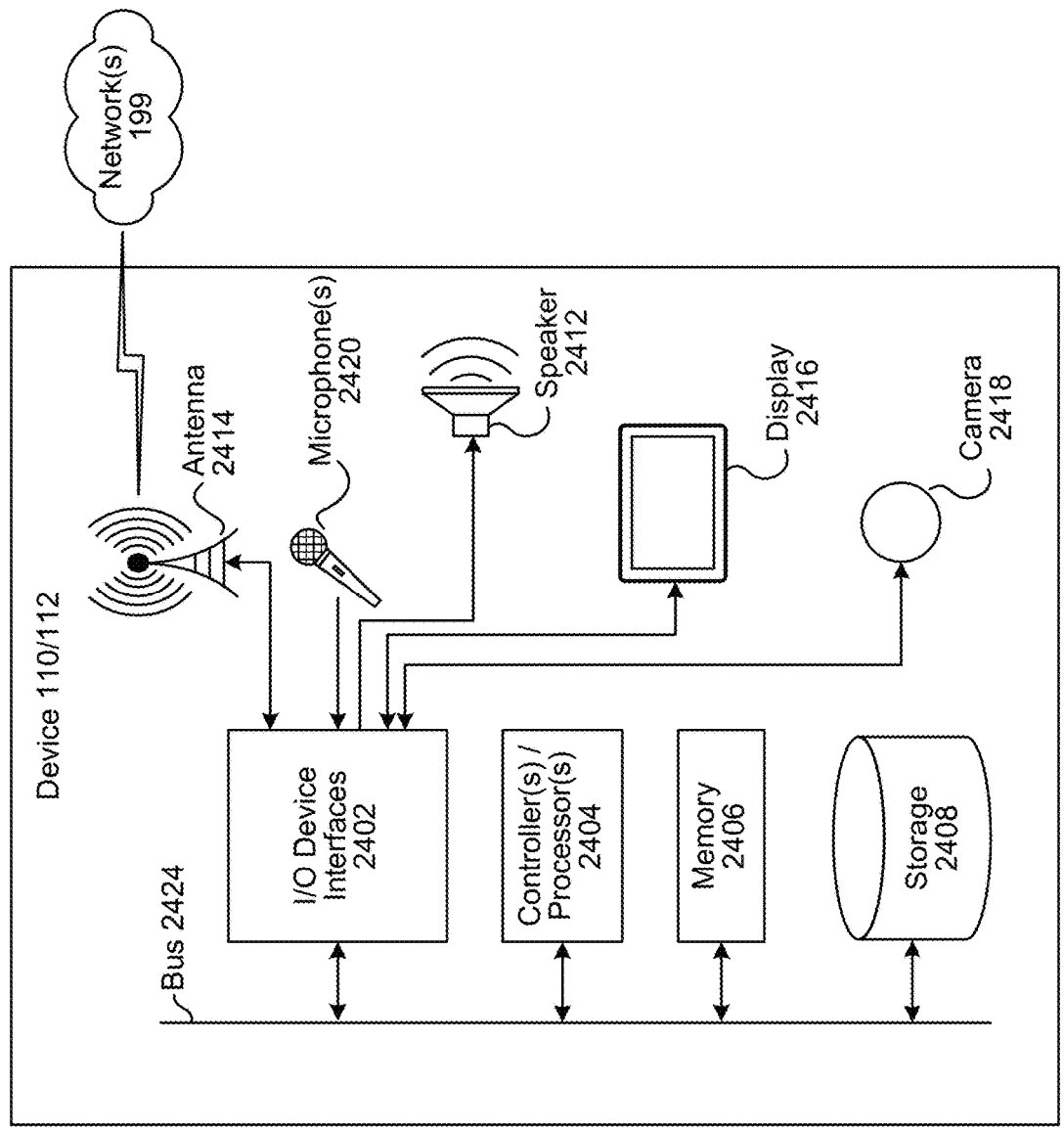

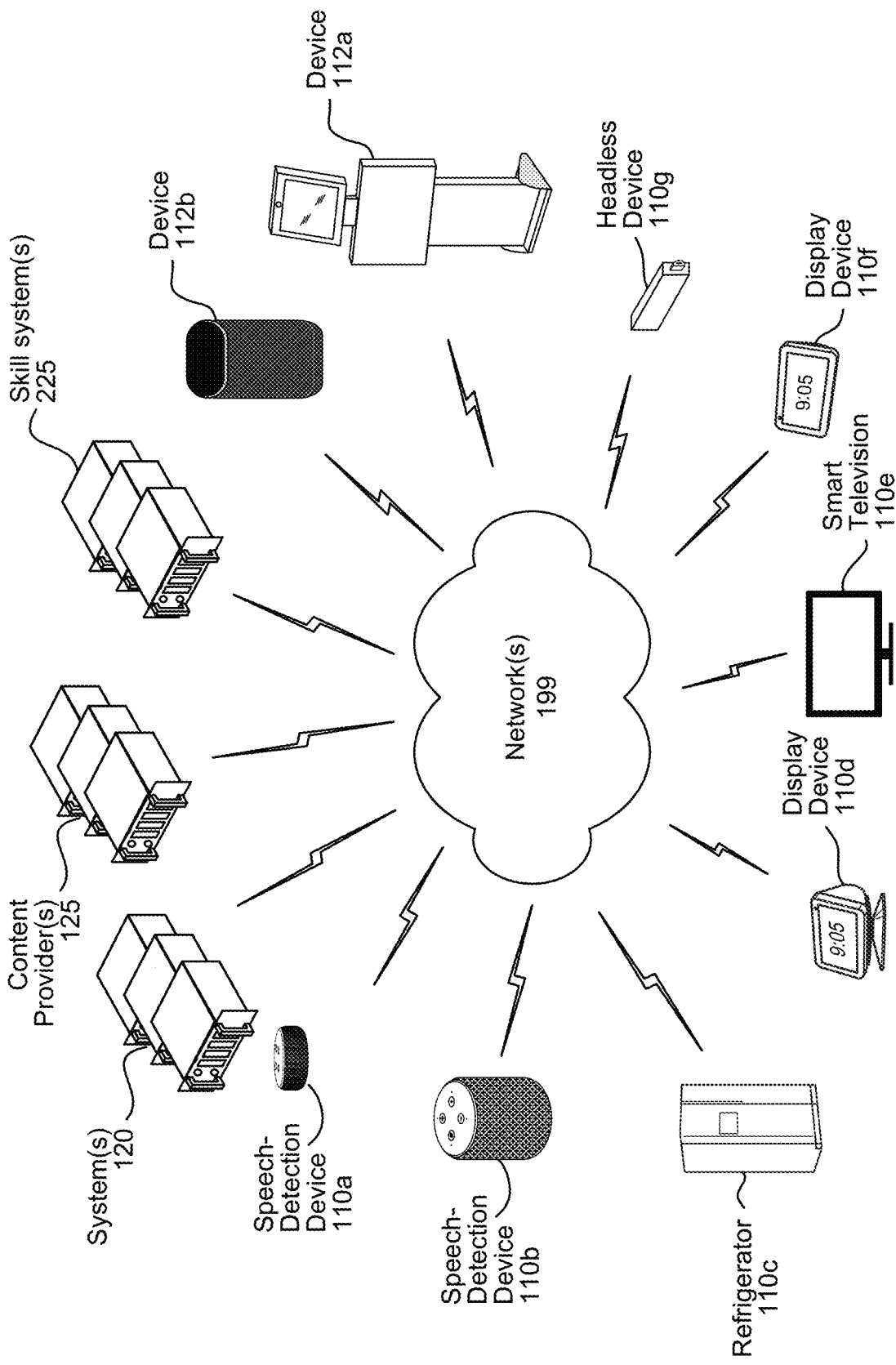

AUDIO OUTPUT CONFIGURATION FOR MOVING DEVICES

BACKGROUND

With the advancement of technology, the use and popularity of electronic devices has increased considerably. Electronic devices are commonly used to capture and send audio data, generate output audio, and/or perform actions corresponding to input commands.

BRIEF DESCRIPTION OF DRAWINGS

For a more complete understanding of the present disclosure, reference is now made to the following description taken in conjunction with the accompanying drawings.

FIGS. 5A-5B illustrate examples of a building with multiple devices, along with output capabilities associated with the devices, according to embodiments of the present disclosure.

FIGS. 6A-6D illustrate examples of acoustic regions and channel-paired configurations according to embodiments of the present disclosure.

FIG. 7 illustrates an example of a main-follower configuration for generating synchronized output audio according to embodiments of the present disclosure.

FIG. 15 illustrates an example of a motile device switching from a channel-paired configuration to a device-paired configuration according to embodiments of the present disclosure.

FIGS. 16A-16B illustrate examples of movable devices disengaging from a channel-paired configuration based on tracking a location of the device or detecting movement of the device according to embodiments of the present disclosure.

FIG. 17 illustrates an example of dynamic surround sound using a motile device according to embodiments of the present disclosure.

FIG. 18 is a communication diagram illustrating an example of generating synchronized output using multiple devices according to embodiments of the present disclosure.

FIGS. 19A-19B are communication diagrams illustrating examples of disengaging a channel-paired configuration according to embodiments of the present disclosure.

FIG. 22 is a communication diagram illustrating an example of generating synchronized output using multiple devices according to embodiments of the present disclosure.

FIGS. 23A-23B are communication diagrams illustrating examples of disengaging a channel-paired configuration according to embodiments of the present disclosure.

FIG. 24 is a block diagram conceptually illustrating example components of a device according to embodiments of the present disclosure.

FIG. 26 illustrates an example of a computer network for use with a speech processing system.

DETAILED DESCRIPTION

Electronic devices are commonly used to interact with a user by capturing audio data and/or other input data to determine input commands. A system may be configured to receive user speech, process the speech to determine a requested action (e.g., operation to be performed or content to be output), and perform the action. For example, a user may say "Alexa, play Mozart" and, in response, the system may output music composed by Mozart to the user. In some cases, the user may request to receive an output via multiple devices, and the system may be configured to provide the output via the multiple devices in a synchronous manner. For example, a user may say "Alexa play music on all my kitchen devices," and the system may determine a group of devices that are to output music, where the group includes devices associated with the user's profile and located in the user's kitchen. In other cases, the user may have previously specified a pair of devices or a group of devices that are to provide output (e.g., audio output) in a synchronous manner. For example, a user may have defined a group of devices to include a first device corresponding to a first channel and a second device corresponding to a second channel, and the system can cause the first device and the second device to provide a synchronous output.

To improve a user experience, the present disclosure improves such systems by providing a mechanism for recalibrating a multi-device output configuration for mobile, motile, or other type of movable devices. For example, when playing a movie for a user, a system can output a left channel of output audio using a stationary device and output a right channel of output audio using a motile device (e.g., smart robot). If the user requests that the robot perform a task, the robot will stop generating output audio and move away from the television, while the system recalibrates the audio configuration to continue playing the audio from the remaining speaker (e.g., all channels out of the stationary device, replace the robot with another device to generate the right channel of output audio, etc.). When the robot completes the task, it may return to its prior location and, in response, the system can reconfigure the audio output devices so that the robot resumes outputting the right channel of output audio with the stationary device outputting the left channel. In some examples, the system can recalibrate the multi-device output configuration for multiple channels, such as a 5.1 surround sound system, a 7.1 surround sound system, and/or the like. In addition, the system can recalibrate the multi-device output configuration for any moveable device when the system detects that a device has moved out of an audio output group. Thus, the system outputs audio in a synchronous manner using a multi-device output configuration and can recalibrate the multi-device output configuration based on movement of the devices.

Figure 1:
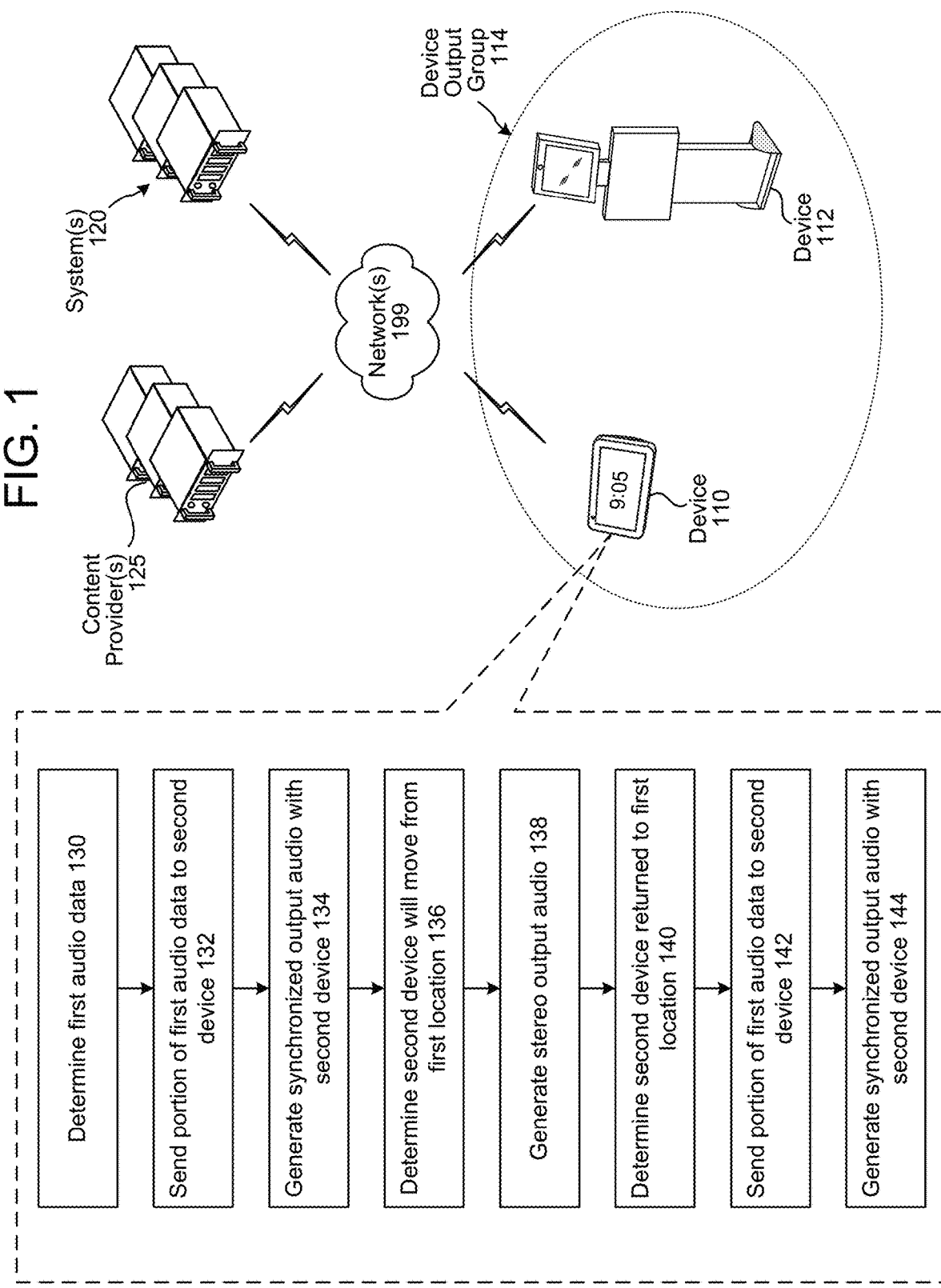
FIG. 1 illustrates a system configured to perform audio system recalibration for moving devices according to embodiments of the present disclosure.

FIG. 1 illustrates a system configured to perform audio system recalibration for moving devices according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device output group including two or more devices 110/112, one or more system(s) 120, and/or content provider(s) 125 connected across one or more network(s) 199. In some examples, the system(s) 120 and/or content provider(s) 125 may be associated with a first location that is remote from a second location associated with the devices 110/112. Thus, the devices 110/112 may communicate with the system(s) 120 and/or content provider(s) 125 using a plurality of different networks. However, the disclosure is not limited thereto and in some examples, the system(s) 120 and/or content provider(s) 125 may be associated with the second location in proximity to the devices 110/112 without departing from the disclosure. For example, the system(s) 120 and/or content provider(s) 125 may correspond to a home server and the device 110/112 may communicate with the system(s) 120 and/or content provider(s) 125 using a single local area network (LAN) or wireless local area network (WLAN). The operations are generally described herein as being performed by the device 110/112. However, it should be understood that one or more of the operations may also be performed by the system(s) 120 without departing from the disclosure.

As illustrated in FIG. 1, a device output group 114 may include a first device 110 (e.g., speech-enabled device) and a second device 112 (e.g., motile device, autonomously motile device, etc.) that may communicate with system(s) 120 using one or more network(s) 199. As used herein, an autonomously motile device may refer to a device that is configured to move itself from one location to another, although the disclosure is not limited thereto and the second device 112 may be any moveable device without departing from the disclosure. A user may interact with the devices 110/112 and/or the system(s) 120, such as requesting that the device 110/112 and/or the system(s) 120 perform an action. Additionally or alternatively, the second device 112 may interact with the user, such as following the user and/or performing tasks requested by the user.

In some examples, the first device 110 may be a speech-enabled device and may detect audio 11 spoken by the user. The first device 110 may determine that the audio 11 includes a wakeword and may then send audio data corresponding to the audio 11 to the system(s) 120. The system(s) 120 may receive the audio data from the first device 110 and process the audio data, for example using speech processing such as automatic speech recognition (ASR) processing, natural language understanding (NLU) processing, and/or the like, to determine that the audio data represents a request to perform an action. The system(s) 120 may perform the action and/or send a command to another device 110/112 to perform the action. Additionally or alternatively, the user may provide input data other than audio data without departing from the disclosure. Although FIG. 1 illustrates a single example of the first device 110 and the second device 112, many other devices may be used without departing from the disclosure, such as a smartphone, television, computer, appliance, or other device depending on system configuration.

The device output group 114 may be configured to provide a synchronous output between multiple devices 110/112. For example, the device output group 114 may correspond to a multi-device output configuration and the system(s) 120 may cause the first device 110 and the second device 112 to provide a synchronous output. In some examples, the device output group 114 may correspond to dual-device stereo output, such that the first device 110 outputs a left channel of stereo audio and the device 112 outputs a right channel of stereo audio.

As illustrated in FIG. 1, the second device 112 is motile (e.g., capable of motion), although the disclosure is not limited thereto. Thus, the second device 112 may perform an action by moving towards the user, relative to the user, and/or the like without departing from the disclosure. For example, the second device 112 may be at a first location and may move to a second location of the user to perform the action for the user. In some examples, the second device 112 may determine a location of the second device 112 and/or the user using sensor data (e.g., location sensor data, such as Global Positioning System (GPS) data), wireless signals (e.g., (Ultra)-Sound signals, Bluetooth, etc.), wireless network data (e.g., wireless communication networks in range, such as WiFi, Long Term Evolution (LTE) network, WiMAX network, 3G network, 4G network, 5G network, etc.), audio processing (e.g., beamforming relative to other devices), image processing (e.g., object recognition and/or the like), and/or a combination thereof without departing from the disclosure.

Additionally or alternatively, the second device 112 may determine a location of the user relative to the second device 112 by remotely sensing (e.g., directly observing) the user using various techniques known to one of skill in the art, including sound localization (e.g., audio beamforming), audio processing (e.g., speech recognition), image processing (e.g., facial recognition, object recognition, and/or the like), sensor data (e.g., sensors configured to detect human presence, measure distance(s), and/or the like), and/or the like without departing from the disclosure.

While FIG. 1 illustrates an example of the second device 112 being a motile device, the disclosure is not limited thereto. Instead, the second device 112 may be any movable device that may be moved from one room to another without departing from the disclosure. In some examples, the second device 112 may be a portable device, such as a portable loudspeaker. However, the disclosure is not limited thereto, and the second device 112 may be any device configured to detect motion and/or movement of the second device 112. As used herein, devices 110 refer to stationary devices that are associated with a single location, whereas devices 112 refer to movable devices that can detect motion and/or movement. In some examples, a device 110 may move from a first location to a second location and the same techniques described below may be used to recalibrate multi-device output groups accordingly.

As illustrated in FIG. 1, the system(s) 120 may determine that the first device 110 is associated with a group of devices configured to provide a synchronous audio output (e.g., in a multi-device configuration). For example, the first device 110 may be associated with the device output group 114 that includes the second device 112. The system(s) 120 may determine that output data/audio data is to be presented in a group device playback mode using the device output group 114. Details on how the system(s) 120 may determine that output is to be provided via a multi-device configuration are described below in connection to a multi-device output component 265 shown in FIG. 2.

As illustrated in FIG. 1, the first device 110 may determine (130) first audio data. As used herein, determining the first audio data may correspond to receiving the first audio data from a remote device (e.g., the content provider(s) 125, the remote system(s) 120, and/or a different component, such as a storage device connected via the network(s) 199) or retrieving the first audio data from a storage component of the first device 110 without departing from the disclosure. The first device 110 may send (132) a portion of the first audio data to the second device 112 and may generate (134) synchronized output audio with the second device. For example, the first device 110 may generate a first portion of the output audio corresponding to a first channel (e.g., left channel), while the second device 112 may generate a second portion of the output audio corresponding to a second channel (e.g., right channel).

The first device 110 may determine (136) that the second device 112 will move from the first location. For example, the second device 112 may receive a command to perform a task and may send an indication (e.g., notification data) to the first device 110 notifying the first device 110 that the second device 112 will leave the first location. Additionally or alternatively, the second device 112 may detect motion and/or movement and send an indication (e.g., notification data) to the first device 110 indicating that the motion and/or movement was detected.

As the output audio may not be synchronized if the second device 112 is not at the first location, the first device 110 may recalibrate the multi-device configuration to remove the second device 112. For example, the first device 110 may generate (138) stereo output audio, such as by generating a first portion of the output audio using a first loudspeaker of the first device 110 and generating a second portion of the output audio using a second loudspeaker of the first device 110. However, the disclosure is not limited thereto, and the first device 110 may modify the multi-device configuration using other techniques, as described in greater detail below.

After performing the task, the second device 112 may return to the first location. Thus, the first device 110 may determine (140) that the second device 112 returned to the first location and may recalibrate the multi-device configuration to include the second device 112 again. As illustrated in FIG. 1, the first device 110 may send (142) a portion of the first audio data to the second device and may generate (144) synchronized output audio with the second device 112. Thus, the system 100 may recalibrate the multi-device configuration based on a location of the second device 112.

The overall system of the present disclosure may operate using various components as illustrated below. The various components may be located on same or different physical devices. Communication between various components may occur directly or across a network(s) 199.

Figure 2:
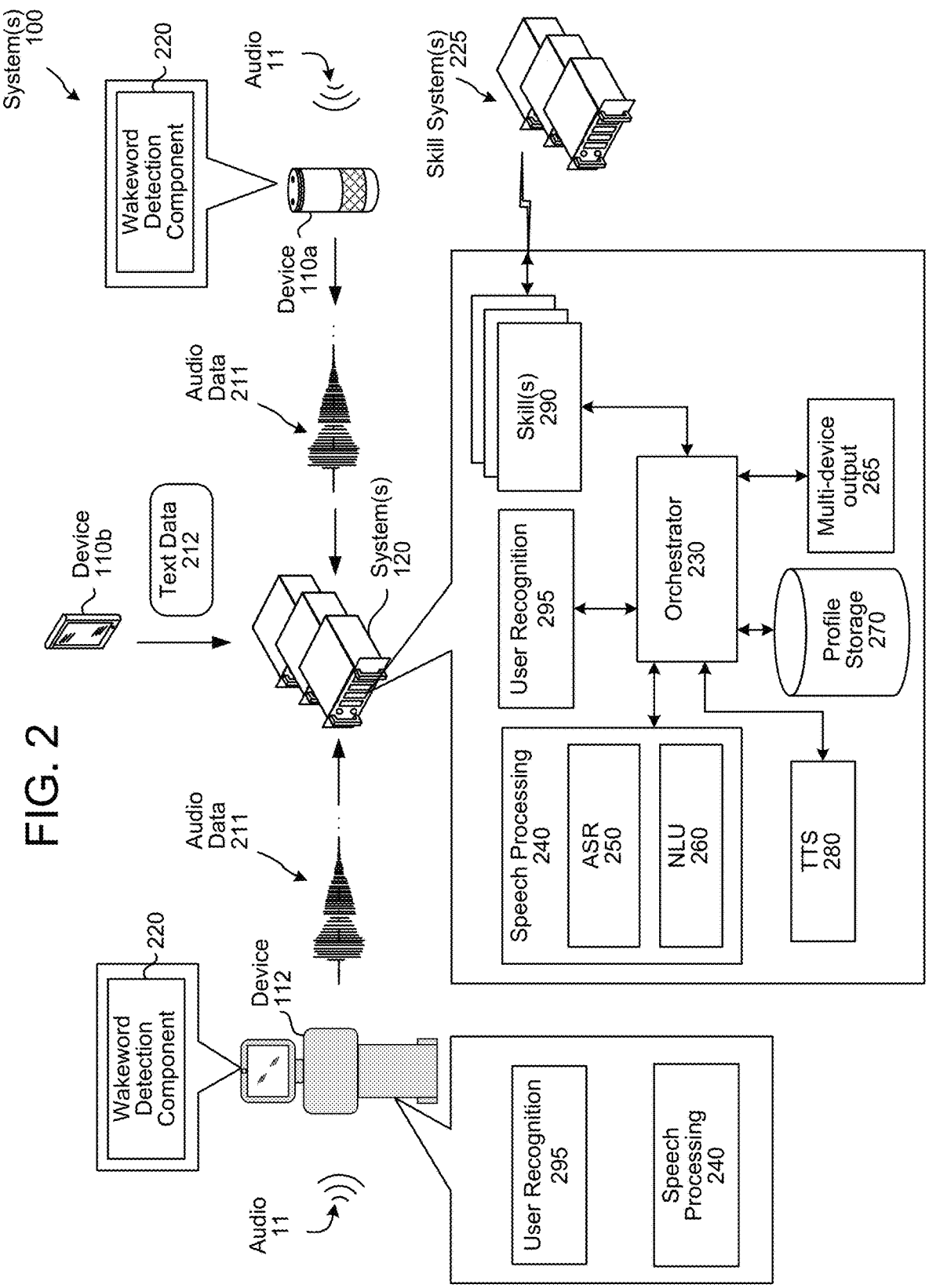
FIG. 2 is a conceptual diagram of speech processing components of a system according to embodiments of the present disclosure.

As shown in FIG. 2, an audio capture component(s), such as a microphone or array of microphones of a device 110/112, captures audio 11. The device 110/112 processes audio data, representing the audio 11, to determine whether speech is detected. The device 110/112 may use various techniques to determine whether audio data includes speech. In some examples, the device 110/112 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110/112 may implement a limited classifier configured to distinguish speech from background noise. The classifier may be implemented by techniques such as linear classifiers, support vector machines, and decision trees. In still other examples, the device 110/112 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110/112 may use a wakeword detection component 220 to perform wakeword detection to determine when a user intends to speak an input to the device 110/112. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110/112 may "wake" and begin transmitting audio data 211, representing the audio 11, to the system(s) 120. The audio data 211 may include data corresponding to the wakeword, or the portion of the audio corresponding to the wakeword may be removed by the device 110/112 prior to sending the audio data 211 to the system(s) 120. In some embodiments, the device 110/112 may begin transmitting audio data 211 to system(s) 120 (or otherwise performing further processing on audio data) in response to an event occurring or an event being detected by the device 110/112.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the audio data 211 to a speech processing component 240. An ASR component 250 of the speech processing component 240 may perform speech processing to generate speech processing output data, which may be referred to as lexical data. In some examples, the lexical data may correspond to text data that includes text representing speech contained in the input audio data 211. However, the disclosure is not limited thereto and the lexical data may also correspond to token data that includes tokens that represent sounds, words, phrases, and/or the like corresponding to the speech. Thus, the lexical data may correspond to text data, token data, and/or other data known to one of skill in the art without departing from the disclosure. For ease of illustration, the disclosure may refer to the lexical data (e.g., speech processing output data) as text data, although the disclosure is not limited thereto.

To illustrate an example, the ASR component 250 may transcribe the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

In some examples, the device 110/112 may receive a typed natural language input. The device 110/112 may generate text data 212 representing the typed natural language input. This is illustrated in FIG. 2 as a device 110b (e.g., smart phone) generating text data 212, although the disclosure is not limited thereto. The device 110b may send the text data 212 to the system(s) 120, wherein the text data 212 is received by the orchestrator component 230. However, the disclosure is not limited thereto and in other examples, the device 110b may send audio data 211 to the system(s) 120 as described above with regard to device 110a without departing from the disclosure.

The orchestrator component 230 may send text data (e.g., text data output by the ASR component 250 or the received text data 212) to an NLU component 260.

The NLU component 260 receives the ASR hypothesis/hypotheses (i.e., lexical data, text data, etc.) and attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110/112, the system(s) 120, a skill 290, skill system(s) 225, etc.) to execute the intent. For example, if the text data corresponds to "play Mozart," the NLU component 260 may determine an intent that the system(s) 120 output music and may identify "Mozart" as an artist. For further example, if the text data corresponds to "what is the weather," the NLU component 260 may determine an intent that the system(s) 120 output weather information associated with a geographic location of the device 110/112. In another example, if the text data corresponds to "turn off the lights," the NLU component 260 may determine an intent that the system(s) 120 turn off lights associated with the device(s) 110/112 or the user(s).

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

As described above, the system(s) 120 may perform speech processing using two different components (e.g., the ASR component 250 and the NLU component 260). One skilled in the art will appreciate that the system(s) 120, in at least some examples, may implement a spoken language understanding (SLU) component (not illustrated) that is configured to process audio data 211 to generate NLU results data without departing from the disclosure.

In some examples, the SLU component may be equivalent to the ASR component 250 and the NLU component 260. While the SLU component may be equivalent to a combination of the ASR component 250 and the NLU component 260, the SLU component may process audio data 211 and directly generate the NLU results data, without an intermediate step of generating text data (as does the ASR component 250). As such, the SLU component may take audio data 211 representing speech and attempt to make a semantic interpretation of the speech. That is, the SLU component may determine a meaning associated with the speech and then implement that meaning. For example, the SLU component may interpret audio data 211 representing speech from the user in order to derive a desired action. In some examples, the SLU component outputs a most likely NLU hypothesis, or multiple NLU hypotheses in the form of a lattice or an N-best list with individual NLU hypotheses corresponding to confidence scores or other scores (such as probability scores, etc.).

The orchestrator component 230 may send the NLU results to an associated skill component 290. If the NLU results include multiple NLU hypotheses, the orchestrator component 230 may send a portion of the NLU results corresponding to the top scoring NLU hypothesis to a skill component 290 associated with the top scoring NLU hypothesis.

A "skill" or "skill component" may be software running on the system(s) 120 that is akin to a software application running on a traditional computing device. That is, a skill component 290 may enable the system(s) 120 to execute specific functionality in order to perform one or more actions (e.g., provide information to a user, display content to a user, output music, or perform some other requested action). The system(s) 120 may be configured with more than one skill component 290. For example, a weather skill component may enable the system(s) 120 to provide weather information, a ride sharing skill component may enable the system(s) 120 to schedule a trip with respect to a ride sharing service, a restaurant skill component may enable the system(s) 120 to order food with respect to a restaurant's online ordering system, a communications skill component may enable the system to perform messaging or multi-endpoint communications, etc. A skill component 290 may operate in conjunction between the system(s) 120 and other devices such as the device 110/112 or skill system(s) 225 in order to complete certain functions. Inputs to a skill component 290 may come from various interactions and input sources.

The functionality described herein as a skill or skill component may be referred to using many different terms, such as an action, bot, app, application, speechlet or the like. A skill component 290 may include hardware, software, firmware, or the like that may be dedicated to the particular skill component 290 or shared among different skill components 290. A skill component 290 may be part of the system(s) 120 (as illustrated in FIG. 2) or may be located at whole (or in part) with one or more separate systems. Unless expressly stated otherwise, reference to a skill, skill device, or skill component may include a skill component operating within the system(s) 120 (for example as skill component 290) and/or skill component operating within a system separate from the system(s) 120.

A skill component 290 may be configured to perform one or more actions. A skill may enable a skill component 290 to execute specific functionality in order to provide data or produce some other output requested by a user. A particular skill component 290 may be configured to execute more than one skill. For example, a weather skill may involve a weather skill component providing weather information to the system(s) 120, a ride sharing skill may involve a ride sharing skill component scheduling a trip with respect to a ride sharing service, an order pizza skill may involve a restaurant skill component ordering pizza with respect to a restaurant's online ordering system, etc.

A skill component 290 may implement different types of skills and may optionally be in communication with one or more skill system(s) 225. The skill system(s) 225 may each correspond to a particular skill component 290 and may be capable of performing operations to ultimately execute an action. Types of skills include home automation skills (e.g., skills that enable a user to control home devices such as lights, door locks, cameras, thermostats, etc.), entertainment device skills (e.g., skills that enable a user to control entertainment devices such as smart TVs), video skills, flash briefing skills, gaming skills, as well as custom skills that are not associated with any pre-configured type of skill. In some instances, skill component(s) 290 or a skill system(s) 225 may provide output text data responsive to the present user command.

The system(s) 120 may communicate with one or more skill systems 225. A skill system 225 may be configured to execute with respect to NLU results data. For example, for NLU results data including a <GetWeather> intent, a weather skill system may determine weather information for a geographic location represented in a user profile or corresponding to a location of the device 110/112 that captured a corresponding natural language input. For further example, for NLU results data including a <BookRide> intent, a taxi skill system may book a requested ride. In another example, for NLU results data including a <BuyPizza> intent, a restaurant skill system may place an order for a pizza. A skill system 225 may operate in conjunction between the system(s) 120 and other devices, such as the device 110/112, in order to complete certain functions. Inputs to a skill system 225 may come from speech processing interactions or through other interactions or input sources.

A skill system 225 may be associated with a domain. A non-limiting list of illustrative domains includes a smart home domain, a music domain, a video domain, a flash briefing domain, a shopping domain, and/or a custom domain.

The system(s) 120 may be configured with a multi-device output component 265. The multi-device component 265 may be configured to determine when audio output is to be provided via multiple devices 110/112 in a synchronous manner. In some embodiments, the user may have defined a group of devices 110/112 that are to output audio (e.g., music, movie or TV audio, etc.) in a synchronous manner. The user may define/set up the group using a companion application via a mobile device 110 or other type of device 110/112. The devices 110/112 may be purchased together as a group (e.g., a stereo set, a surround system, home theatre system, etc.), and the multi-device output component 265 may determine the group based on the stereo/surround system configurations. For example, a group of devices 110/112 may include a right stereo speaker, a left stereo speaker and a subwoofer. In some cases, the user may want to listen to certain audio in an immersive experience, where the right and left stereo speakers and subwoofer output the audio synchronously.

In another example, a group of devices 110/112 may include a first device (e.g., a smart speaker), a second device (e.g., a display device with a speaker), a third device (e.g., another smart speaker), etc., and the user may want to receive audio via all the devices in the group. The multi-device output component 265 may determine which devices 110/112 associated with the user profile are included in such a group to output audio synchronously.

In some embodiments, the group of devices 110/112 may include devices corresponding to a 5.1 surround sound system or a 7.1 surround sound system. A 5.1 surround sound system may be a six-channel system using five full bandwidth channels and one low-frequency effects channel. A 7.1 surround sound system may be an eight-channel system using seven full bandwidth channels and one low-frequency effects channel.

As used herein, devices providing output "synchronously" may refer to in some cases the devices providing output "simultaneously", and in other cases the devices may not provide an output "simultaneously." For example, in a surround sound system, a rear-left channel may output audio at a different time than a front-right output channel depending on the song/soundtrack or other output content, etc.

In some embodiments, the multi-device output component 265 may determine a main device 110/112 that is to receive the audio data for output. The orchestrator 230 may send the audio data to the selected/determined main device 110/112, and the main device 110/112 may distribute/provide the audio data to the other devices 110/112 in the group for output. The main device 110/112 may coordinate the audio output with the other devices 110/112 in the group so that the output is provided in a synchronous manner. For example, the right stereo speaker may be selected as the main device 110/112, the orchestrator 230 may send the output audio data to the right stereo speaker, and the right stereo speaker may send the output audio data to the left stereo speaker and the subwoofer for synchronous output. In some embodiments, the device 110/112 that received the user input is selected as the main device 110/112.

In some embodiments, the multi-device output component 265 may send a group device playback directive to the orchestrator 230 upon determination that the device 110/112 that captured the user input is associated with a group of devices 110/112 to provide a synchronous audio output. The orchestrator 230 may send the group device playback directive/instruction to the main device 110/112 causing the main device 110/112 to distribute the output audio data to the other devices 110/112 in the group. The orchestrator 230 may also send device identifiers or other identifying information for the devices 110/112 in the group that are to receive the audio output data for synchronously playback.

In some embodiments, the system(s) 120 may provide synchronous output of synthesized speech or other types of output via multiple devices 110/112, using the technique described above.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The device 110/112, the system(s) 120, and/or the skill system 225 may include profile storage 270 without departing from the disclosure. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information. Data of a profile may additionally or alternatively include information representing a preferred assistant to respond to natural language inputs corresponding to the profile.

The profile storage 270 may include one or more user profiles, with each user profile being associated with a different user identifier. Each user profile may include various user identifying information. Each user profile may also include preferences of the user and/or one or more device identifiers, representing one or more devices registered to the user. Each user profile may include identifiers of skill systems 225 that the user has enabled. When a user enables a skill system 225, the user is providing the system(s) 120 with permission to allow the skill system 225 to execute with respect to the user's natural language inputs. If a user does not enable a skill system 225, the system(s) 120 may not invoke the skill system 225 to execute with respect to the user's natural language inputs.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

In some examples, the device 112 may include a user recognition component 295 that recognizes one or more users using a variety of data. However, the disclosure is not limited thereto, and the system(s) 120 may include a user recognition component 295 instead of and/or in addition to the device 112 without departing from the disclosure. FIG. 2 illustrates both the device 112 and the system(s) 120 including the user recognition component 295, although the disclosure is not limited thereto. In at least some examples, the user recognition component 295 may be implemented as a skill system 225.

The user recognition component 295 may recognize one or more users using various data. The user recognition component 295 may take as input the audio data 211 and/or the text data 212. The user recognition component 295 may perform user recognition (e.g., user recognition processing)

by comparing speech characteristics, in the audio data 211, to stored speech characteristics of users. The user recognition component 295 may additionally or alternatively perform user recognition by comparing biometric data (e.g., fingerprint data, iris data, etc.), received by the system(s) 120 in correlation with a natural language input, to stored biometric data of users. The user recognition component 295 may additionally or alternatively perform user recognition by comparing image data (e.g., including a representation of at least a feature of a user), received by the system(s) 120 in correlation with a natural language input, with stored image data including representations of features of different users. The user recognition component 295 may perform other or additional user recognition processes, including those known in the art. For a particular natural language input, the user recognition component 295 may perform processing with respect to stored data of users associated with the device 110/112 that captured the natural language input.

The user recognition component 295 determines whether a natural language input originated from a particular user. For example, the user recognition component 295 may generate a first value representing a likelihood that a natural language input originated from a first user, a second value representing a likelihood that the natural language input originated from a second user, etc. The user recognition component 295 may also determine an overall confidence regarding the accuracy of user recognition operations.

The user recognition component 295 may output a single user identifier corresponding to the most likely user that originated the natural language input. Alternatively, the user recognition component 295 may output multiple user identifiers (e.g., in the form of an N-best list) with respective values representing likelihoods of respective users originating the natural language input. The output of the user recognition component 295 may be used to inform NLU processing, processing performed by a skill system 225, as well as processing performed by other components of the system(s) 120 and/or other systems.

While FIG. 2 illustrates the system(s) 120 including a speech processing component 240, the disclosure is not limited thereto and in some examples the device 110/112 may include a speech processing component 240 without departing from the disclosure. For example, the device 110/112 may perform basic speech processing locally, while the system(s) 120 may perform full speech processing remotely. However, the disclosure is not limited thereto and the device 110/112 may perform full speech processing locally without departing from the disclosure. Thus, the speech processing component 240 illustrated as part of the device 112 may be different from the speech processing component 240 included in the system(s) 120 without departing from the disclosure, although the disclosure is not limited thereto.

As described above, the system(s) 120 may be located at a first location associated with the device 110/112 and/or a second location that is not associated with the device 110/112 without departing from the disclosure. For example, the system(s) 120 may be a home server or other device connected to the device 110/112 via a local area network (LAN) without departing from the disclosure. Thus, performing speech processing remotely refers to any speech processing that is not performed by the device 110/112, even if the speech processing is performed by a device/server in close proximity to the device 110/112.

Additionally or alternatively, one of skill in the art would understand that the speech processing component 240 may include a spoken language understanding (SLU) component, in addition to and/or instead of the ASR component 250 and/or the NLU component 260, without departing from the disclosure.

Figure 3:
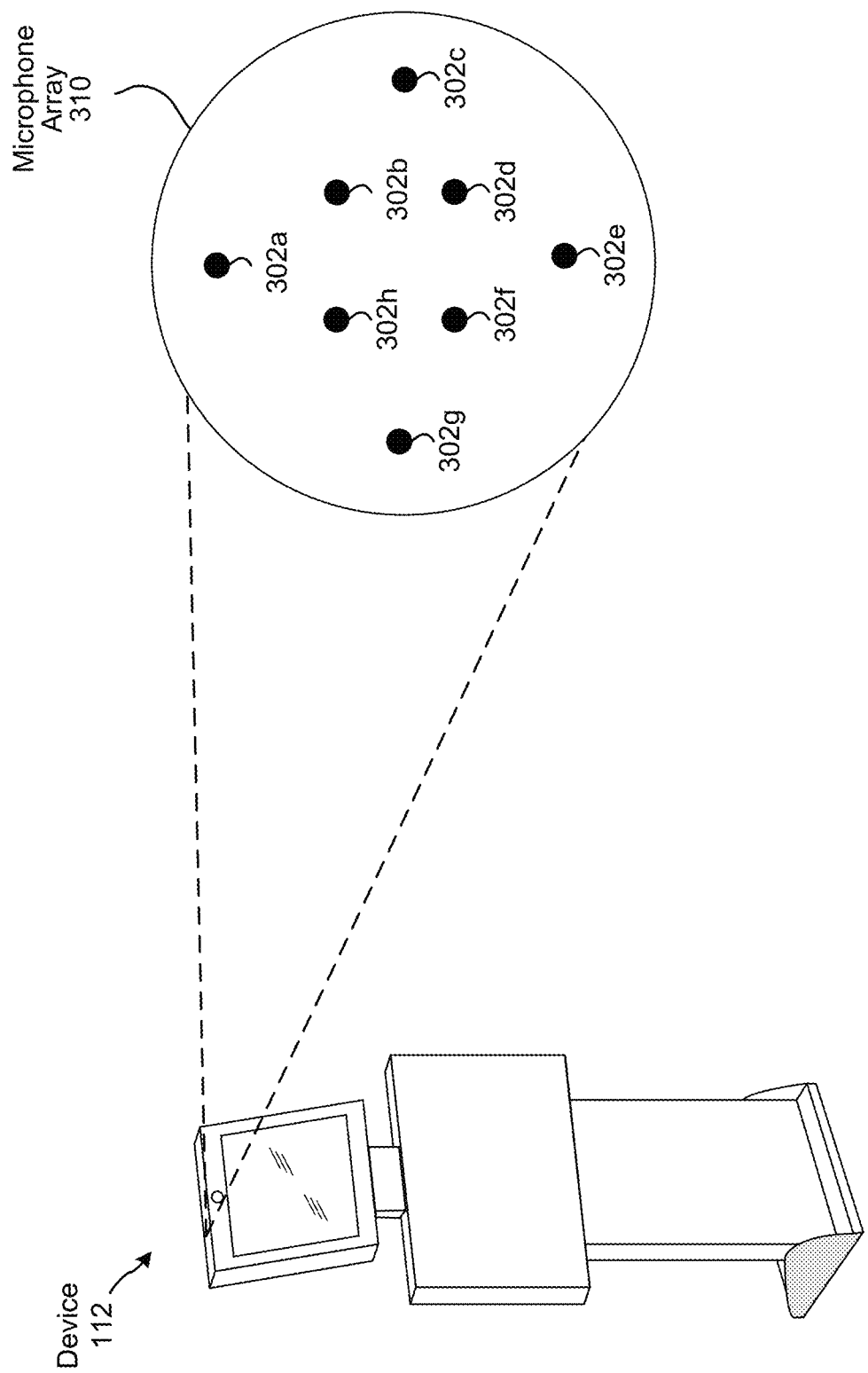
FIG. 3 illustrates a microphone array according to embodiments of the present disclosure.

FIG. 3 illustrates further details of the microphone array 310. In some embodiments, the microphone array 310 includes eight microphones 302a, 302b, 302c, 302d, 302e, 302f, 302g, and 302h, arranged in two concentric circles; the four microphones of one circle may be rotated 45 degrees with respect to the four microphones of the other circle. The present disclosure is not, however, limited to any particular number or arrangement of microphones.

The microphone array 310 may include various numbers of individual microphones. The individual microphones may capture sound and pass the resulting audio signals created by the sound to downstream components, such as a directional power magnitude component, as discussed below. Each individual piece of audio data captured by a microphone may be represented as a time-domain audio signal; these signals may be converted to the frequency domain using an analysis filterbank, which may perform a Fourier transform.

To isolate audio from a particular direction, as discussed herein, the device 110 may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device 110 may determine that the source of the audio that resulted in the segment of audio data may be located closer to the first microphone than to the second microphone (which resulted in the audio being detected by the first microphone before being detected by the second microphone).

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 4:
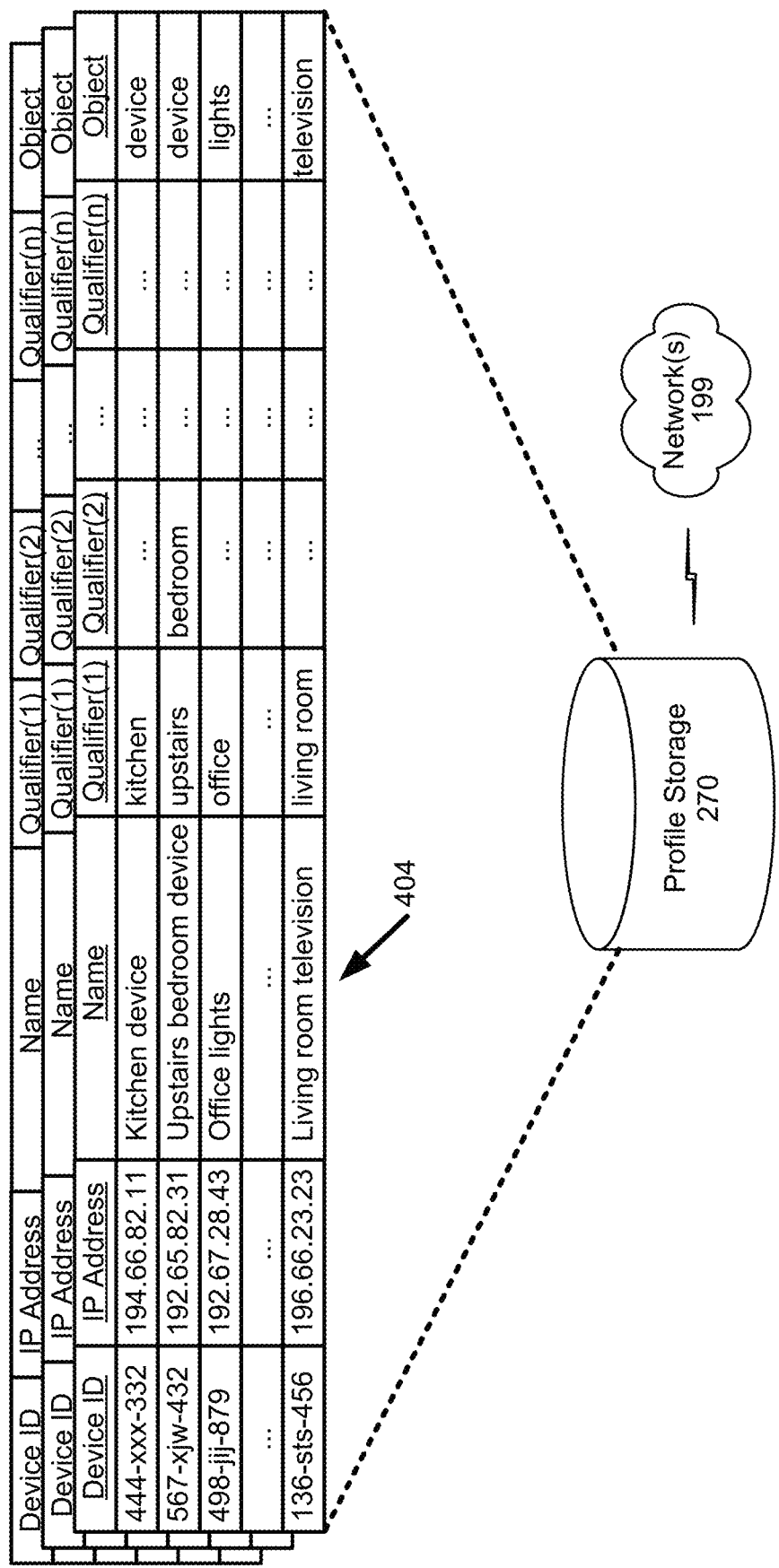
FIG. 4 illustrates data stored and associated with user profiles according to embodiments of the present disclosure.

FIG. 4 illustrates data stored and associated with user profiles according to embodiments of the present disclosure. For example, FIG. 4 illustrates an example of profile storage 270, although this is intended to conceptually illustrate a single example and the disclosure is not limited thereto.

In some examples, the profile storage 270 is a cloud-based storage. For example, the profile storage 270 may be associated with the system(s) 120 and remote from the devices 110/112. However, the disclosure is not limited thereto and the profile storage 270 may be associated with the devices 110/112 without departing from the disclosure. For example, the profile storage 270 may be stored on a home server in an environment (e.g., building or residence) associated with the devices 110/112, may be stored on one or more devices 110/112, and/or the like without departing from the disclosure. As illustrated in FIG. 4, the profile storage 270 may be in communication with various components, such as the system(s) 120, the devices 110/112, and/or the like, over the network(s) 199.

The profile storage 270 may include a variety of information related to individual users, user profiles, households, accounts, etc. that interact with the system 100. For illustration, as shown in FIG. 4, the profile storage 270 may include data regarding devices 110/112 associated with particular individual user accounts 404 (e.g., user profiles). Such data may include device identifier (ID) and internet protocol (IP) address information for different devices 110/112 as well as names by which the devices 110/112 may be referred to by a user. Further qualifiers describing a device 110/112, a location of the device 110/112, acoustic region(s) associated with the device 110/112, input capabilities of the device 110/112, output capabilities of the device 110/112, previous selection data, and/or the like may also be listed along with a description of the type of object of the device 110/112.

While not illustrated in FIG. 4, the user account 404 may include or be associated with different user preferences, such as preferred types of notifications, preferred devices from which to output the notifications, preferred acoustic region(s) and/or locations to which to output the notifications, and/or the like. A device 110/112 may refer to the user account 404 and corresponding data (e.g., user preferences) in order to configure settings for an individual user profile of the device 110/112.

FIGS. 5A-5B illustrate examples of a building with multiple devices, along with output capabilities associated with the devices, according to embodiments of the present disclosure. As illustrated in FIG. 5A, a first device 110a and a second device 110b may be located on a third floor of a building 510, a third device 110c, a fourth device 110d, a fifth device 110e, a sixth device 110f and a device 112 may be located on a second floor of the building 510, and a seventh device 110g and an eighth device 110h may be located on a first floor of the building 510. Each of the devices 110/112 illustrated in FIG. 5A may be configured to perform different functionality, such as generating audio data, outputting audio, generating image data, displaying image(s) on a display, and/or the like.

Additionally or alternatively, components of the devices 110/112 may vary such that an audio quality of output audio, an image quality of output image(s), and/or the like may vary between the devices 110/112 without departing from the disclosure. For example, FIG. 5B illustrates an example of output capability data 520 listing the output capabilities associated with each of the devices 110/112. As illustrated in FIG. 5B, some of the devices 110/112 have basic loudspeakers, while other devices 110/112 have premium loudspeakers configured to generate output audio with higher audio quality, using additional loudspeakers, and/or the like. The seventh device 110g (e.g., headless device) does not include loudspeakers, but instead "passes" the audio data to a separate device such as a television or external loudspeakers.

Some of the devices 110/112 include a display, enabling these devices 110/112 to output an image, a series of images (e.g., video), and/or the like on the display. However, some of the devices 110/112 do not include a display and may use a speech interface to interact with the user. The seventh device 110g does not include a display, but instead "passes" the image data to a separate device such as the television. Some of the devices 110/112 may also include a camera, enabling these devices 110/112 to generate image data. For example, the devices 110/112 may generate image data representing the user during a communication session, although the disclosure is not limited thereto.

For certain types of output (e.g., audio output corresponding to music, audio output corresponding to a movie/TV show, etc.) some devices 110/112 may be grouped together such that a user request to receive output via the group is sent to a specific device in the group. In some embodiments, for such multi-device synchronous output the system(s) 120 may use data described in the table below.

TABLE 1

Example data for multi-device output

| GroupID | Group Function | Included Devices | Command destination for GroupID |
|---|---|---|---|
| Group123 | Audio output | Device_1_ID, Device_2_ID, Device_3_ID | Device_1_ID |
| GroupABC | Audio output | Device_1_ID, Device_4_ID | Device_4_ID |
| GroupXYZ | Audio output | Device_5_ID, Device_6_ID, Device_7_ID, Device_8_ID | Device_5_ID |

In an example, for groupID "GroupABC" and for function "audio output", the group may include "Device_1_ID", "Device_2_ID", and "Device_3_ID", and the command for the function may be sent to "Device_1_ID" which may distribute the audio output to the other devices in the group for synchronous output. In some embodiments, the command to output data may be sent to one of the devices in the group, an interim component in the system(s) 120, an interim component in the device 110, a destination address or the like.

Figure 6D:
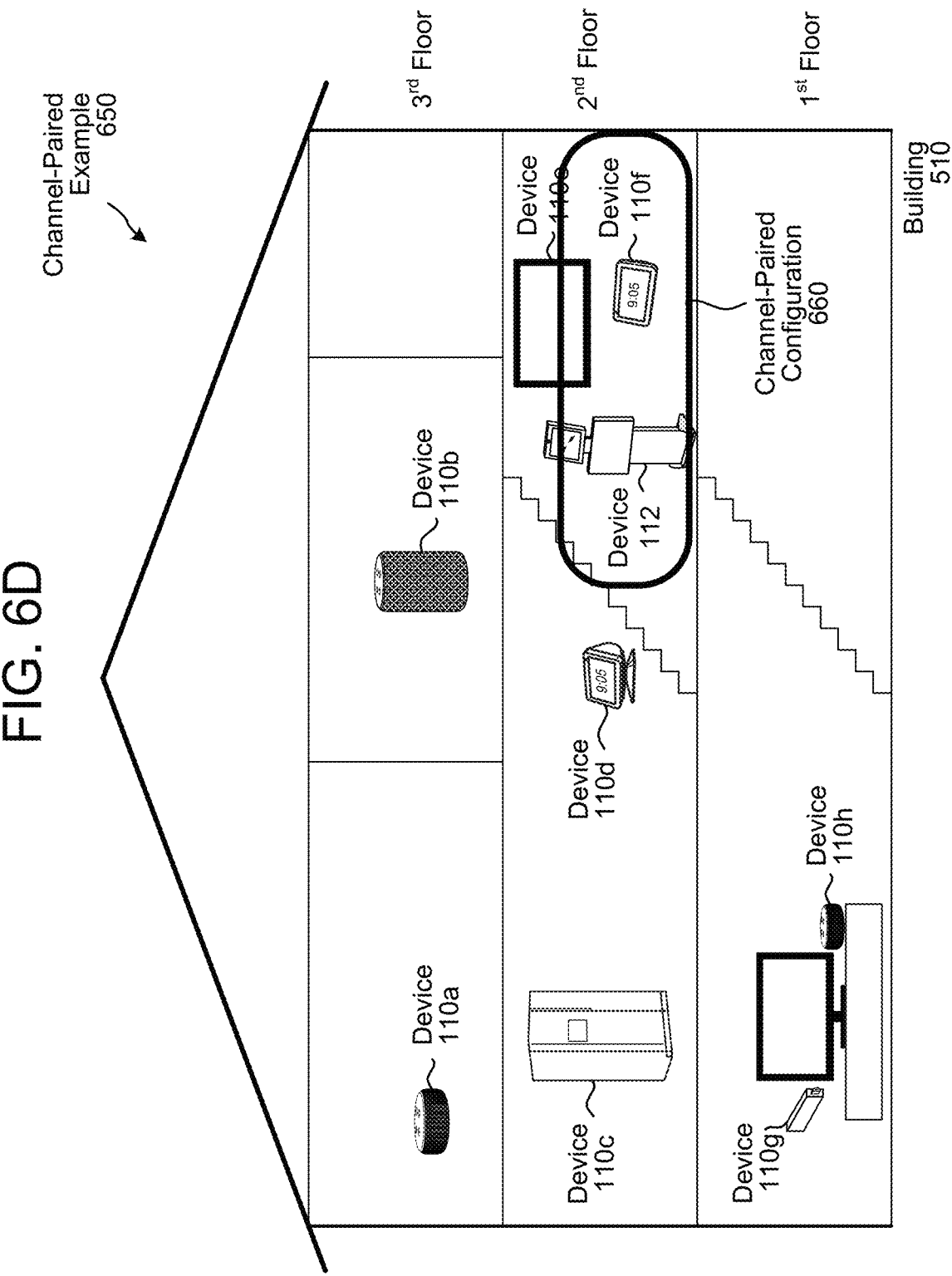

FIGS. 6A-6D illustrate examples of acoustic regions and channel-paired configurations according to embodiments of the present disclosure. As illustrated in FIG. 6A, in some examples the system 100 may receive an acoustic region request indicating devices to include in an acoustic region. For example, a first acoustic region request 610 indicates that the first device 110a and the second device 110b may be included in a first acoustic region, but not the third device 110c or the fourth device 110d. Similarly, a second acoustic region request 615 indicates that the fifth device 110e, the sixth device 110f, and the device 112 may be included in a second acoustic region, but not the third device 110c or the fourth device 110d.

In response to one or more acoustic region requests, the system 100 may generate acoustic regions corresponding to the devices 110/112. For example, FIG. 6B illustrates an example of acoustic region data 620. As illustrated in 6B, the acoustic region data 620 indicates that a first acoustic region (e.g., "1") may include the first device 110a and the second device 110b, and that the second device 110b may be the default device (e.g., main device) for the first acoustic region. The acoustic region data 620 also indicates that a second acoustic region (e.g., "2") may include the fifth device 110e, the sixth device 110f, and the device 112, and that the fifth device 110e may be the default device for the second acoustic region. Finally, the acoustic region data 620 may also indicate that a third acoustic region (e.g., "3") may include a seventh device 110g and an eighth device 110h, with the seventh device 110g being the default device for the third acoustic region.

FIG. 6C illustrates a visual depiction of the acoustic region data 620. As illustrated in FIG. 6C, acoustic regions example 630 illustrates that the first device 110a and the second device 110b are included in a first acoustic region 640a on the third floor of the building 510, that the device 112, the fourth device 110e, and the fifth device 101f are included in a second acoustic region 640b on the second floor of the building 510, and that the seventh device 110g and the eighth device 110h are included in a third acoustic region 640c on the first floor of the building 510.

In some examples, the acoustic regions may correspond to device-paired configurations, such as multi-room audio. In the device-paired configuration, each device 110/112 in an acoustic region may receive the same output audio data and may generate output audio corresponding to multiple channels. Thus, a user may perceive the same output audio being generated by multiple devices in varying locations. The output audio may be synchronized between the multiple devices, such that the output audio is generated at the same time, but the output audio generated by each device is the same.

In other examples, an acoustic region may be configured in a channel-paired configuration, such as dual-device stereo. FIG. 6D illustrates an example of a channel-paired configuration 660 between the device 112 and the fifth device 110f. In the channel-paired configuration 660, each device 110/112 may receive a portion of the output audio data corresponding to a single channel and may generate different output audio. For example, the device 112 may receive a first portion of the output audio data corresponding to a left channel and may generate first output audio, while the fifth device 110f may receive a second portion of the output audio data corresponding to a right channel and may generate second output audio. Thus, while the first output audio generated by the device 112 is different than the second output audio generated by the fifth device 110f, the user may perceive a stereo effect (e.g., dual-device stereo) based on the combined output audio.

The acoustic region data 620 and the acoustic regions example 630 are intended as an illustrative example and the disclosure is not limited thereto. Instead, the acoustic regions may vary without departing from the disclosure. Additionally or alternatively, while FIG. 6A illustrates the system(s) 120 receiving input indicating the acoustic regions, the disclosure is not limited thereto and in some examples the system(s) 120 may automatically generate the acoustic regions without departing from the disclosure.

In some examples, the acoustic region request may indicate the default device for an acoustic region. In other examples, the system(s) 120 may select the default device for an acoustic region based on output capabilities of the devices 110, based on other information and/or capabilities, and/or the like without departing from the disclosure. The default device may be a single device chosen as a "main" device or controller for each of the acoustic regions. For example, the controller may control the devices 110/112 included in the acoustic region, communicate with other devices in the system 100 on behalf of the acoustic region, and/or relay data from the system(s) 120 to the other devices 110/112 in the acoustic region. For example, a first controller (e.g., fifth device 110e) for the second acoustic region 640b may control the remaining devices 110f/112 and may send audio data to the remaining devices 110f/112 so that the devices 110e/110f/112 collectively generate output audio that is synchronized. Thus, if the system(s) 120 send data (e.g., notification data, audio data, and/or the like) to the first controller, the first controller may relay the data to the devices 110e/112.

FIG. 7 illustrates an example of a main-follower configuration for generating synchronized output audio according to embodiments of the present disclosure. As illustrated in FIG. 7, the system 100 may receive input audio 710 corresponding to a voice command. For example, FIG. 7 illustrates an example 700 in which a fourth device 110d receives input audio 710 corresponding to a request to play music (e.g., "Play Mozart everywhere").

As described in greater detail below with regard to FIG. 8, the input audio 710 requests that the system 100 play music using an acoustic region 720 labeled "Everywhere." As illustrated in FIG. 7, this acoustic region 720 may include four devices, a first device 110a, a second device 110b, a third device 110c, and a fourth device 110d. The third device 110c may be configured as a main device for the acoustic region 720, while the first device 110a, the second device 110b, and the fourth device 110d may be configured as follower devices. In the example 700, the second device 110b and the fourth device 110d may be directly connected to the main device (e.g., device 110c), whereas the first device 110a may be connected to the main device via wireless access point(s) (WAP(s)) 730. For example, the first device 110a may receive audio data from the third device 110c via the WAP(s) 730, whereas the second device 110b and the fourth device 110d may receive audio data directly from the third device 110c. Thus, the third device 110c may act as a soft WAP for the second device 110b and the fourth device 110d.

Figure 8:
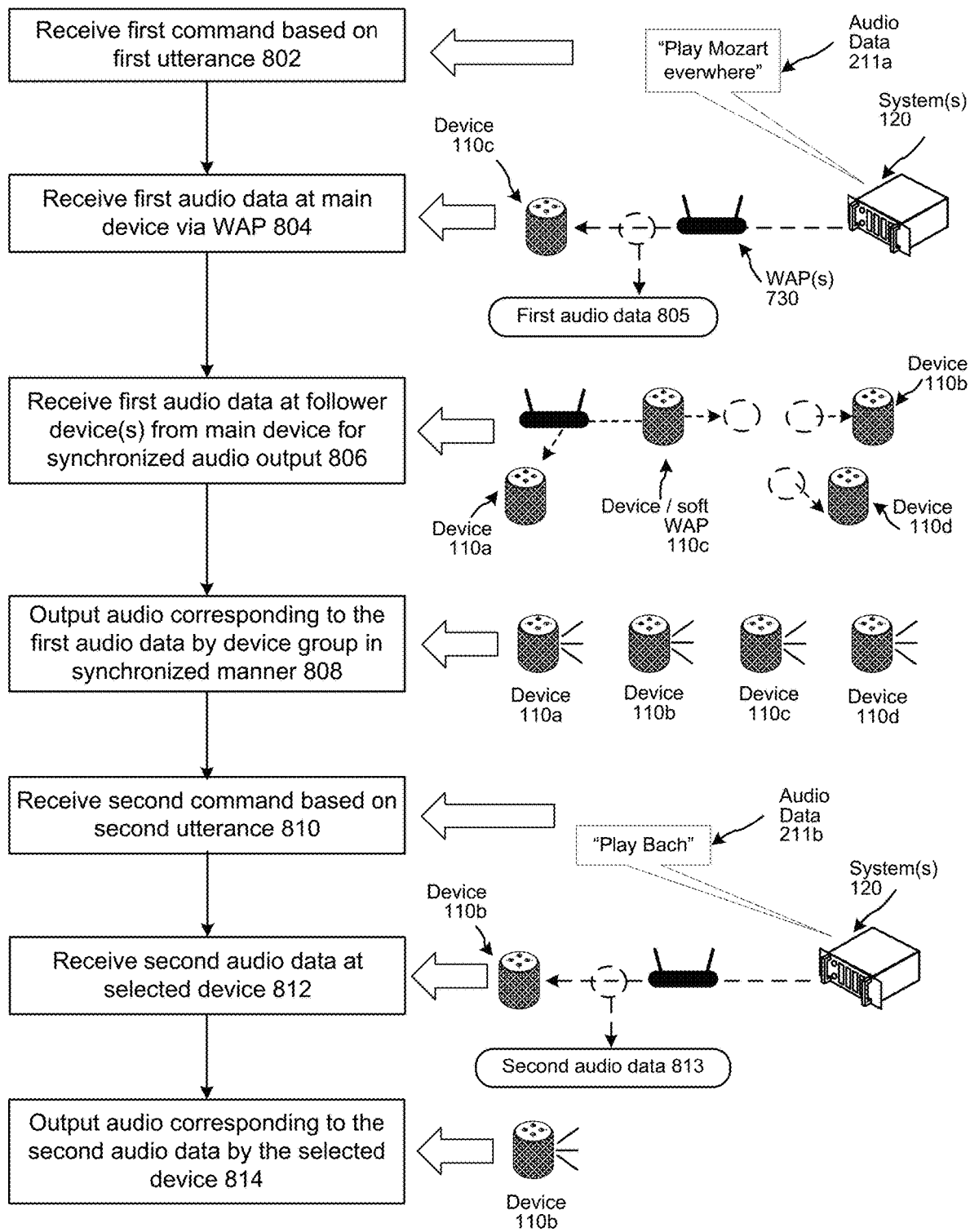
FIG. 8 is a conceptual diagram illustrating a process for dynamically switching between operating in a group mode and an individual mode for audio output according to embodiments of the present disclosure.

FIG. 8 is a conceptual diagram illustrating a process for dynamically switching between operating in a group mode and an individual mode for audio output according to embodiments of the present disclosure. At 802, a first command can be received by a device 110 based at least in part on receiving a first utterance in a user environment. For example, the user may utter the voice command "Play Mozart Everywhere", and the microphone of device 110c, may generate audio data 211a corresponding to the utterance, and may transmit the audio data 211a to the system(s) 120 for processing the voice command. The system(s) 120 can perform the various ASR and NLU techniques described above to generate a first command, which may be specific to a music domain or service. The components of the system(s) 120 involved with processing the speech from the user and generating the first command may be unaware of the intended target of the command. For example, the intended target on which the user would like to play music from may be a device output group called "Everywhere." Accordingly, the ASR and NLU components of the system(s) 120 may process the audio data 211a to determine that Everywhere corresponds to a target for output of audio data, but these components may not know whether "Everywhere" corresponds to a single device 110c or multiple devices 110. The orchestrator 230 may communicate with the multi-device output component 265 to determine, that "Everywhere" corresponds to a device output group comprising multiple devices 110. The multi-device output component 265, having determined the devices 110 that are members of the "Everywhere" group, can then select a main receiver device 110 that is to receive the first command. Thus, the first command can be received by a device 110 that corresponds to the main receiver at block 802.

The main receiver may be a different device 110 than the audio distribution main device (e.g., device 110c in the above example). In this scenario, the main receiver device forwards the command to the audio distribution main device, the first command instructing the audio distribution main device to obtain an audio file associated with the artist "Mozart" for initiating synchronized audio playback of the audio file via the device output group named "Everywhere." In some embodiments, the first command may include an audio playback operation, a first content identifier corresponding to a song by the artist Mozart, and a target identifier associated with the Everywhere group comprising devices 110*a*-110*d*. The main receiver device may forward the command to the audio distribution main device based on the presence of the target identifier associated with the Everywhere group in the command. The target identifier informs the main receiver that the devices in the Everywhere group are to be placed in "group mode" for playback of audio in a synchronized manner via the Everywhere group.

The device 110*c*, being the audio distribution main device of the "Everywhere" group, receives the command (either directly from the system(s) 120 at block 802 when it is the main receiver device, or otherwise forwarded from the main receiver device). The command may instruct the audio distribution main device to retrieve a first audio file 805 from a content source. At 804, the audio distribution main device receives (e.g., by following the link in the first command) a first audio file 805 from a content source and via a wireless access point (WAP) 730 in the user's environment. The audio file 805 corresponds to a content identifier in the first command. The first content identifier in the first command may be a link (e.g., a Uniform Resource Locator (URL)) pointing to the content source where the audio file 805 is to be obtained, and the audio distribution main device 110*c* may use the link to retrieve the audio file 805.

At 806, one or more follower devices in the group of devices that are to engage in synchronized audio playback of the audio file 805 receive the first audio file 805 from the audio distribution main device (e.g., device 110*c*). As shown in the pictorial diagram next to block 806 of FIG. 8, utilization of a hybrid topology, may cause individual follower devices to receive the first audio file 805 from the audio distribution main device (e.g., device 110*c*) via the WAP 730. This is the case with the follower device 110*a*, which is connected to device 110*c* (the audio distribution main device) via the WAP 730. For individual follower devices, such as follower devices 110*b* and 110*d*, which are directly connected to the audio distribution main device (e.g., device 110*c*) acting as a soft WAP, those follower devices 110*b* and 110*d* receive the first audio file 805 directly from the audio distribution main device in the form of a multicast packet, which is not transmitted via the WAP 730.

At 808, the devices 110 in the "Everywhere" group, which now possess the first audio file 805, can output audio of the first audio file 805 in a synchronized manner. Before continuing with the remaining blocks of the process, a brief description of synchronized output of audio, such as that which can take place at block 808, is described.

In general, the audio playback devices 110 described herein are configured to output audio in a synchronized manner; "synchronized" meaning substantially synchronized in the sense that audio output between two audio playback devices 110 cannot be out of synch by more than a threshold amount of drift (due to respective local clocks running at different frequencies) that is known to be perceptible to the human ear. When devices 110 are situated in different rooms of a house, a threshold drift of about 5000 microseconds or greater may be perceptible to the human ear, while a threshold drift of 150 microseconds or greater may be perceptible to the human ear when at least two devices 110 are situated in the same room. Thus, synchronized output of audio, as used herein, can mean substantially synchronized in the sense that audio of the same audio file can start playback at respective devices 110 at substantially the same time (e.g., within milliseconds or microseconds of each other), and the relative time offsets between the devices' 110 local clocks can drift over the course of audio playback up to a predetermined amount in order to be considered as maintaining "synchronicity". By maintaining synchronicity in this manner, an echo effect due to slight deviations in timing between respective devices 110 can be minimized, and often eliminated.

Synchronized output of audio begins with audio distribution. For instance, all of the devices 110 in a device output group can receive the same audio file. A streaming protocol can be implemented that allows an audio distribution main device to send messages to follower devices instructing the follower devices to "play this audio file at this time." The audio distribution main device can be responsible for coordinating audio distribution from the content source(s)/skill systems 225 to the follower devices 110.

The device 110 may optionally include an audio pipeline and an optional time synch module. The audio pipeline can comprise a media player configured to receive audio data (e.g., audio files) from the content source(s)/skill system(s) 225 via the system(s) 120, and to decode an incoming audio stream. The audio pipeline can further include a mixer that creates a single audio stream from mixed audio, such as a TTS response mixed with a music audio file, and an output path providing audio output processing, such as EQ, and the like.

The time synch module is configured to synchronize time between the device 110 and one or more other devices 110 in a device output group. The time synch protocol may run separate from the rest of the audio system, and keeps the audio pipeline clocks of all grouped devices 110 in sync. One device 110 can act as a main time device (typically a different device as the audio distribution main device). The main time device exchanges timestamp information with follower devices so that all follower devices can calculate and correct the time differences (Skew, drift=dSkew/dt) between themselves and the main time device. Time synchronization establishes a common time base between the main device and the follower devices. The devices 110 have their own crystal oscillators that run at slightly different frequencies. For example, the crystals on respective devices 110 can be off by 20 PPM slow or fast (e.g., 20 µs per second). Two devices can therefore differ by up to 40 PPM. If this 40 PPM is not corrected, the phase coherence between speakers will be off by more than 150 µs in only 4 seconds, and will be off by more than 5 ms in about 2 minutes.

Therefore, the relative offset between clocks (skew) and the relative change in skew over time (drift) can be measured and use to resample audio rates to match the main device's audio playback rate, thereby correcting the differences between respective device 110 clocks. A timestamp exchange technique can be used for measuring skew and drift across clocks of different audio playback devices 110. The main time device can take a first timestamp and send it to a follower device, and in response to the first timestamp's arrival at the follower device, the follower device can take a second timestamp and send it to the main time device. In response to the second timestamp arriving at the main time device, the main time device can take a third timestamp. Other methods can also be used, such as user datagram protocol (UDP) broadcast techniques where timestamps are taken on both the main time device (outgoing) side and the follower device (incoming) side, while also attempting to minimize the time-in-flight from main device to follower device. Another possible technique is to use a high-resolution timing register in Wi-Fi beacon packet to synchronize devices (e.g., synchronizing to the WAP's 730 Wi-Fi beacon, or synchronizing to the designated soft WAP's Wi-Fi beacon while the soft WAP (i.e., main device) syncs to one follower device using the above-mentioned timestamp exchange technique, etc.).

Synchronized output of audio also involves audio placement, where each device 110 determines a length of time that an audio file will be processed through the audio pipeline before it is actually output as audio via the speaker 1012. This is because one device 110 may process audio data through its local audio pipeline in a different amount of time than the next device 110. Thus, by determining this length of time, the device 110 can determine when an audio file is to be pushed to the beginning of the audio pipeline so that the audio corresponding to the audio file will be output at substantially the same time as the output of audio on the other device(s) 110 in the device output group. "Substantially the same time" here means output of audio from multiple devices 110 in the group begins within a particular time period, such as 5 ms.

Continuing with reference again to FIG. 8, at block 810, a second command can be received by an audio playback device 110 (e.g., device 110b) based at least in part on a second utterance in the user environment. For example, the user may utter the voice command "Play Bach" (e.g., Johann Sebastian Bach) and the microphone of device 110d may generate audio data 211b based on the input audio corresponding to the utterance, and transmit the audio data 211b to the system(s) 120 for processing the voice command. The system(s) 120 can perform the various ASR and NLU techniques described above to generate the second command, which may be specific to a music domain or service, and the second command can be received by a device 110.

In some examples, the system(s) 120 may determine to operate in a single/individual device playback mode rather than a group device playback mode. Thus, the system(s) 120 may determine which of the devices 110 is the target output device for responding to the second command. In some cases, the device 110b that received the second command may be the target output device. In other cases, another device 110 may be the target output device. The system(s) 120 may determine the target output device based on the content of the output, the output type, user presence data, device capabilities, and other information. If the device/main receiver that received the second command is different than the target device (e.g., device 110b in this example), the main receiver device can forward the command to the target device 110b. The second command may instruct device 110b (the target device) to obtain an audio file associated with the artist "Johann Sebastian Bach" for initiating synchronized audio playback of the audio file via the device 110b in individual mode. In some embodiments, the second command may include an audio playback operation, a second content identifier corresponding to a song by the artist Johann Sebastian Bach, and a target identifier associated with the entity specified in the user's voice command (e.g., device 110b in the above example). This tells the main receiver device and the target device (e.g., device 110b) that device 110b should be placed into "individual mode" for playback of audio by device 110b in isolation.

At 812, device 110b, being the target device on which the audio file is to be output, receives a second audio file 813 that was ultimately obtained from the content source/skill system 225 via the WAP 730. The audio file 813 corresponds to the content identifier in the second command. The second content identifier in the second command may be a link (e.g., a URL) pointing to the content source/skill system 225 where the audio file 813 is to be obtained, and the target device 110b may use the link to retrieve the audio file 813.

At 814, audio of the second audio file 813 can be output by the target device 110b. Notably, although device 110b, while in group mode, is configured to receive audio data directly from the audio distribution main device acting as a soft WAP, device 110b is nonetheless instructed by the second command received at 810 to operate in individual mode and to dynamically switch from receiving audio data directly from the main device, to receiving audio data via the WAP 730 in the environment. By contrast, if device 110b were to remain in the "soft WAP" configuration where it receives audio data directly from the audio distribution main device, the audio distribution main device would have to retrieve the second audio file 813 and send the audio file 813 directly to the follower device 110b for output of audio on the device 110b. This is inefficient from a networking bandwidth standpoint, especially considering a possible scenario where many follower devices 110 in a group are switched to individual mode and all of them are trying to access audio data directly from the audio distribution main device acting as the soft WAP. Instead, the process allows these follower devices 110 to dynamically switch to receiving audio data via the WAP 730 in the environment when they are to operate in individual mode, having previously operated in group mode.

Figure 9:
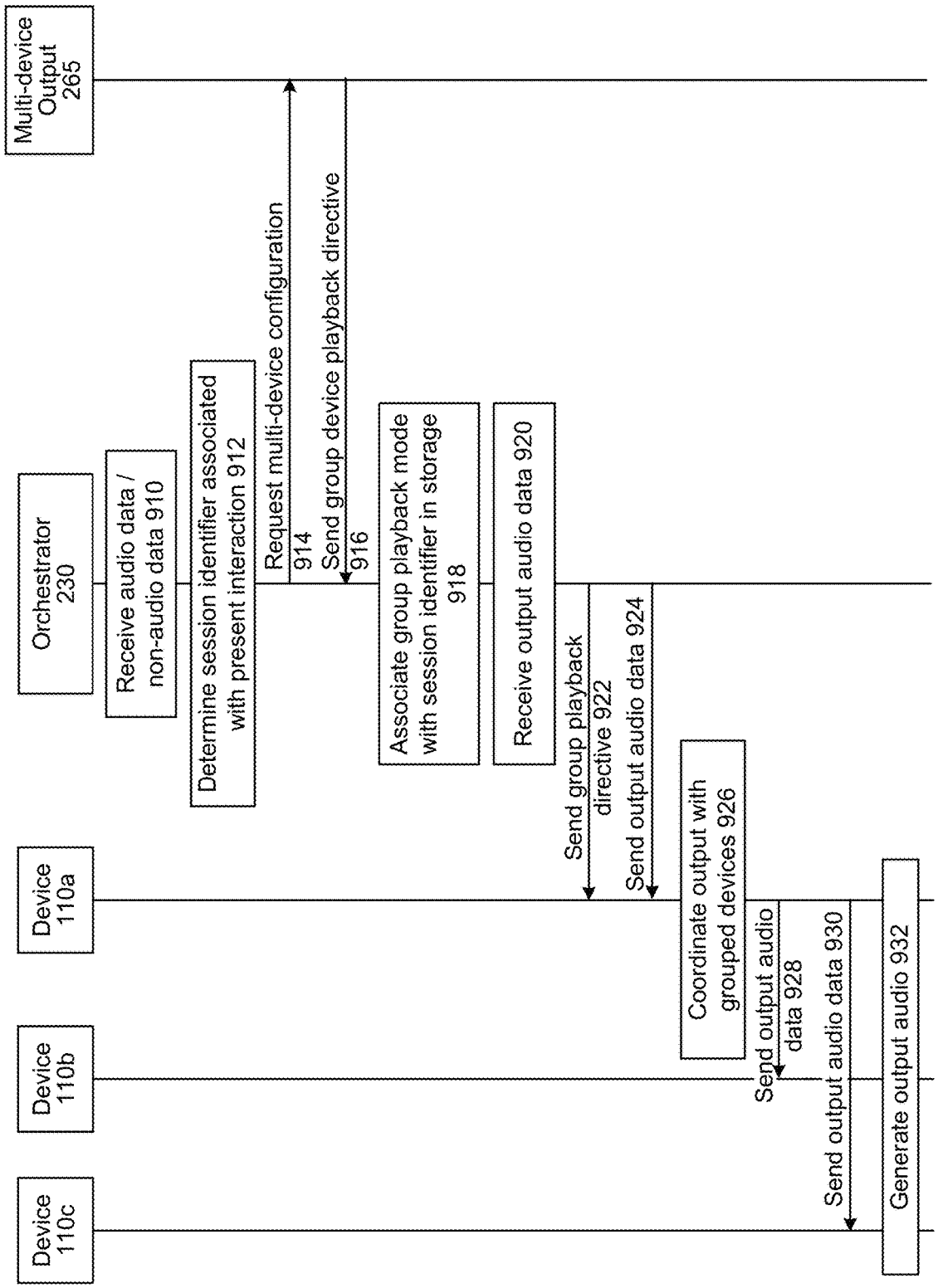
FIG. 9 is a signal flow diagram illustrating how a system may provide output for a multi-device configuration according to embodiments of the present disclosure.

FIG. 9 is a signal flow diagram illustrating how a system may provide output for a multi-device configuration according to embodiments of the present disclosure. The orchestrator 230 may receive (910) audio data and/or non-audio data. The audio data may correspond to an utterance spoken by a user. The non-audio data may be data detected/determined by one or more devices 110/112 relating to the user's environment. The non-audio data may be other data determined by the orchestrator 230, such as the current time/day.

The orchestrator 230 may determine (912) a session identifier associated with the present interaction. The present interaction may involve the system(s) 120 responding to a user request to receive audio output. The present interaction may involve the system(s) 120 causing one or more devices 110/112 to present an output, such as audio corresponding to music. This action and the user request/input may be associated with a session identifier.

The orchestrator 230 may request (914) the multi-device output component 265 to provide any multi-device configurations applicable for output. The orchestrator 230 may provide a device identifier to the multi-device output component 265, where the device identifier may be associated with the device (e.g., device 110a) that captured the audio data/user input or detected the non-audio data. The multi-device output component 265 may determine if the device identifier is associated with a group of devices that are configured to provide synchronous output. The device identifier may be associated with the device 110a, which may have captured/received the user request, although the disclosure is not limited thereto. The group of devices may include the device 110a, the device 110b and the device 110c. The multi-device output component 265 may determine that the device identifier is associated with a group of devices and may send (916) a group device playback directive to the orchestrator 230 for this session.

In some examples, the multi-device output component 265 may also provide a device identifier for the main device that is distribute the output to the other devices 110/112 in the group. The multi-device output component 265 may also provide device identifier(s) corresponding to the devices 110/112 in the group that are to output audio in a synchronous manner. For example, the multi-device output component 265 may identify the first device 110a as the main device, and may identify the second device 110*b* and the third device 110*c* as included in the group of devices for synchronous playback.

The orchestrator 230 may associate (918) a group playback mode with the session identifier to indicate that output for this session is to be provided in the group playback mode. In a group playback mode, the system(s) 120 may enable the user to receive an output (e.g., audio output) via multiple devices 110/112 in a synchronous manner.

The orchestrator 230 may receive (920) output audio data. In some embodiments, the output audio data may be provided by a skill system(s) 225/skill component(s) 290 selected by the NLU component 260 to respond to the user input. The orchestrator 230 may send (922) a group playback directive to the first device 110*a*, which may be indicated as the main device by the multi-device output component 265. The group playback directive may include device identifiers for the other devices 110/112 in the group.

The orchestrator 230 may send (924) output audio data to the first device 110*a*. The first device 110*a*, based on the group playback directive, may coordinate (926) output with the group of devices 110/112 and may determine to distribute the output audio data to the other devices 110/112 in the group. For example, the first device 110*a* may send (928) the output audio data to the second device 110*b* and may send (930) the output audio data to the third device 110*c*. The first device 110*a*, the second device 110*b*, and/or the third device 110*c* may then generate (932) output audio that is synchronized. In this manner, the system(s) 120 may enable synchronous output of audio data via multiple devices 110/112 in a group.

While FIG. 9 illustrates the orchestrator 230 receiving the output audio data in step 920 and sending the output audio data to the first device 110*a* in step 924, the disclosure is not limited thereto. In some examples, the system(s) 120 may send a request for the output audio data to a content provider 125 and the first device 110*a* may receive the output audio data directly from the content provider 125 without departing from the disclosure.

While FIG. 9 illustrates the first device 110*a* sending the output audio data to the second device 110*b* and/or the third device 110*c*, the disclosure is not limited thereto. In some examples, the first device 110*a* may send only a portion of the output audio data to the second device 110*b* and/or the third device 110*c* without departing from the disclosure. For example, the first device 110*a* may receive multi-channel output audio data and may send a first channel of the output audio data to the second device 110*b* and a second channel of the output audio data to the third device 110*c* without departing from the disclosure.

While FIG. 9 illustrates the first device 110*a* sending output audio data to the second device 110*b* and/or the third device 110*c*, the disclosure is not limited thereto. In some examples, the first device 110*a* may send the output audio data to one or more devices 112, instead of or in addition to the second device 110*b* and/or the third device 110*c*, without departing from the disclosure. Thus, FIG. 9 illustrates an example in which a main device (e.g., first device 110*a*) may coordinate multiple devices 110/112 generating synchronized output audio, although the disclosure is not limited thereto and individual steps may vary without departing from the disclosure.

Figure 10A:
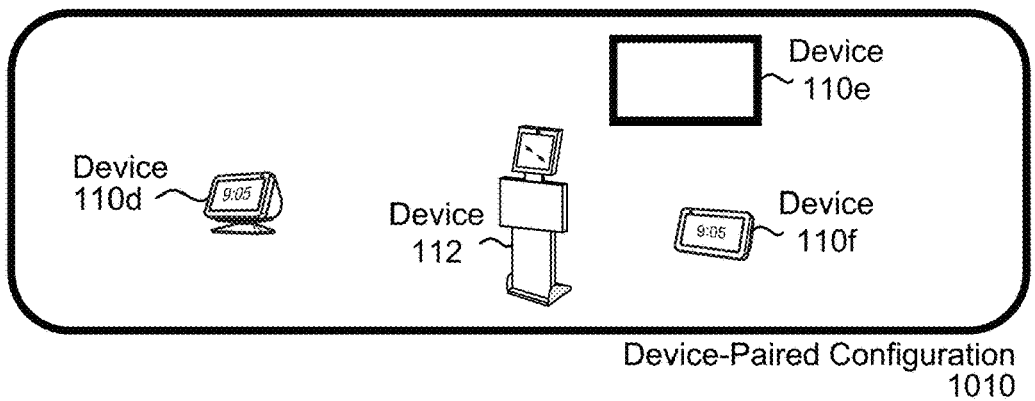
FIGS. 10A-10B illustrate examples of a device-paired configuration and a channel-paired configuration according to embodiments of the present disclosure.
Figure 10B:
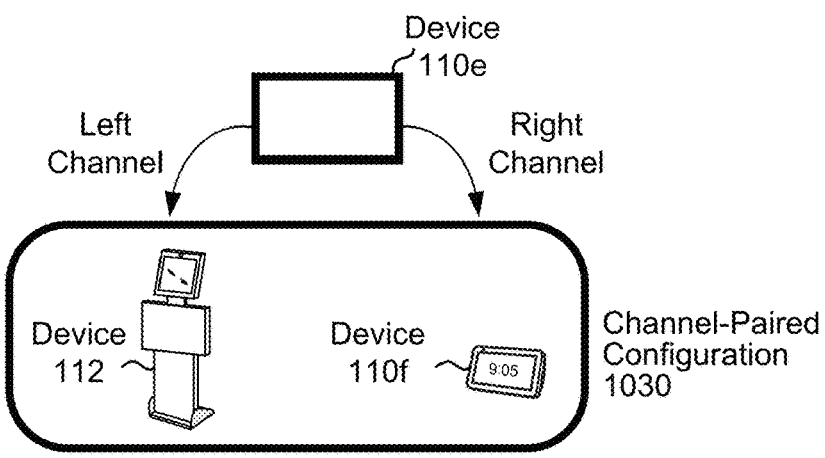

FIGS. 10A-10B illustrate examples of a device-paired configuration and a channel-paired configuration according to embodiments of the present disclosure. In some examples, the device output group may be configured in a device-paired configuration, such as multi-room audio. In the device-paired configuration, each device 110/112 in the device output group may receive the same output audio data and may generate output audio corresponding to multiple channels. Thus, a user may perceive the same output audio being generated by multiple devices in varying locations. The output audio may be synchronized between the multiple devices, such that the output audio is generated at the same time, but the output audio generated by each device is the same.

In other examples, the device output group may be configured in a channel-paired configuration, such as dual-device stereo. In the channel-paired configuration, each device 110/112 in the device output group may receive a portion of the output audio data corresponding to a single channel and may generate different output audio. For example, a first device 110*a* may receive a first portion of the output audio data corresponding to a left channel and may generate first output audio, while a second device 112*a* may receive a second portion of the output audio data corresponding to a right channel and may generate second output audio. Thus, while the first output audio generated by the first device 110*a* is different than the second output audio generated by the second device 112*a*, the user may perceive a stereo effect (e.g., dual-device stereo) based on the combined output audio.

While an example of a channel-paired configuration is described above with regard to two devices (e.g., dual-device stereo), this is intended to conceptually illustrate a single example and the description is not limited thereto. In some examples, the channel-paired configuration may correspond to a 5.1 surround sound system, a 7.1 surround sound system, and/or the like without departing from the disclosure. For example, a 5.1 surround sound system may include six-channels, such as five full bandwidth channels and one low-frequency effects channel, and may correspond to six different devices 110/112 without departing from the disclosure. Similarly, a 7.1 surround sound system may include eight-channels, such as seven full bandwidth channels and one low-frequency effects channel, and may correspond to eight different devices 110/112 without departing from the disclosure.

While the examples described above refer to a single device 110/112 generating output audio corresponding to a single channel, the disclosure is not limited thereto. In some examples, a single device 110/112 may generate output audio corresponding to two or more channels without departing from the disclosure. For example, a device 110/112 may include one or more loudspeakers corresponding to a full bandwidth channel, as well as a woofer or subwoofer that corresponds to the low-frequency effects channel. Thus, the device 110/112 may generate first output audio (e.g., full bandwidth channel) using the one or more loudspeakers and generate second output audio (e.g., low-frequency effects channel) using the subwoofer. Additionally or alternatively, a device 110/112 may include multiple loudspeakers and may generate output audio corresponding to two or more full bandwidth channels without departing from the disclosure.

FIG. 10A illustrates an example of a device-paired configuration 1010 that includes a first device 110*d* (e.g., speech enabled device with a display), a second device 110*e* (e.g., smart television), a third device 110*f* (e.g., speech enabled device with a display), and a fourth device 112 (e.g., autonomous motile device such as a smart robot). The system 100 may treat the device-paired configuration 1010 as a logical group that includes separate devices 110/112 (e.g., multiple output points), represented by acoustic region data 1020. For example, acoustic region data 1020 indicates that an acoustic region corresponding to the device-paired configuration 1010 includes four output devices (e.g. "D, E, F, and 112" indicating devices 110d, 110e, 110f, and 112) and that the second device 110e is a default device (e.g., main device) for the acoustic region.

In some examples, the system 100 may send output audio data to the second device 110e and the second device 110e may forward the output audio data to the first device 110d, the third device 110f, and the fourth device 112. However, the disclosure is not limited thereto, and in other examples the system 100 may individually send the output audio data to the first device 110d, the third device 110f, and the fourth device 112 without departing from the disclosure. After receiving the output audio data, each of the devices 110/112 may generate output audio, such that the same output audio is generated at four separate locations at the same time.

In contrast, FIG. 10B illustrates an example of a channel-paired configuration 1030 that includes the third device 110f (e.g., speech enabled device with a display) and the fourth device 112 (e.g., autonomous motile device such as a smart robot). The system 100 may treat the channel-paired configuration 1030 as a single device (e.g., single output point), represented by acoustic region data 1040. For example, acoustic region data 1040 indicates that an acoustic region corresponding to the channel-paired configuration 1030 includes only one output device (e.g. "E" indicating second device 110e) and that the second device 110e is a default device (e.g., main device) for the acoustic region.

In some examples, the system 100 may send output audio data to the second device 110e and the second device 110e may send a first portion of the output audio data (e.g., first channel) to the third device 110f and a second portion of the output audio data (e.g., second channel) to the fourth device 112. As illustrated in FIG. 10B, the second device 110e may send the first portion of the output audio data representing a right channel to the third device 110f and the second portion of the output audio data representing a left channel to the fourth device 112. Thus, the third device 110f may generate first output audio corresponding to the right channel and the fourth device 112 may generate second output audio corresponding to the left channel, such that a user perceives stereo output audio generated by multiple devices (e.g., dual-device stereo).

FIG. 10B illustrates an example in which the second device 110e is configured to output a video (e.g., series of images), while the third device 110f and the fourth device 112 are configured to output audio corresponding to the video. Thus, the system 100 may display the video on the second device 110e while generating output audio synchronized with the video using the third device 110f and the fourth device 112. In some examples, the system 100 may send media content (e.g., image data and output audio data) to the second device 110e (e.g., from content provider(s) 125) and the second device 110e may send audio data to the third device 110f and the fourth device 112, as described above. However, the disclosure is not limited thereto, and in other examples the system 100 may send first output audio data (e.g., first channel) to the third device 110f and second output audio data (e.g., second channel) to the fourth device 112 without departing from the disclosure. For example, the content provider(s) 125 or other components in the system 100 may send the first output audio data to the third device 110f and may send the second output audio data to the fourth device 112 without involving the second device 110e without departing from the disclosure.

While FIG. 10B illustrates an example in which the second device 110e sends audio data to the third device 110f and the fourth device 112 without generating output audio itself, the disclosure is not limited thereto. In some examples, the second device 110e may generate output audio in addition to the third device 110f and the fourth device 112 without departing from the disclosure. Additionally or alternatively, while FIG. 10B illustrates an example of the channel-paired configuration 1030 being controlled by the second device 110e (e.g., the second device 110e sends audio data to the third device 110f and the fourth device 112), the disclosure is not limited thereto. In some examples, the channel-paired configuration 1030 may be represented in the acoustic region data 1040 by the third device 110f without departing from the disclosure. For example, the system 100 may send the output audio data to the third device 110f and the third device 110f may send a portion of the output audio data to the fourth device 112 without departing from the disclosure.

Figure 11:
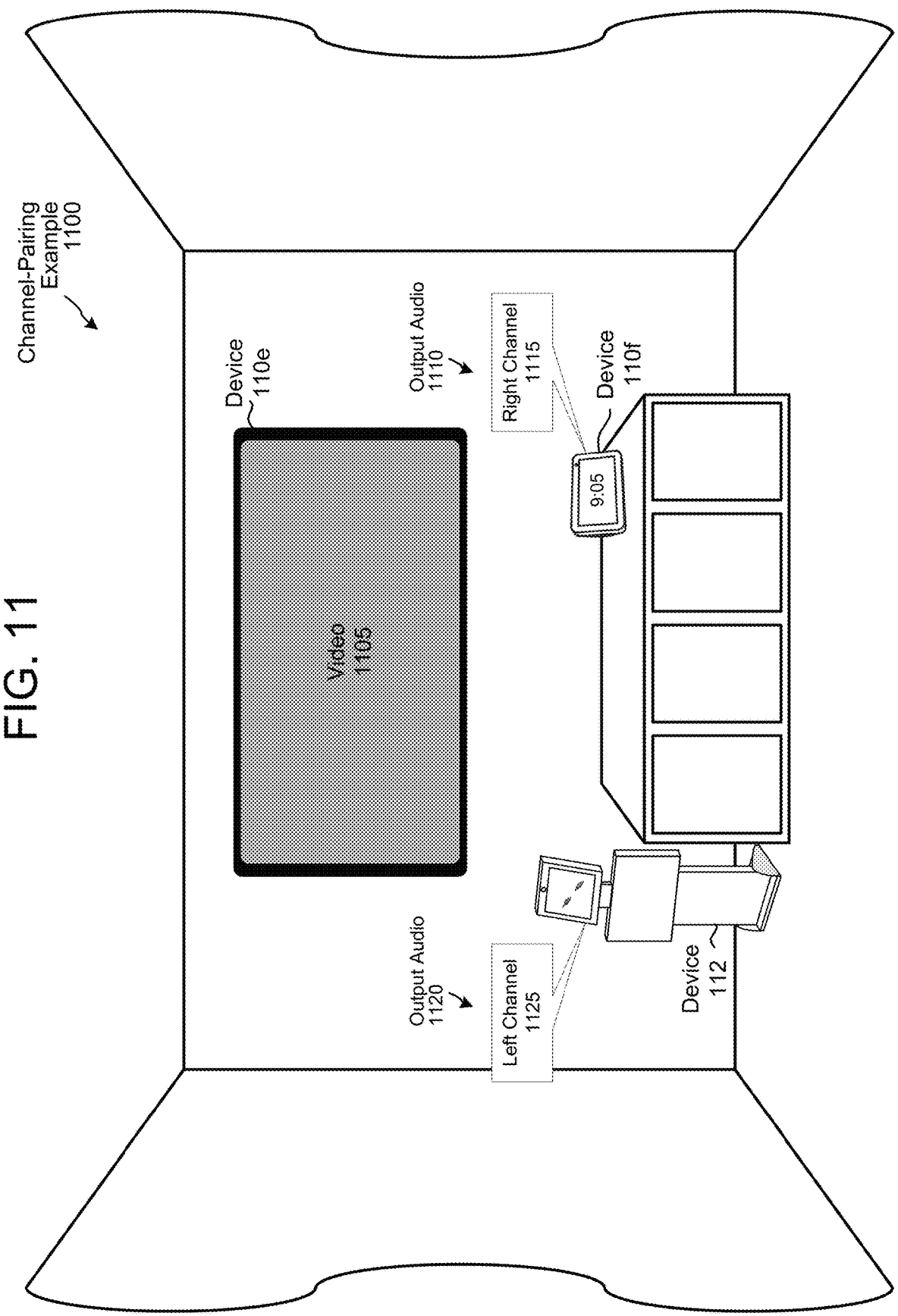
FIG. 11 illustrates an example of a channel-paired configuration involving a motile device according to embodiments of the present disclosure.

FIG. 11 illustrates an example of a channel-paired configuration involving a motile device according to embodiments of the present disclosure. As illustrated in FIG. 11, a channel-pairing example 1100 may include the channel-pairing configuration 1030 between the third device 110f and the fourth device 112, as described above with regard to FIG. 10B. For example, the second device 110e may generate video 1105 using image data and may send first output audio data (e.g., first channel) to the third device 110f and second output audio data (e.g., second channel) to the fourth device 112, which is represented as an autonomous motile device (e.g., smart robot). In the example illustrated in FIG. 11, the third device 110f may generate first output audio 1110 representing a right channel 1115 using the first output audio data and the fourth device 112 may generate second output audio 1120 representing a left channel 1125 using the second output audio data. As the first output audio 1110 and the second output audio 1120 is synchronized, the user may perceive stereo output audio generated by the two devices.

In the channel-pairing example 1100 illustrated in FIG. 11, the fourth device 112 is in a first location next to the second device 110e, enabling the fourth device 112 to generate the output audio 1120 corresponding to the left channel 1125. The first location may correspond to a base station or other charging port for the fourth device 112, and the fourth device 112 may consider the first location to be "home" (e.g., home station, home location, etc.).

As the fourth device 112 is a motile device capable of autonomous movement, the fourth device 112 may move from the first location to perform a task or execute a command initiated by the user without departing from the disclosure. For example, the user may request that the fourth device 112 travel to a second location, retrieve an item, and/or the like and the fourth device 112 may move from the first location to perform the requested task. When the fourth device 112 is not at the first location, however, the second output audio 1120 generated by the fourth device 112 may not be synchronized with the first output audio 1110 generated by the third device 110f. Thus, a sound stage associated with the video 1105 may be distorted and/or a user experience may be impaired by the fourth device 112 continuing to generate the second output audio 1120 away from the first location.

Figure 12:
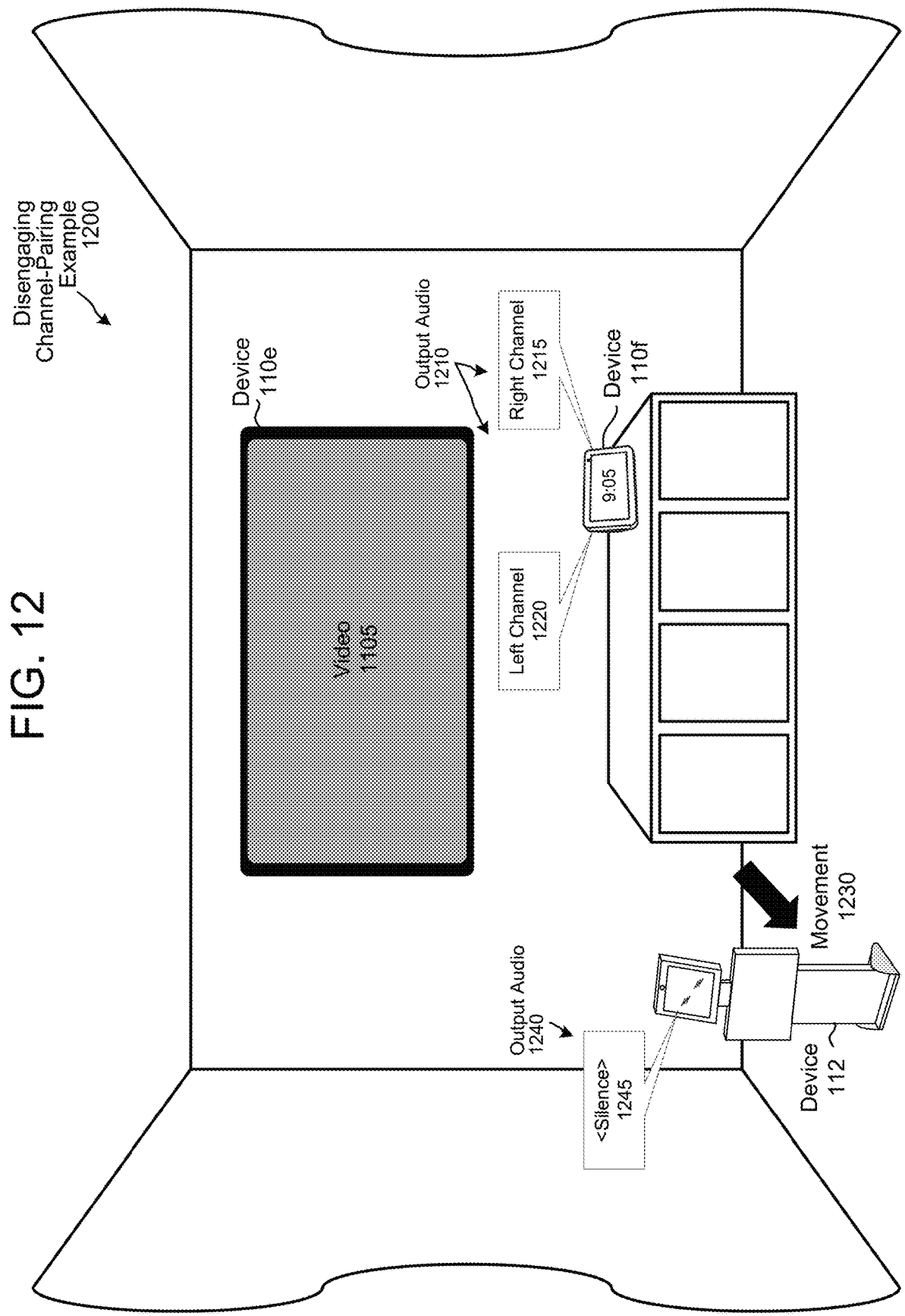
FIG. 12 illustrates an example of a motile device disengaging from a channel-paired configuration according to embodiments of the present disclosure.
Figure 13:
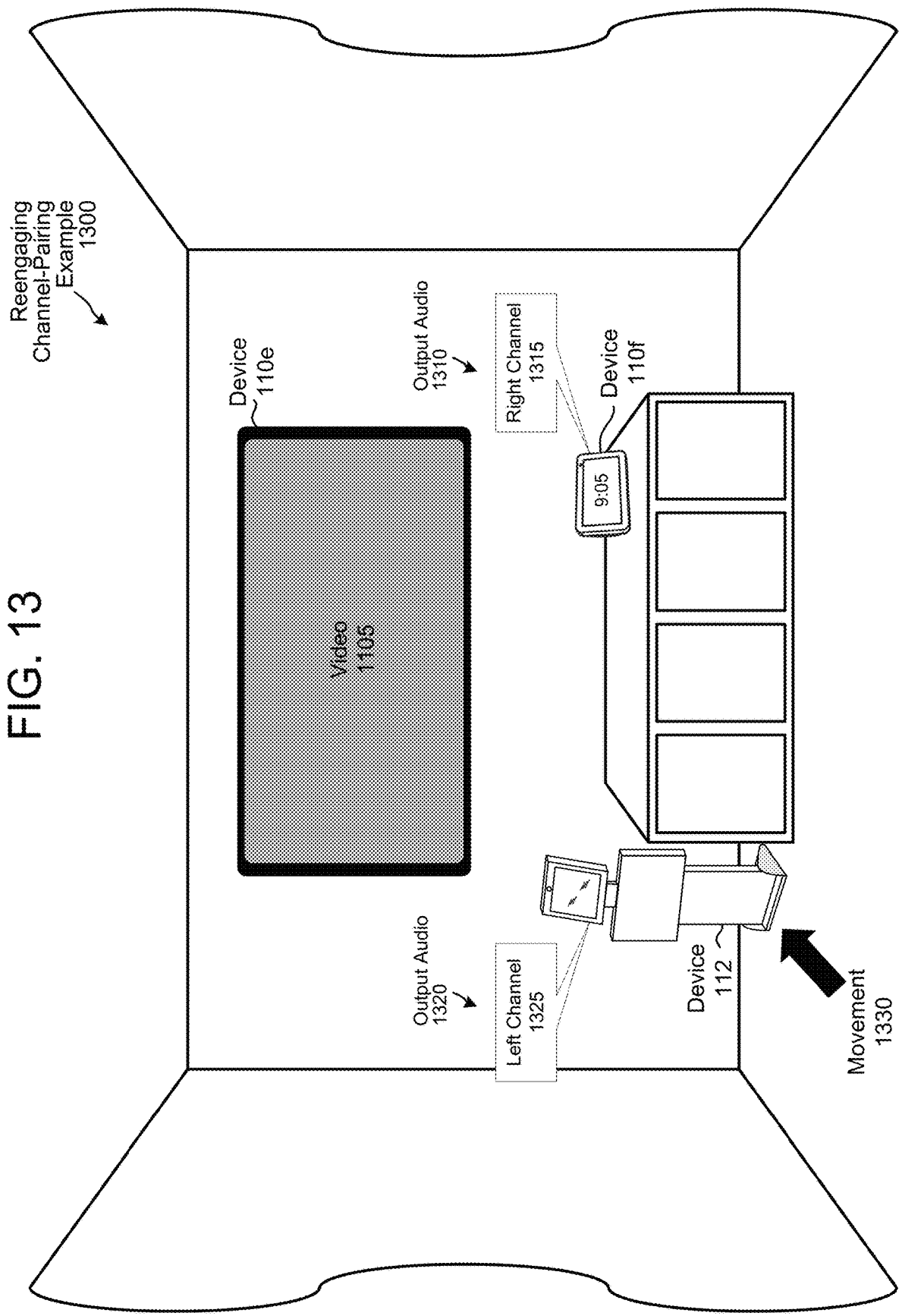
FIG. 13 illustrates an example of a motile device reengaging a channel-paired configuration according to embodiments of the present disclosure.

To improve the user experience, the system 100 may reconfigure (e.g., recalibrate) the output audio if the fourth device 112 moves from the first location or even if the fourth device 112 determines that it will soon move from the first location. In some examples, the system 100 may end the channel-paired configuration 1030 and generate output audio corresponding to both the right channel and the left channel using only the third device 110*f*, as illustrated in FIG. 12. When the fourth device 112 returns to the first location, the system 100 may reestablish the channel-paired configuration 1030 and continue generating the second output audio using the fourth device 112, as illustrated in FIG. 13, although the disclosure is not limited thereto.

Figure 14:
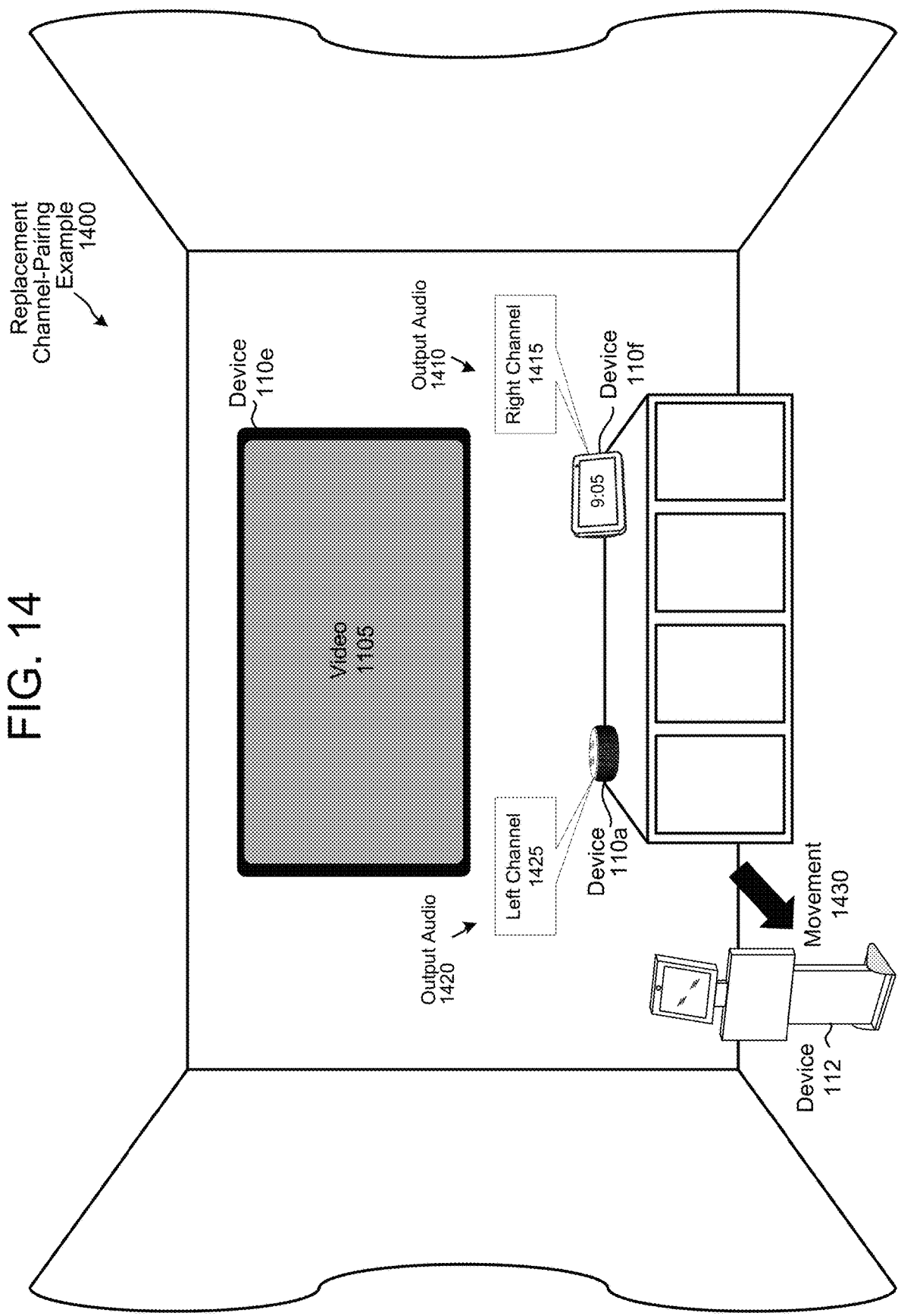
FIG. 14 illustrates an example of a motile device disengaging from a channel-paired configuration and a replacement device establishing a new channel-paired configuration according to embodiments of the present disclosure.

In other examples, if the fourth device 112 moves from the first location the system 100 may end the channel-paired configuration 1030 and create a new channel-paired configuration between the third device 110*f* and a replacement device. For example, the replacement device may be configured to generate the second output audio corresponding to the left channel, as illustrated in FIG. 14. Additionally or alternatively, while the fourth device 112 is away from the first location, the system 100 may instruct the fourth device 112 to generate output audio corresponding to both the right channel and the left channel, as illustrated in FIG. 15. For example, the fourth device 112 may generate the output audio such that the user may experience the output audio from a first direction associated with the third device 110*f* and a second direction associated with the fourth device 112 without departing from the disclosure.

FIG. 12 illustrates an example of a motile device disengaging from a channel-paired configuration according to embodiments of the present disclosure. As described above, when the fourth device 112 moves from the first location, or in anticipation of the fourth device 112 moving from the first location, the system 100 may reconfigure (e.g., recalibrate) the output audio. In some examples, the system 100 may end the channel-paired configuration 1030 and generate output audio corresponding to both the right channel and the left channel using only the third device 110*f*.

FIG. 12 illustrates a disengaging channel-pairing example 1200 in which the fourth device 112 moves from the first location. In this example, the fourth device 112 is disengaging from the channel-pairing with the third device 110*f* based on movement 1230 of the fourth device 112 away from the first location.

As a result of the movement 1230, the system 100 may instruct the third device 110*f* to generate output audio 1210 that corresponds to both a right channel 1215 and a left channel 1220. In addition, the system 100 may instruct the fourth device 112 to stop generating output audio entirely, represented in FIG. 12 as output audio 1240 corresponding to silence 1245. Thus, the system 100 transitions from the third device 110*f* generating the right channel and the fourth device 112 generating the left channel to the third device 110*f* generating both the right channel and the left channel.

In some examples, the fourth device 112 may detect the movement 1230 and send an indication that the fourth device 112 is moving (e.g., notification data), prompting the system 100 to reconfigure the output audio. Depending on a complexity of the fourth device 112, the fourth device 112 may detect the movement 1230 in different ways. In some examples, the fourth device 112 may know an exact location of the fourth device 112 and may detect the movement 1230 when the fourth device 112 changes location. For example, the fourth device 112 may associate a specified area of a room with the first location and may send notification data indicating movement 1230 when the fourth device 112 travels outside of the area (e.g., away from the first location). In other examples, the fourth device 112 may include sensors that detect motion and may determine that movement 1230 is occurring based on detecting motion, without knowing an exact location of the fourth device 112.

The disclosure is not limited thereto, however, and in other examples the fourth device 112 may proactively determine that the movement 1230 will occur and may send the notification data prior to the movement 1230. For example, the fourth device 112 may receive a request to perform a task and may send the notification data prior to actually moving away from the first location. Additionally or alternatively, the fourth device 112 may reactively detect that the movement 1230 occurred and send the notification data after the movement 1230 is complete without departing from the disclosure.

FIG. 13 illustrates an example of a motile device reengaging a channel-paired configuration according to embodiments of the present disclosure. When the fourth device 112 returns to the first location, the system 100 may reestablish the channel-paired configuration 1030 and continue generating the second output audio using the fourth device 112, although the disclosure is not limited thereto. An example of the fourth device 112 returning to the first location is illustrated as a reengaging channel-pairing example 1300 in FIG. 13. In this example, the fourth device 112 is reengaging the channel-pairing with the third device 110*f* based on movement 1330 of the fourth device 112 towards the first location.

As a result of the movement 1330, the system 100 may instruct the third device 110*f* to generate first output audio 1310 that corresponds to a right channel 1315 and may instruct the fourth device 112 to generate second output audio 1320 corresponding to a left channel 1325. Thus, the system 100 transitions from the third device 110*f* generating both the right channel and the left channel back to the third device 110*f* generating the right channel and the fourth device 112 generating the left channel.

In some examples, the fourth device 112 may detect the movement 1330 and send notification data indicating that the fourth device 112 is returning to the first location, prompting the system 100 to reconfigure the output audio. As described above, the fourth device 112 may detect the movement 1330 in different ways depending on a complexity of the fourth device 112. In some examples, the fourth device 112 may know an exact location of the fourth device 112 and may detect the movement 1330 when the fourth device 112 changes location. For example, the fourth device 112 may associate a specified area of a room with the first location and may send notification data indicating the movement 1330 when the fourth device 112 returns to the area (e.g., returns to the first location). The fourth device 112 may send the notification data when the fourth device 112 first enters the area, or may wait until the fourth device 112 is at a base station or other specific location. In other examples, the fourth device 112 may include sensors that detect motion and may determine that movement 1330 is occurring based on detecting motion, without knowing an exact location of the fourth device 112. In this example, the fourth device 112 wouldn't know that it was returning to the first location until it received other input data, such as reconnecting a power cord, processing input audio data, performing an initialization step to detect the third device 110*f* and/or room acoustics, and/or the like. Thus, the system 100 may not reengage the channel-pairing until the fourth device 112 knows that it is at the first location.

The disclosure is not limited thereto, however, and in other examples the fourth device 112 may proactively determine that the movement 1330 will occur and may send the notification data prior to the movement 1330. For example, the fourth device 112 may be returning to a base station after performing a task and may send the notification data prior to actually returning to the first location. Additionally or alternatively, the fourth device 112 may reactively detect that the movement 1330 occurred and send the notification data after the movement 1230 is complete without departing from the disclosure.

FIG. 14 illustrates an example of a motile device disengaging from a channel-paired configuration and a replacement device establishing a new channel-paired configuration according to embodiments of the present disclosure. In some examples, instead of reconfiguring the output audio such that the third device 110*f* generates both the right channel and the left channel, as illustrated in FIG. 12, the system 100 may instead reconfigure the output audio by creating a new channel-paired configuration between the third device 110*f* and a replacement device. For example, the replacement device may be configured to generate the second output audio corresponding to the left channel in place of the fourth device 112.

As described above with regard to FIG. 11, the third device 110*f* and the fourth device 112 may generate output audio while in the channel-paired configuration 1030. In replacement channel-pairing example 1400 illustrated in FIG. 14, however, a first device 110*a* is located near the fourth device 112. The fourth device 112 may detect movement 1430 of the fourth device 112 away from the first location, as described in greater detail above with regard to FIG. 12. In response to the movement 1430, the system 100 may end the channel-paired configuration 1030 between the third device 110*f* and the fourth device 112 and create a new channel-paired configuration between the third device 110*f* and the first device 110*a*.

As illustrated in FIG. 14, the third device 110*f* may generate first output audio 1410 that corresponds to a right channel 1415 and the first device 110*a* may generate second output audio 1420 that corresponds to a left channel 1425. Thus, the system 100 transitions from the fourth device 112 generating the left channel to the first device 110*a* generating the left channel.

When the fourth device 112 returns to the first location, the system 100 may reconfigure the output audio again to end the new channel-paired configuration between the third device 110*f* and the first device 110*a* and to reengage the channel-paired configuration 1030 between the third device 110*f* and the fourth device 112, similar to the reengaging channel-pairing example 1300 illustrated in FIG. 13. However, the disclosure is not limited thereto, and in some examples the system 100 may continue the new channel-paired configuration between the third device 110*f* and the first device 110*a* without departing from the disclosure.

FIG. 15 illustrates an example of a motile device switching from a channel-paired configuration to a device-paired configuration according to embodiments of the present disclosure. As described above, a device-paired configuration corresponds to multiple devices generating the same output audio, instead of generating individual channels of the output audio.

When the fourth device 112 is in the first location, the third device 110*f* and the fourth device 112 may be in the channel-paired configuration 1030 described above. For example, the third device 110*f* may generate first output audio corresponding to the right channel and the fourth device 112 may generate second output audio corresponding to the left channel, as described above with regard to FIG. 11. However, when the fourth device 112 leaves the first location, the system 100 may reconfigure the output audio and switch to a device-paired configuration without departing from the disclosure. Thus, the fourth device 112 may move away from the first location but continue to generate output audio. For example, FIG. 15 illustrates a disengaging with stereo example 1500 in which both the third device 110*f* and the fourth device 112 generate output audio corresponding to both the right channel and the left channel.

As illustrated in FIG. 15, the fourth device 112 may detect movement 1530 of the fourth device 112 away from the first location, as described in greater detail above with regard to FIG. 12. In response to the movement 1530, the third device 110*f* may generate first output audio 1510 corresponding to a right channel 1515 and a left channel 1520. In addition, the fourth device 112 may generate second output audio 1540 corresponding to the right channel 1515 and the left channel 1520. Thus, the user may experience the first output audio 1510 from a first direction associated with the third device 110*f* and the second output audio 1540 from a second direction associated with the fourth device 112 without departing from the disclosure.

In the examples illustrated in FIGS. 11-15, in some examples the fourth device 112 may send the notification data indicating movement or anticipated movement to the second device 110*e*. For example, the second device 110*e* may be sending the output audio data to the third device 110*f* and the fourth device 112, so receiving the notification data indicating movement (e.g., indication of movement) from the fourth device 112 may cause the second device 110*e* to reconfigure the output audio. However, the disclosure is not limited thereto, and in other examples the fourth device 112 may send the notification data to the third device 110*f* without departing from the disclosure. For example, the second device 110*e* may send the output audio data to the third device 110*f* and the third device 110*f* may send the output audio data (or a portion of the output audio data) to the fourth device 112. Additionally or alternatively, the fourth device 112 may send the notification data to the system(s) 120 or other components within the system 100 without departing from the disclosure.

Figure 16B:
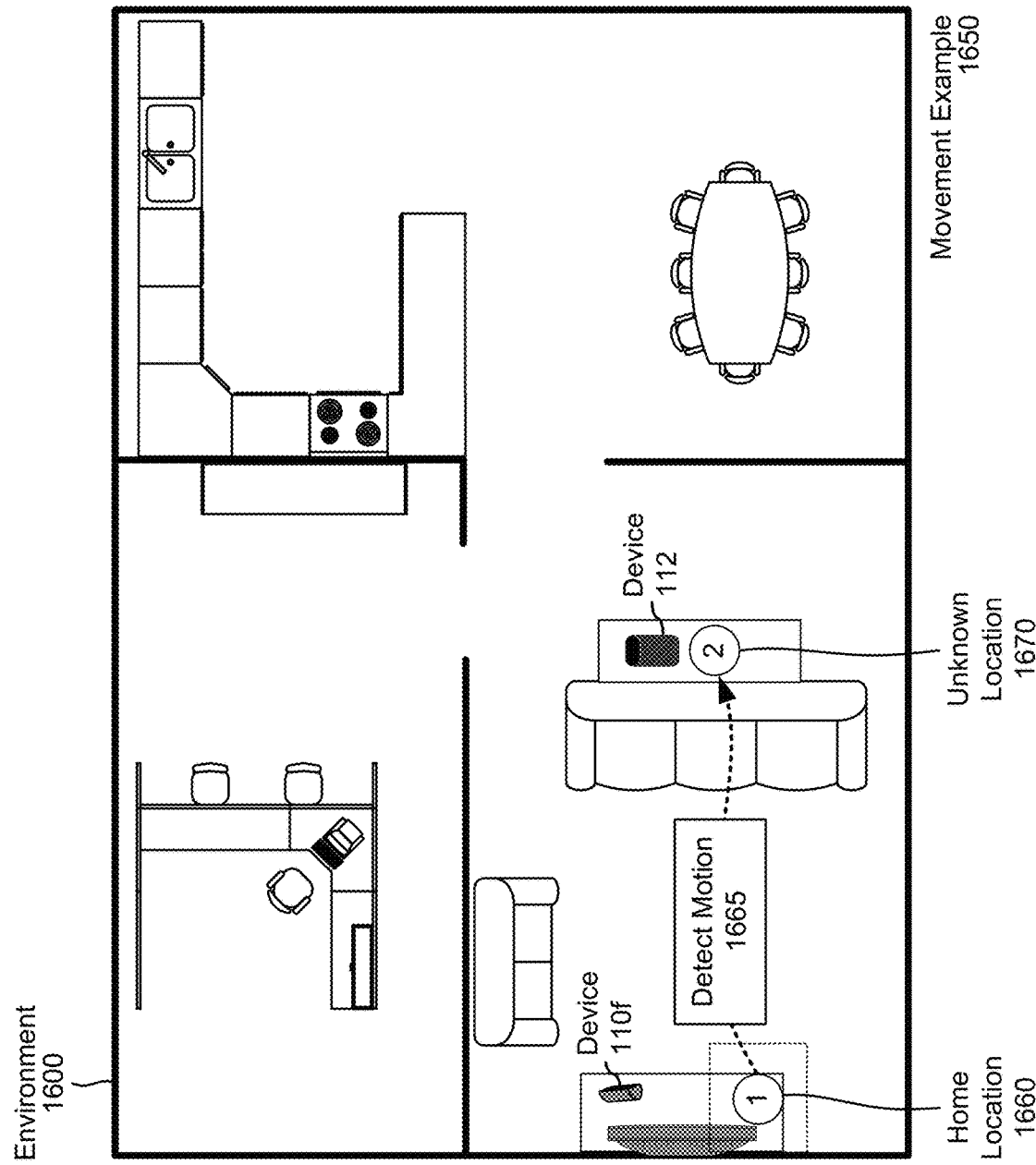

FIGS. 16A-16B illustrate examples of movable devices disengaging from a channel-paired configuration based on tracking a location of the device or detecting movement of the device according to embodiments of the present disclosure. As described above, in some examples, the device 112 may detect movement and send notification data indicating the movement, prompting the system 100 to reconfigure the output audio. Depending on a complexity of the device 112, the device 112 may detect the movement in different ways.

In some examples, the device 112 may include sensors that enable the device 112 to know an exact location of the device 112 and the device 112 may detect movement when the location changes. As illustrated in FIG. 16A, the device 112 may initially be located at a home location 1620 in an environment 1600. The device 112 may track movement 1625 from the home location 1620 to a current location 1630. Thus, the device 112 may know the exact location of the device 112 and may send notification data indicating movement when the device 112 is in motion, exits a specific area (e.g., area surrounding the home location 1620), and/or the like without departing from the disclosure.

In other examples, the device 112 may not know an exact location of the device 112 but may include sensors that detect motion. As illustrated in FIG. 16B, the device 112 may initially be located at a home location 1660 in the environment 1600, represented as a square area near the device 110*f*. The home location 1660 may correspond to a base station, charging cord, and/or the like for the device 112. The device 112 may detect motion 1665 as the device 112 is moved to an unknown location 1670. In this example, while the device 112 does not know an exact location of the device 112, the device 112 is aware that movement occurred and that the device 112 is now in an unknown location. Thus, the system 100 may disengage the device 112 from the channel-paired configuration until a location of the device 112 is known.

FIG. 17 illustrates an example of dynamic surround sound using a motile device according to embodiments of the present disclosure. As described above, in some examples the device 112 may include sensors that enable the device 112 to know an exact location of the device 112. If the system 100 knows an exact location of the device 112 and/or locations of other loudspeakers or devices in the environment 1600, the system 100 may enable dynamic surround sound. For example, as the device 112 moves within the environment 1600, the system 100 may adjust output audio data being sent to the device 112 based on a position of the device 112 relative to the other loudspeakers. Thus, the system 100 may incorporate the device 112 in surround sound output even as a location of the device 112 varies.

FIG. 17 illustrates a dynamic surround sound example 1700. As illustrated in FIG. 17, the system 100 may generate output audio using five output channels 1705; a first output channel (e.g., left-left (LL)), a second output channel (e.g., left-center (LC)), a third output channel (e.g., center (C)), a fourth output channel (e.g., right-center (RC)), and a fifth output channel (e.g., right-right (RR)). This illustrates an example of a 5.1 surround sound system, which would also include a sixth output channel for low frequencies. However, this is intended to conceptually illustrate a single example and the disclosure is not limited thereto.

As illustrated in the dynamic surround sound example 1700, the device 112 may be at a first location (e.g., "1") at a first time, which the system 100 may associate with the first output channel (LL). Thus, the system 100 may send first output audio data corresponding to the first output channel (LL) to the device 112 and the device 112 may generate first output audio 1710 representing the first output channel (LL) 1715.

The device 112 may move from the first location to a second location (e.g., "2"), which the system 100 may associate with the third output channel (C). The device 112 may detect movement 1720 from the first location to the second location and may send notification data indicating the movement 1720 and/or the second location to the system 100. Based on the device 112 being in the second location at a second time, the system 100 may associate the device 112 with the third output channel (C). For example, the system 100 may send second output audio data corresponding to the third output channel (C) to the device 112 and the device 112 may generate second output audio 1710 representing the third output channel (C) 1735.

While not illustrated in FIG. 17, the system 100 may shuffle output audio data for other devices and/or loudspeakers accordingly. For example, a first loudspeaker may generate third output audio representing the second output channel (LC) at the first time, but may generate fourth output audio representing the first output channel (LL) at the second time. Thus, the system 100 may enable the device 112 to move within an area associated with the output channels 1705 and may dynamically adjust the output audio data so that the device 112 generates output audio corresponding to a current location of the device 112.

FIG. 18 is a communication diagram illustrating an example of generating synchronized output using multiple devices according to embodiments of the present disclosure. As illustrated in FIG. 18, a first device 110*a* may receive (1810) group playback directive. For example, the system(s) 120 may send a group playback directive to the first device 110*a*, which may be indicated as the main device. The group playback directive may include device identifiers for the other devices 110/112 in the group. As illustrated in FIG. 18, the other devices 110/112 may include a second device 110*b* and the device 112.

The content provider(s) 125 may receive (1812) a request for output audio data and may send (1814) the output audio data to the first device 110*a*. In some examples, the system(s) 120 may send the request to the content provider(s) 125, although the disclosure is not limited thereto. While not illustrated in FIG. 18, in some examples the total output audio data may already be stored on the first device 110*a* and steps 1812-1814 may be omitted without departing from the disclosure.

The first device 110*a* may coordinate (1816) output with the grouped devices, may send (1818) first output audio data to the second device 110*b*, may send (1820) second output audio data to the device 112, and then the system 100 may generate (1822) output audio. For example, the second device 110*b* may generate a first portion of the output audio using the first output audio data while the device 112 may generate a second portion of the output audio using the second output audio data, although the disclosure is not limited thereto. In some examples, the first device 110*a* may also generate a portion of the output audio. However, the disclosure is not limited thereto, and in other examples the first device 110*a* may coordinate the output audio without generating the output audio (e.g., smart television or other device configured to generate a display) without departing from the disclosure.

While FIG. 18 illustrates an example in which the first device 110*a* sends the first output audio data to the second device 110*b*, the disclosure is not limited thereto. In some examples, the first device 110*a* may be in a channel-paired configuration with just the device 112 and therefore the first device 110*a* may generate the first portion of the output audio using the first output audio data without departing from the disclosure.

FIGS. 19A-19B are communication diagrams illustrating examples of disengaging a channel-paired configuration according to embodiments of the present disclosure. As illustrated in FIG. 19A, the devices 110/112 included in the channel-paired configuration may generate (1822) output audio, as described above with regard to FIG. 18. For example, the first device 110*a*, the second device 110*b*, and/or the device 112 may generate the output audio. However, the disclosure is not limited thereto, and in some examples only the second device 110*b* and the device 112 may generate the output audio without departing from the disclosure.

As illustrated in FIG. 19A, the device 112 may determine (1910) to disengage from the channel-pairing and may send (1912) a request to disengage to the first device 110*a*. In some examples, the device 112 may determine to disengage from the channel-paired configuration due to a location of the device 112 changing, as the change in location would negatively affect a user experience (e.g., output audio would no longer be synchronized between the devices 110/112). For example, the device 112 may detect a change in location by detecting motion of the device 112 using sensor(s) configured to detect motion (e.g., accelerometer and/or the like), by detecting movement of the device 112 using sensor(s) configured to determine a location of the device 112, by determining that the device 112 will move in response to receiving a command requesting that the device 112 perform a task, and/or the like without departing from the disclosure.

The first device 110a may receive the request to disengage from the device 112 and may determine (1914) remaining device(s) configured to generate output audio. For example, the first device 110a may determine that only the second device 110b is configured to generate output audio and may send both channels of the output audio data to the second device 110b. Thus, the first device 110a may send (1916) the first and second output audio data to the second device 110b and the second device 110b may generate (1918) output audio using the first output audio data and the second output audio data.

While FIG. 19A illustrates an example of switching from the channel-paired configuration to a single output device (e.g., second device 110b generates output audio corresponding to both the right channel and the left channel), the disclosure is not limited thereto. In some examples, the system 100 may replace the device 112 with a third device 110c and send the second output audio data to the third device 110c to generate a portion of the output audio, as described in greater detail below with regard to FIG. 19B.

As illustrated in FIG. 19B, the devices 110/112 included in the channel-paired configuration may generate (1822) output audio and then the device 112 may determine (1910) to disengage from the channel-pairing, the device 112 may send (1912) a request to disengage from the channel-pairing to the first device 110a, and the first device 110a may determine (1914) remaining device(s) configured to generate output audio, as described above with regard to FIG. 19A. However, instead of sending both channels of the output audio data to the second device 110b, the system 100 may add a new device and send a portion of the output audio data to the new device.

As illustrated in FIG. 19B, the first device 110a may determine (1930) to add a new device, such as the third device 110c. For example, the first device 110a may identify potential devices 110/112 in proximity to the first location, the first device 110a, and/or the second device 110b, and may select a candidate device configured to generate output audio. The first device 110a may send (1932) the first output audio data to the second device 110b and may send (1934) the second output audio data to the third device 110c. Using the first output audio data and the second output audio data, the second device 110b and the third device 110c may generate (1936) output audio. For example, the second device 110b may generate a first portion of the output audio corresponding to a first channel (e.g., left channel in stereo audio) and the third device 110c may generate a second portion of the output audio corresponding to a second channel (e.g., right channel in stereo audio).

While FIG. 19A illustrates an example of the system 100 transitioning from generating stereo output audio using two devices (e.g., the device 112 and the second device 110b in step 1822) to generating stereo output audio using only the second device 110b in step 1918, the disclosure is not limited thereto. In some examples, the system 100 may generate output audio having three or more channels using three or more devices 110/112 in step 1822 and transition to generating output audio having three or more channels using two or more devices 110/112 in step 1918 without departing from the disclosure. For example, the system 100 may shift a single channel in a 5.1 surround sound system to the second device 110b, such that the second device 110b generates output audio corresponding to two channels and other devices 110/112 continue generating output audio corresponding to a single channel.

Similarly, while FIG. 19B illustrates an example of the system 100 transitioning from generating stereo output audio using a first pair of devices (e.g., the second device 110b and the device 112 in step 1822) to generating stereo output audio using a second pair of devices (e.g., the second device 110b and the third device 110c in step 1918), the disclosure is not limited thereto. In some examples, the system 100 may generate output audio having three or more channels using three or more devices 110/112 in step 1822 and may generate output audio having three or more channels using three or more devices 110/112 in step 1936 without departing from the disclosure. For example, the system 100 may shift a single channel in a 5.1 surround sound system from the device 112 to the third device 110c without departing from the disclosure.

Figure 20A:
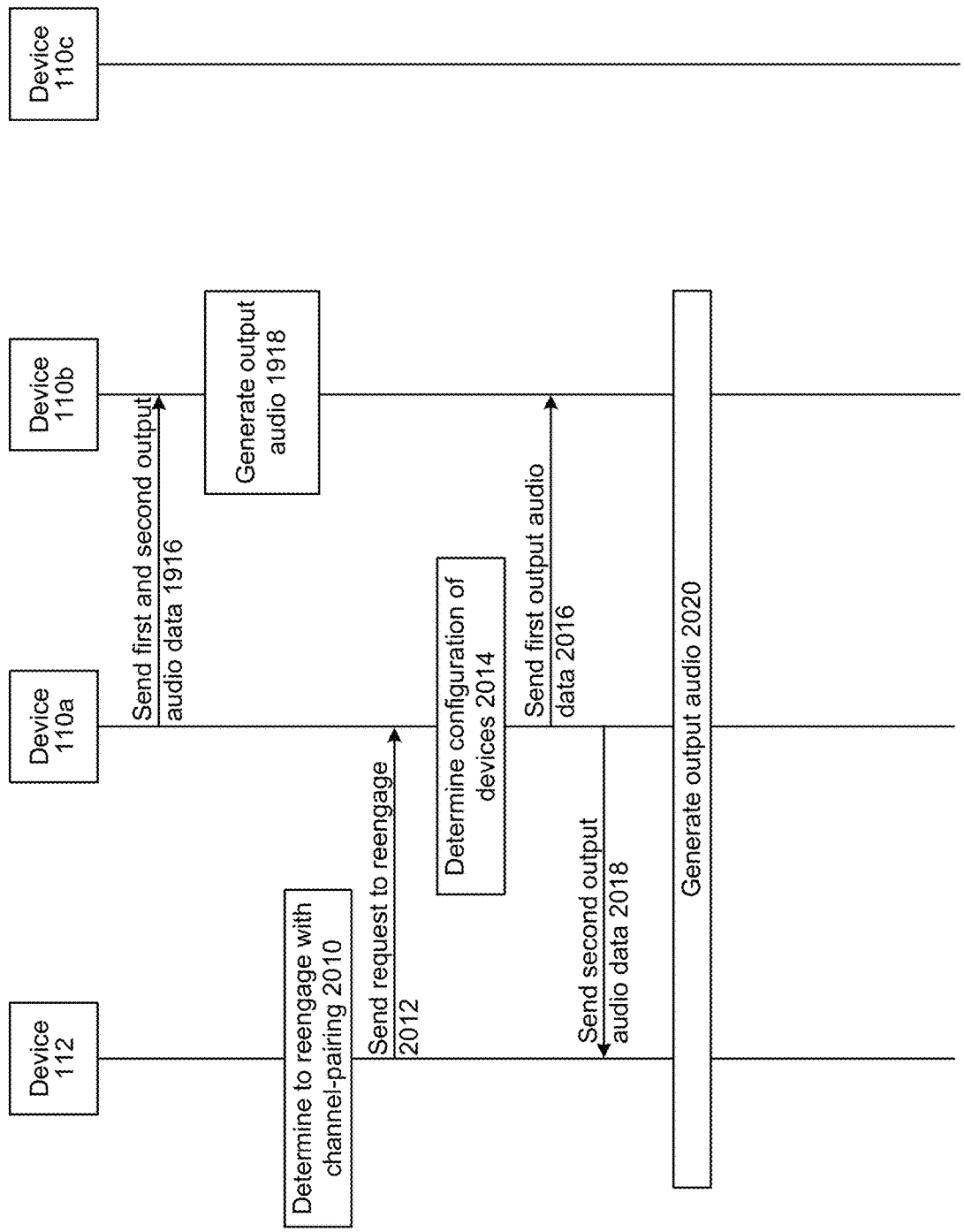
FIGS. 20A-20B are communication diagrams illustrating examples of reengaging a channel-paired configuration according to embodiments of the present disclosure.
Figure 20B:
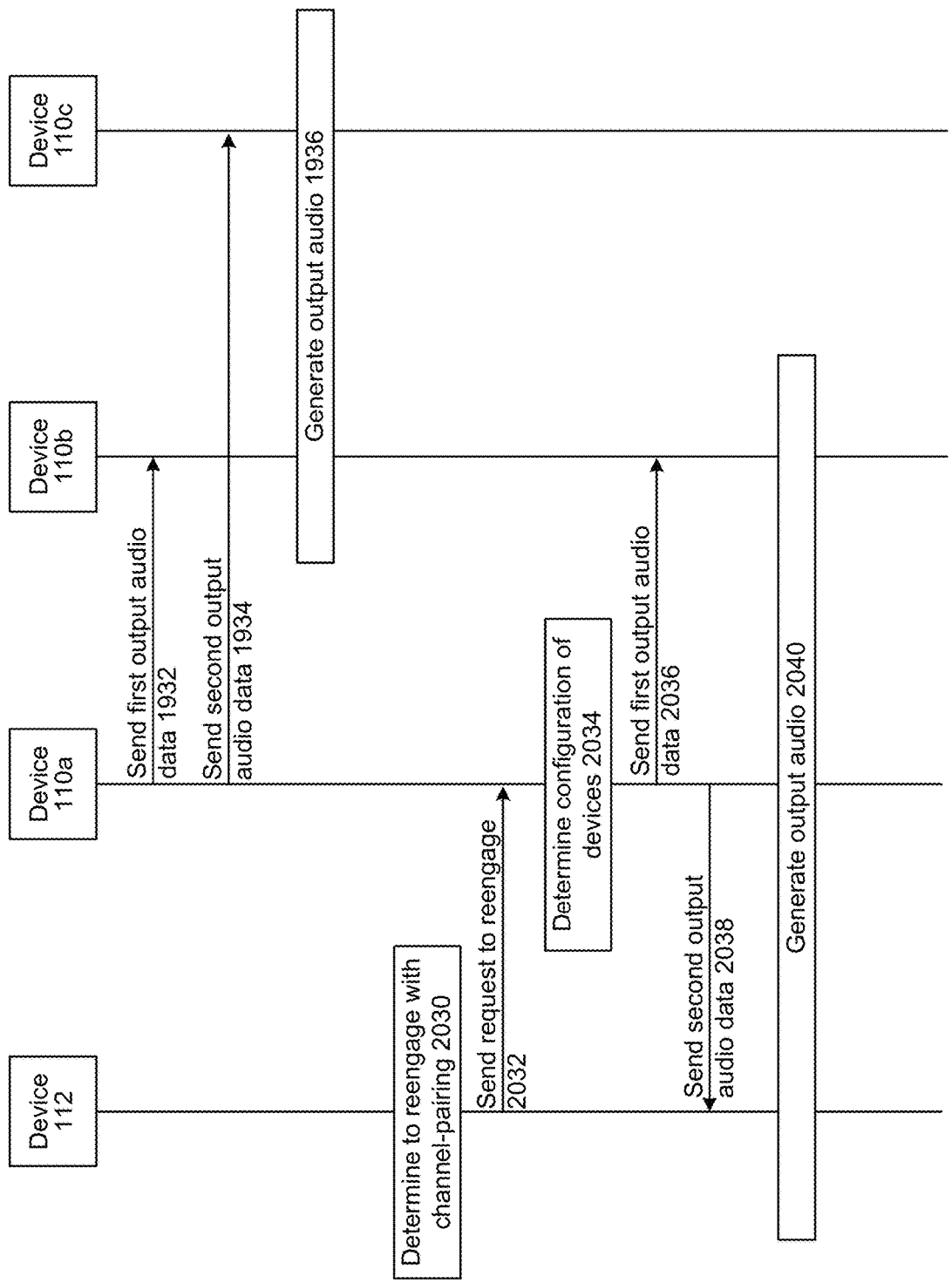

FIGS. 20A-20B are communication diagrams illustrating examples of reengaging a channel-paired configuration according to embodiments of the present disclosure. As illustrated in FIG. 20A, the first device 110a may send (1916) the first and second output audio data to the second device 110b and the second device 110b may generate (1918) the output audio data, as described above with regard to FIG. 19A.

The device 112 may determine (2010) to reengage with the channel pairing and may send (2012) a request to reengage to the first device 110a. In some examples, the device 112 may determine to reengage the channel-paired configuration due to the device 112 returning to the first location (e.g., home station), as the device 112 may generate output audio synchronized with the second device 110b from the first location. For example, the device 112 may determine that the device 112 is returning to the first location using sensor(s) configured to determine a location of the device 112, by determining that the device 112 will move to the first location in response to receiving a command and/or after performing a task corresponding to a previous command, and/or the like without departing from the disclosure.

In some examples, the device 112 does not include sensors that identify a current location of the device 112. Thus, the device 112 may determine that the device 112 is returning to the first location using a two-step process. For example, in a first step the device 112 may determine that a location of the device 112 has changed by detecting motion of the device 112 using sensor(s) configured to detect motion (e.g., accelerometer and/or the like). In a second step, the device 112 may perform some processing to determine that the device 112 is in the first location. For example, the device 112 may communicate with the first device 110a, the second device 110b, and/or other devices 110/112, may generate audio data and perform signal processing on the audio data, and/or determine a location of the device 112 using other techniques known to one of skill in the art.

The first device 110a may receive the request to reengage from the device 112 and may determine (2014) a configuration of the devices 110/112 used to generate output audio. For example, the first device 110a may determine that only the second device 110b is currently configured to generate output audio and that the first device 110a is sending both channels of the output audio data to the second device 110b. Thus, the first device 110a may determine a new configuration that includes channel-pairing of the device 112 and the second device 110b. For example, the first device 110a may send (2016) first output audio data to the second device 110b and may send (2018) second output audio data to the device 112. The device 112 and the second device 110b may generate (2020) output audio using the first output audio data and the second output audio data.

FIG. 20B illustrates a similar example of reengaging a channel-paired configuration when the device 112 is replaced by the third device 110*c*. For example, the first device 110*a* may send (1932) the first output audio data to the second device 110*b*, may send (1934) the second output audio data to the third device 110*c*, and may generate (1936) the output audio data, as described above with regard to FIG. 19B.

The device 112 may determine (2030) to reengage with the channel pairing and may send (2032) a request to reengage to the first device 110*a*. In some examples, the device 112 may determine to reengage the channel-paired configuration due to the device 112 returning to the first location (e.g., home station), as the device 112 may generate output audio synchronized with the second device 110*b* from the first location. The device 112 may determine that the device 112 is returning to the first location as described above with regard to FIG. 20A.

The first device 110*a* may receive the request to reengage from the device 112 and may determine (2034) a configuration of the devices 110/112 used to generate output audio. For example, the first device 110*a* may determine that the second device 110*b* and the third device 110*c* are currently configured to generate output audio. Thus, the first device 110*a* may determine a new configuration that includes channel-pairing of the device 112 and the second device 110*b*. For example, the first device 110*a* may send (2036) first output audio data to the second device 110*b* and may send (2038) second output audio data to the device 112. The device 112 and the second device 110*b* may generate (2040) output audio using the first output audio data and the second output audio data.

Figure 21:
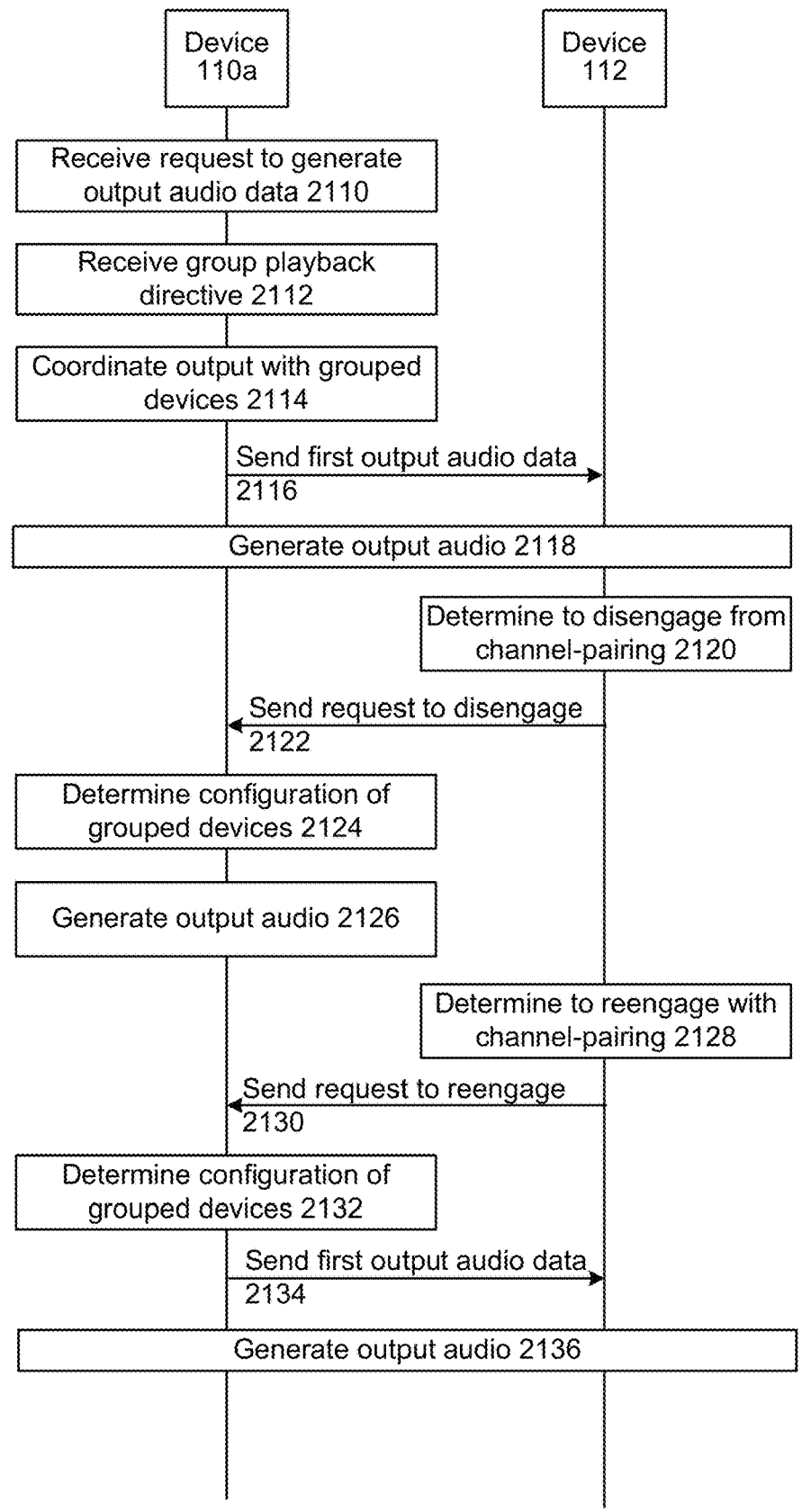
FIG. 21 is a communication diagram illustrating an example of generating synchronized output using local audio data according to embodiments of the present disclosure.

FIG. 21 is a communication diagram illustrating an example of generating synchronized output using local audio data according to embodiments of the present disclosure. As illustrated in FIG. 21, a first device 110*a* may receive (2110) a request for output audio data. For example, the first device 110*a* may receive an input command requesting that the first device 110*a* generate the output audio data. In some examples, the system(s) 120 may send the request to the first device 110*a*, although the disclosure is not limited thereto.

The first device 110*a* may receive (2112) a group playback directive. For example, the system(s) 120 may send the group playback directive to the first device 110*a*, which may be indicated as the main device. However, the disclosure is not limited thereto, and the first device 110*a* may determine the group playback directive based on an input command without departing from the disclosure. The group playback directive may include device identifiers for the other devices 110/112 in the group. As illustrated in FIG. 21, the other devices 110/112 may include the device 112, although the disclosure is not limited thereto and the group may include additional devices without departing from the disclosure.

The first device 110*a* may coordinate (2114) output with the grouped devices and may send (2116) first output audio data to the device 112, and then the system 100 may generate (2118) output audio. For example, the device 112 may generate a first portion of the output audio using the first output audio data and the first device 110*a* may generate a second portion of the output audio using second output audio data, although the disclosure is not limited thereto. In some examples, the first device 110*a* may send additional output audio data to additional devices 110/112 without departing from the disclosure. In the example illustrated in FIG. 21, the first device 110*a* retrieves the output audio data from local storage on the first device 110*a*, such as a storage component of the first device 110*a*, instead of receiving the output audio data from the content provider(s) 125.

As illustrated in FIG. 21, the device 112 may determine (2120) to disengage from the channel-pairing and may send (2122) a request to disengage to the first device 110*a*. In some examples, the device 112 may determine to disengage from the channel-paired configuration due to a location of the device 112 changing, as the change in location would negatively affect a user experience (e.g., output audio would no longer be synchronized between the devices 110/112). For example, the device 112 may detect a change in location by detecting motion of the device 112 using sensor(s) configured to detect motion (e.g., accelerometer and/or the like), by detecting movement of the device 112 using sensor(s) configured to determine a location of the device 112, by determining that the device 112 will move in response to receiving a command requesting that the device 112 perform a task, and/or the like without departing from the disclosure.

The first device 110*a* may receive the request to disengage from the device 112 and may determine (2124) a configuration of the grouped devices. For example, the first device 110*a* may determine that only the first device 110*a* is included in the grouped devices and may generate (2126) output audio using the first output audio data and the second output audio data.

The device 112 may determine (2128) to reengage with the channel pairing and may send (2130) a request to reengage to the first device 110*a*. In some examples, the device 112 may determine to reengage the channel-paired configuration due to the device 112 returning to the first location (e.g., home station), as the device 112 may generate output audio synchronized with the second device 110*b* from the first location. For example, the device 112 may determine that the device 112 is returning to the first location using sensor(s) configured to determine a location of the device 112, by determining that the device 112 will move to the first location in response to receiving a command and/or after performing a task corresponding to a previous command, and/or the like without departing from the disclosure.

In some examples, the device 112 does not include sensors that identify a current location of the device 112. Thus, the device 112 may determine that the device 112 is returning to the first location using a two-step process. For example, in a first step the device 112 may determine that a location of the device 112 has changed by detecting motion of the device 112 using sensor(s) configured to detect motion (e.g., accelerometer and/or the like). In a second step, the device 112 may perform some processing to determine that the device 112 is in the first location. For example, the device 112 may communicate with the first device 110*a*, the second device 110*b*, and/or other devices 110/112, may generate audio data and perform signal processing on the audio data, and/or determine a location of the device 112 using other techniques known to one of skill in the art.

The first device 110*a* may receive the request to reengage from the device 112 and may determine (2132) a configuration of the grouped devices 110/112 used to generate output audio. For example, the first device 110*a* may determine that only the first device 110*a* is currently configured to generate output audio using both channels of the output audio data. Thus, the first device 110*a* may determine a new configuration that includes channel-pairing of the device 112 and the first device 110*a*. For example, the first device 110*a* may send (2134) the first output audio data to the device 112 and the system 100 may generate (2136) output audio. For example, the device 112 may generate a first portion of the output audio using the first output audio data and the first device 110*a* may generate a second portion of the output audio using second output audio data, although the disclosure is not limited thereto.

FIG. 22 is a communication diagram illustrating an example of generating synchronized output using multiple devices according to embodiments of the present disclosure. As illustrated in FIG. 22, the system(s) 120 may receive (2210) a request for output audio data and may determine (2212) a multi-device configuration. In the example illustrated in FIG. 22, the multi-device configuration includes the first device 110*a* and the device 112, although the disclosure is not limited thereto and additional devices 110/112 may be included without departing from the disclosure.

The system(s) 120 may send (2214) an instruction to output audio data to the content provider(s) 125. In response, the content provider(s) 125 may send (2216) first output audio data to the first device 110*a*, may send (2218) second output audio data to the device 112, and the system 100 may generate (2220) output audio. For example, the first device 110*a* may generate a first portion of the output audio using the first output audio data while the device 112 may generate a second portion of the output audio using the second output audio data, although the disclosure is not limited thereto.

In some examples, the first device 110*a* and/or the device 112 may receive notification data indicating a number of devices 110/112 that are synchronized within the device group. For example, in addition to receiving the first output audio data, the first device 110*a* may receive first notification data indicating that the first device 110*a* is synchronized with the device 112. To illustrate an example, the first notification data may indicate that the first output audio data is synchronized with the second output audio data associated with the device 112, although the disclosure is not limited thereto. Additionally or alternatively, the first notification data may indicate that the first device 110*a* is synchronized with the device 112 without departing from the disclosure. Similarly, in addition to receiving the second output audio data, the device 112 may receive second notification data indicating that the device 112 is synchronized with the first device 110*a*. For example, the second notification data may indicate that the second output audio data is synchronized with the first output audio data associated with the first device 110*a* and/or that the device 112 is synchronized with the first device 110*a* without departing from the disclosure.

While FIG. 22 only illustrates an example in which the first device 110*a* and the device 112 are synchronized, the disclosure is not limited thereto. Thus, while not illustrated in FIG. 22, the first notification data and/or the second notification data may indicate that the first device 110*a* and the device 112 are synchronized with a second device 110*b* and/or that the first output audio data and the second output audio data is synchronized with third output audio data associated with the second device 110*b* without departing from the disclosure.

Figure 23B:
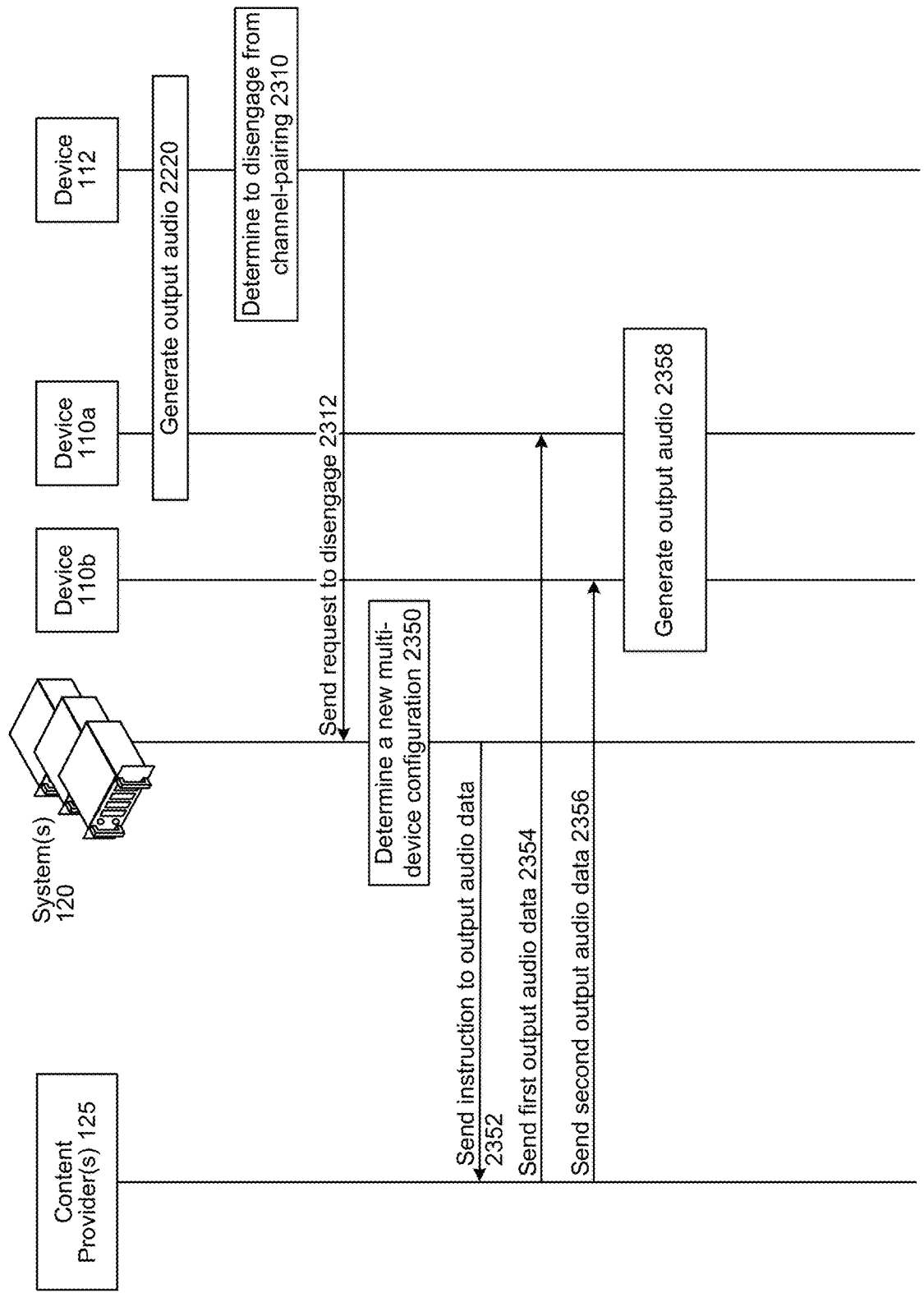

FIGS. 23A-23B are communication diagrams illustrating examples of disengaging a channel-paired configuration according to embodiments of the present disclosure. As illustrated in FIG. 23A, the devices 110/112 included in the channel-paired configuration may generate (2220) output audio, as described above with regard to FIG. 22. For example, the first device 110*a* and the device 112 may generate the output audio, although the disclosure is not limited thereto and additional devices 110/112 may output audio without departing from the disclosure.

As illustrated in FIG. 23A, the device 112 may determine (2310) to disengage from the channel-pairing and may send (2312) a request to disengage to the system(s) 120. In some examples, the device 112 may determine to disengage from the channel-paired configuration due to a location of the device 112 changing, as the change in location would negatively affect a user experience (e.g., output audio would no longer be synchronized between the devices 110/112). For example, the device 112 may detect a change in location by detecting motion of the device 112 using sensor(s) configured to detect motion (e.g., accelerometer and/or the like), by detecting movement of the device 112 using sensor(s) configured to determine a location of the device 112, by determining that the device 112 will move in response to receiving a command requesting that the device 112 perform a task, and/or the like without departing from the disclosure.

The system(s) 120 may receive the request to disengage from the device 112 and may determine (2314) a new multi-device configuration, such as determining remaining device(s) configured to generate output audio. For example, the system(s) 120 may determine that only the first device 110*a* is configured to generate output audio and may cause both channels of the output audio data to be sent to the first device 110*a*, although the disclosure is not limited thereto.

As illustrated in FIG. 23A, the system(s) 120 may send (2316) an instruction to output audio data to the content provider(s) 125. In response, the content provider(s) 125 may send (2318) the total output audio data (e.g., first and second output audio data) to the first device 110*a* and the first device 110*a* may generate (2320) output audio using the first output audio data and the second output audio data.

While FIG. 23A illustrates an example of switching from the channel-paired configuration to a single output device (e.g., first device 110*a* generates output audio corresponding to both the right channel and the left channel), the disclosure is not limited thereto. In some examples, the system 100 may replace the device 112 with a second device 110*b* and send the second output audio data to the second device 110*b* to generate a portion of the output audio, as described in greater detail below with regard to FIG. 23B.

As illustrated in FIG. 23B, the devices 110/112 included in the channel-paired configuration may generate (2220) output audio, as described above with regard to FIG. 22. For example, the first device 110*a* and the device 112 may generate the output audio, although the disclosure is not limited thereto and additional devices 110/112 may output audio without departing from the disclosure.

As illustrated in FIG. 23B, the device 112 may determine (2310) to disengage from the channel-pairing and may send (2312) a request to disengage to the system(s) 120, as described above with regard to FIG. 23A. The system(s) 120 may receive the request to disengage from the device 112 and may determine (2350) a new multi-device configuration, such as determining remaining device(s) configured to generate output audio. For example, the system(s) 120 may determine to add a new device, such as the second device 110*b*, although the disclosure is not limited thereto. In some examples, the system(s) 120 may identify potential devices 110/112 in proximity to the first location and/or the first device 110*a*, and may select a candidate device configured to generate output audio.

As illustrated in FIG. 23B, the system(s) 120 may send (2352) an instruction to output audio data to the content provider(s) 125. In response, the content provider(s) 125 may send (2354) first output audio data to the first device 110*a* and may send (2356) second output audio data to the second device 110*b*, and the system 100 may generate (2358) output audio data.

In some examples, the first device 110a and/or the second device 110b may receive notification data indicating a number of devices 110/112 that are synchronized within the device group. For example, in addition to receiving the first output audio data, the first device 110a may receive first notification data indicating that the first device 110a is synchronized with the second device 110b. To illustrate an example, the first notification data may indicate that the first output audio data is synchronized with the second output audio data associated with the second device 110b, although the disclosure is not limited thereto. Additionally or alternatively, the first notification data may indicate that the first device 110a is synchronized with the second device 110b without departing from the disclosure. Similarly, in addition to receiving the second output audio data, the second device 110b may receive second notification data indicating that the second device 110b is synchronized with the first device 110a. For example, the second notification data may indicate that the second output audio data is synchronized with the first output audio data associated with the first device 110a and/or that the second device 110b is synchronized with the first device 110a without departing from the disclosure.

While FIG. 23B only illustrates an example in which the first device 110a and the second device 110b are synchronized, the disclosure is not limited thereto. Thus, while not illustrated in FIG. 23B, the first notification data and/or the second notification data may indicate that the first device 110a and the second device 110b are synchronized with a third device 110c and/or that the first output audio data and the second output audio data is synchronized with third output audio data associated with the third device 110c without departing from the disclosure.

While FIG. 23A illustrates an example of the system 100 transitioning from generating stereo output audio using two devices (e.g., the device 112 and the first device 110a in step 2220) to generating stereo output audio using only the first device 110a in step 2320, the disclosure is not limited thereto. In some examples, the system 100 may generate output audio having three or more channels using three or more devices 110/112 in step 2220 and transition to generating output audio having three or more channels using two or more devices 110/112 in step 2320 without departing from the disclosure. For example, the system 100 may shift a single channel in a 5.1 surround sound system to the first device 110a, such that the first device 110a generates output audio corresponding to two channels and other devices 110/112 continue generating output audio corresponding to a single channel.

Similarly, while FIG. 23B illustrates an example of the system 100 transitioning from generating stereo output audio using a first pair of devices (e.g., the first device 110a and the device 112 in step 2220) to generating stereo output audio using a second pair of devices (e.g., the first device 110a and the second device 110b in step 2358), the disclosure is not limited thereto. In some examples, the system 100 may generate output audio having three or more channels using three or more devices 110/112 in step 2220 and may generate output audio having three or more channels using three or more devices 110/112 in step 2358 without departing from the disclosure. For example, the system 100 may shift a single channel in a 5.1 surround sound system from the device 112 to the second device 110b without departing from the disclosure.

Figure 25:
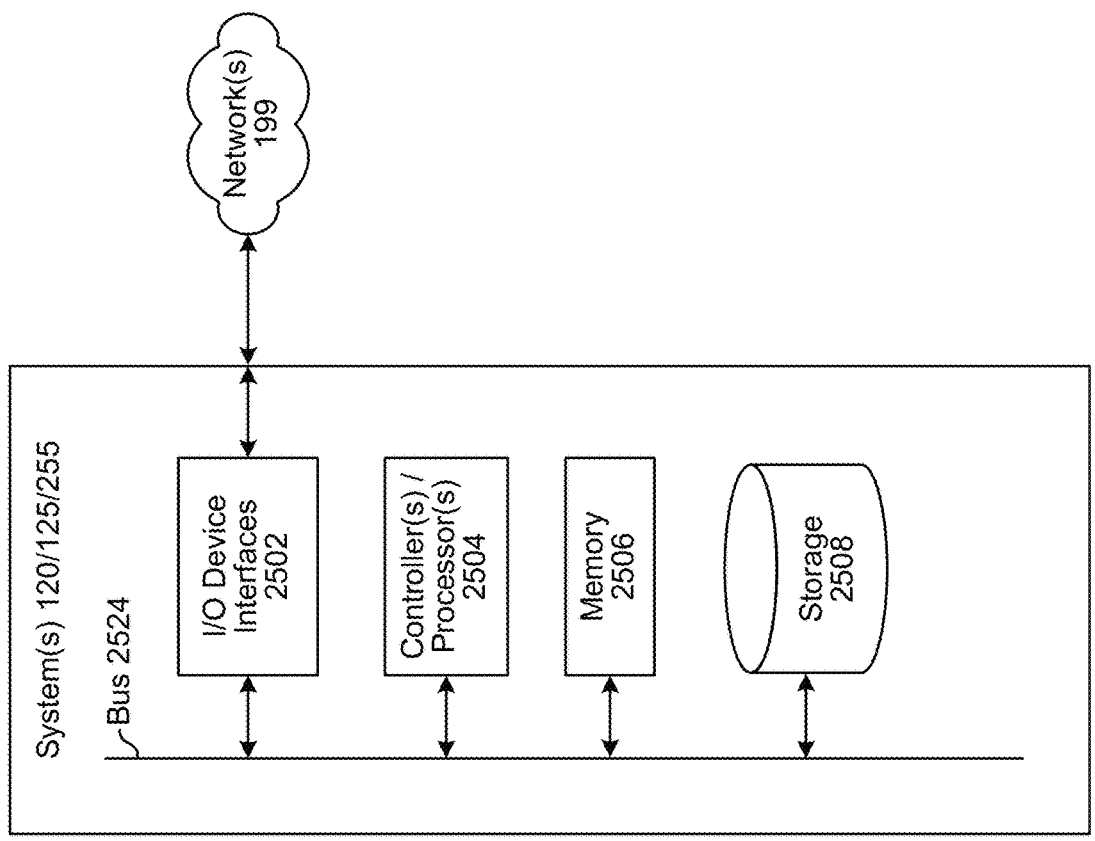
FIG. 25 is a block diagram conceptually illustrating example components of a server according to embodiments of the present disclosure.

FIG. 24 is a block diagram conceptually illustrating a device 110 that may be used with the system. FIG. 25 is a block diagram conceptually illustrating example components of a remote device, such as the natural language processing system(s) 120, which may assist with ASR processing, NLU processing, etc.; one or more content provider(s) 125, and/or skill system(s) 225. Multiple systems (120/125/225) may be included in the overall system 100 of the present disclosure, such as one or more natural language processing systems 120 for performing ASR processing, one or more natural language processing systems 120 for performing NLU processing, one or more content providers 125, one or more skill systems 225, etc. In operation, each of these systems may include computer-readable and computer-executable instructions that reside on the respective device (120/125/225), as will be discussed further below.

A system (120/125/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Each of these devices (110/112) and/or systems (120/125/225) may include one or more controllers/processors (2404/2504), which may each include a central processing unit (CPU) for processing data and computer-readable instructions, and a memory (2406/2506) for storing data and instructions of the respective device. The memories (2406/2506) may individually include volatile random access memory (RAM), non-volatile read only memory (ROM), non-volatile magnetoresistive memory (MRAM), and/or other types of memory. Each device (110/112) and/or system (120/125/225) may also include a data storage component (2408/2508) for storing data and controller/processor-executable instructions. Each data storage component (2408/2508) may individually include one or more non-volatile storage types such as magnetic storage, optical storage, solid-state storage, etc. Each device (110/112) and/or system (120/125/225) may also be connected to removable or external non-volatile memory and/or storage (such as a removable memory card, memory key drive, networked storage, etc.) through respective input/output device interfaces (2402/2502).

Computer instructions for operating each device (110/112) and/or system (120/125/225) and its various components may be executed by the respective device's controller(s)/processor(s) (2404/2504), using the memory (2406/2506) as temporary "working" storage at runtime. A device's computer instructions may be stored in a non-transitory manner in non-volatile memory (2406/2506), storage (2408/2508), or an external device(s). Alternatively, some or all of the executable instructions may be embedded in hardware or firmware on the respective device in addition to or instead of software.

Each device (110/112) and/or system (120/125/225) includes input/output device interfaces (2402/2502). A variety of components may be connected through the input/ output device interfaces (2402/2502), as will be discussed further below. Additionally, each device (110/112) and/or system (120/125/225) may include an address/data bus (2424/2524) for conveying data among components of the respective device. Each component within a device (110/112) and/or system (120/125/225) may also be directly connected to other components in addition to (or instead of) being connected to other components across the bus (2424/2524).

Referring to FIG. 24, the device (110/112) may include input/output device interfaces 2402 that connect to a variety of components such as an audio output component such as a speaker 2412, a wired headset or a wireless headset (not illustrated), or other component capable of outputting audio. The device (110/112) may also include an audio capture component. The audio capture component may be, for example, a microphone 2420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device (110/112) may additionally include a display 2416 for displaying content and/or a camera 2418 to capture image data, although the disclosure is not limited thereto.

Via antenna(s) 2414, the input/output device interfaces 2402 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (2402/2502) may also include communication components that allow data to be exchanged between devices such as different physical servers in a collection of servers or other components.

The components of the device(s) (110/112) and the system(s) (120/125/225) may include their own dedicated processors, memory, and/or storage. Alternatively, one or more of the components of the device(s) (110/112) and/or the system(s) (120/125/225) may utilize the I/O interfaces (2402/2502), processor(s) (2404/2504), memory (2406/2506), and/or storage (2408/2508) of the device(s) (110/112) and system(s) (120/125/225), respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device(s) (110/112) and the system(s) (120/125/225), as described herein, are illustrative, and may be located as a stand-alone device or may be included, in whole or in part, as a component of a larger device or system.

As illustrated in FIG. 26, multiple devices (110a-110g, 112, 120, 125, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a speech-detection device 110b, refrigerator 110c, display device 110d, a smart television 110e, a display device 110f, a headless device 110g (e.g., configured to connect to a television), a device 112a, and/or a device 112b, may be connected to the network(s) 199 through a wireless service provider (e.g., using a WiFi or cellular network connection), over a wireless local area network (WLAN) (e.g., using WiFi or the like), over a wired connection such as a local area network (LAN), and/or the like. Other devices are included as network-connected support devices, such as the system(s) 120, one or more content provider(s) 125, one or more skill system(s) 225, and/or others. The support devices may connect to the network(s) 199 through a wired connection or wireless connection. The devices (110/112) may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving, by a first device, first audio data comprising a first portion corresponding to a left channel and a second portion corresponding to a right channel;
   sending, by the first device to a second device, the first portion of the first audio data;
   sending, by the first device to a third device, the second portion of the first audio data, the third device in a first location;
   causing first output audio to be generated, wherein a first portion of the first output audio is generated by the second device using the first portion of the first audio data, and a second portion of the first output audio is generated by the third device using the second portion of the first audio data;
   receiving an indication that the third device will move from the first location;
   receiving, by the first device, second audio data comprising a first portion corresponding to the left channel and a second portion corresponding to the right channel;
   sending, by the first device to the second device, the second audio data; and
   causing second output audio to be generated, wherein a first portion of the second output audio is generated by a first loudspeaker of the second device using the first portion of the second audio data, and a second portion of the second output audio is generated by a second loudspeaker of the second device using the second portion of the second audio data.

2. The computer-implemented method of claim 1, further comprising:
   receiving, by the first device from the third device, a notification indicating that the third device has returned to the first location;
   receiving, by the first device, third audio data comprising a first portion corresponding to the left channel and a second portion corresponding to the right channel; and
   causing third output audio to be generated, wherein a first portion of the third output audio is generated by the second device using the first portion of the third audio data, and a second portion of the third output audio is generated by the third device using the second portion of the third audio data.

3. The computer-implemented method of claim 1, wherein causing the second output audio to be generated further comprises:
   sending the second audio data to the third device, the third device associated with a third loudspeaker and a fourth loudspeaker;
   causing a third portion of the second output audio to be generated by the third loudspeaker using the first portion of the second audio data; and
   causing a fourth portion of the second output audio to be generated by the fourth loudspeaker using the second portion of the second audio data.

4. The computer-implemented method of claim 1, further comprising, by the third device:
   receiving a command to perform an action;
   determining that performing the action will require the third device to move to a second location different than the first location;
   sending, to the first device, the indication that the third device will move from the first location;
   performing the action;
   returning to the first location;
   determining that the third device is in the first location; and
   sending, to the first device, a second indication that the third device is in the first location.

5. A computer-implemented method, the method comprising:
   determining, by a first device, first audio data;
   sending, by the first device to a second device, at least a first portion of the first audio data;
   causing first output audio to be generated, wherein a first portion of the first output audio is generated by the second device and a second portion of the first output audio is generated by a first loudspeaker;
   determining, by the first device, first data relating to movement of the second device relative to the first device;
   determining, by the first device, second audio data;
   causing second output audio to be generated, wherein at least a first portion of the second output audio is generated by the first loudspeaker;
   determining second data relating to the second device returning to a first location;
   determining, by the first device, third audio data; and
   causing third output audio to be generated, wherein a first portion of the third output audio is generated by the second device and a second portion of the third output audio is generated by the first loudspeaker.

6. The computer-implemented method of claim 5, wherein causing the second output audio to be generated further comprises:
   identifying a third device that is associated with a second loudspeaker;
   sending, by the first device to the third device, at least a portion of the second audio data; and
   sending, by the first device to the third device, a command to generate a second portion of the second output audio.

7. The computer-implemented method of claim 5, wherein causing the second output audio to be generated further comprises:
   sending the second audio data to a third device that is associated with the first loudspeaker and a second loudspeaker;

causing the first portion of the second output audio to be generated by the first loudspeaker; and causing a second portion of the second output audio to be generated by the second loudspeaker.

8. The computer-implemented method of claim 5, wherein causing the second output audio to be generated further comprises:

generating, using a first portion of the second audio data and the first loudspeaker, the first portion of the second output audio; and generating, using a second portion of the second audio data and a second loudspeaker, a second portion of the second output audio, wherein the first loudspeaker and the second loudspeaker are associated with the first device.

9. The computer-implemented method of claim 5, wherein the first portion of the first output audio is generated by the second device using the first portion of the first audio data, the second portion of the first output audio is generated by the first loudspeaker using a second portion of the first audio data, and causing the second output audio to be generated further comprises:

sending the second audio data to the second device;

causing the first portion of the second output audio to be generated by the first loudspeaker using the second audio data; and causing a second portion of the second output audio to be generated by the second device using the second audio data.

10. The computer-implemented method of claim 5, wherein determining the first data further comprises:

receiving, by the first device from the second device, notification data indicating that the second device will be moving from the first location.

11. The computer-implemented method of claim 5, wherein determining the first data further comprises:

receiving, by the first device from the second device, notification data indicating that the second device detected motion.

12. The computer-implemented method of claim 5, wherein determining the first audio data further comprises:

receiving, by the first device, the first audio data; and receiving, by the first device, first notification data indicating that the first audio data is synchronized with fourth audio data associated with a third device, wherein determining the second audio data further comprises:

receiving, by the first device, the second audio data, and receiving, by the first device, second notification data indicating that the second audio data is synchronized with fifth audio data associated with the third device.

13. A system comprising:

at least one processor; and memory including instructions operable to be executed by the at least one processor to cause the system to:

determine, by a first device, first audio data;

send, by the first device to a second device, at least a first portion of the first audio data;

cause first output audio to be generated, wherein a first portion of the first output audio is generated by the second device and a second portion of the first output audio is generated by a first loudspeaker;

determine, by the first device, first data relating to movement of the second device relative to the first device;

determine, by the first device, second audio data;

identify a third device that is associated with a second loudspeaker; and cause second output audio to be generated, wherein a first portion of the second output audio is generated by the first loudspeaker, and causing the second output audio to be generated further comprises:

sending, by the first device to the third device, at least a portion of the second audio data, and sending, by the first device to the third device, a command to generate a second portion of the second output audio.

14. The system of claim 13, wherein the memory further comprises instructions that, when executed by the at least one processor, further cause the system to:

generate, using a first portion of the second audio data and the first loudspeaker, the first portion of the second output audio; and generate, using a second portion of the second audio data and the second loudspeaker, the second portion of the second output audio.

15. The system of claim 13, wherein the memory further comprises instructions that, when executed by the at least one processor, further cause the system to:

cause the first portion of the first output audio to be generated by the second device using the first portion of the first audio data;

cause the second portion of the first output audio to be generated by the first loudspeaker using a second portion of the first audio data;

send the second audio data to the second device; and cause the first portion of the second output audio to be generated by the first loudspeaker using the second audio data, wherein the second portion of the second output audio is generated using the second audio data.

16. The system of claim 13, wherein the memory further comprises instructions that, when executed by the at least one processor, further cause the system to:

determine second data relating to the second device returning to a first location;

determine, by the first device, third audio data; and cause third output audio to be generated, wherein a first portion of the third output audio is generated by the second device and a second portion of the third output audio is generated by the first loudspeaker.

17. The system of claim 13, wherein the memory further comprises instructions that, when executed by the at least one processor, further cause the system to:

receive, by the first device from the second device, notification data indicating that the second device will be moving from a first location.

18. The system of claim 13, wherein the memory further comprises instructions that, when executed by the at least one processor, further cause the system to:

receive, by the first device from the second device, notification data indicating that the second device detected motion.

19. The system of claim 13, wherein the memory further comprises instructions that, when executed by the at least one processor, further cause the system to:

receive, by the first device, the first audio data;

receive, by the first device, first notification data indicating that the first audio data is synchronized with third audio data associated with a fourth device;

receive, by the first device, the second audio data; and receive, by the first device, second notification data indicating that the second audio data is synchronized with fourth audio data associated with the fourth device.

20. A computer-implemented method, the method comprising:
   determining, by a first device, first audio data;
   sending, by the first device to a second device, at least a first portion of the first audio data;
   causing first output audio to be generated, wherein a first portion of the first output audio is generated by the second device and a second portion of the first output audio is generated by a first loudspeaker associated with a third device;
   determining, by the first device, first data relating to movement of the second device relative to the first device;
   determining, by the first device, second audio data;
   sending, from the first device to the third device, the second audio data; and
   causing second output audio to be generated by the third device, wherein a first portion of the second output audio is generated by the first loudspeaker and a second portion of the second output audio is generated by a second loudspeaker associated with the third device.

* * * * *